United States Patent
Thomas et al.

(10) Patent No.: US 12,052,271 B2
(45) Date of Patent: Jul. 30, 2024

(54) INCREMENTAL ENRICHMENT OF THREAT DATA

(71) Applicant: Sophos Limited, Abingdon (GB)

(72) Inventors: Andrew J. Thomas, Oxfordshire (GB); Mangal Rakesh Vankadaru, Didcot (GB); Prakash Kumar Talreja, Twickenham (GB); Timothy Rayment, Abingdon (GB); Biju Balakrishnan Nair, Bangalore (IN)

(73) Assignee: Sophos Limited, Abingdon (GB)

( * ) Notice: Subject to any disclaimer, the term of this patent is extended or adjusted under 35 U.S.C. 154(b) by 229 days.

(21) Appl. No.: 17/825,146

(22) Filed: May 26, 2022

(65) Prior Publication Data

US 2023/0114821 A1   Apr. 13, 2023

Related U.S. Application Data

(63) Continuation of application No. PCT/US2022/030859, filed on May 25, 2022.
(Continued)

(51) Int. Cl.
*H04L 9/40* (2022.01)
*G06F 21/53* (2013.01)
*G06F 21/56* (2013.01)

(52) U.S. Cl.
CPC .......... *H04L 63/1408* (2013.01); *G06F 21/53* (2013.01); *G06F 21/567* (2013.01);
(Continued)

(58) Field of Classification Search
CPC ............... H04L 63/1425; H04L 63/145; H04L 63/1408; H04L 63/1416; H04L 63/1433;
(Continued)

(56) References Cited

U.S. PATENT DOCUMENTS 8,181,244 B2   5/2012   Boney
8,201,243 B2   6/2012   Boney
(Continued)

FOREIGN PATENT DOCUMENTS

WO   WO-2016195985         12/2016
WO   WO-2019200317 A1 *   10/2019   ............. G06F 21/45
WO   WO-2023064007         4/2023

OTHER PUBLICATIONS

ISA/EP, "PCT Application No. PCT/US22/30859 International Search Report and Written Opinion mailed Nov. 7, 2022", 21 pages.
(Continued)

*Primary Examiner* — Samson B Lemma
(74) *Attorney, Agent, or Firm* — Strategic Patents, P.C.

(57) ABSTRACT

A threat management facility receives data from a variety of sources such as compute instances within an enterprise network, cloud service providers supporting the enterprise network, and third-party data providers such as geolocation services. In order to facilitate prompt notification of potential risks, the threat management facility may incrementally update data for use in threat assessments as the data becomes available from these different sources, and create suitable alerts or notifications whenever the currently accumulated data provides an indication of threat meeting a predetermined threshold.

18 Claims, 28 Drawing Sheets

Related U.S. Application Data

(60) Provisional application No. 63/254,368, filed on Oct. 11, 2021.

(52) U.S. Cl.
CPC ...... *H04L 63/1416* (2013.01); *H04L 63/1425* (2013.01); *H04L 63/1433* (2013.01); *H04L 63/1441* (2013.01); *H04L 63/145* (2013.01); *H04L 63/20* (2013.01)

(58) Field of Classification Search
CPC ... H04L 63/1441; H04L 63/20; H04L 63/202; G06F 21/53; G06F 21/552; G06F 21/567
USPC .......................................................... 726/23
See application file for complete search history.

(56) References Cited

U.S. PATENT DOCUMENTS

| | | | |
|---|---|---|---|
| 8,418,250 B2 | 4/2013 | Morris et al. | |
| 8,595,789 B2 | 11/2013 | Warn et al. | |
| 8,719,932 B2 | 5/2014 | Boney | |
| 8,726,389 B2 | 5/2014 | Morris et al. | |
| 8,763,123 B2 | 6/2014 | Morris et al. | |
| 8,769,676 B1* | 7/2014 | Kashyap | G06F 21/554 726/22 |
| 8,856,505 B2 | 10/2014 | Schneider | |
| 9,413,721 B2 | 8/2016 | Morris et al. | |
| 9,503,472 B2 | 11/2016 | Laidlaw et al. | |
| 9,578,045 B2 | 2/2017 | Jaroch et al. | |
| 9,589,245 B2 | 3/2017 | Coden et al. | |
| 10,257,224 B2 | 4/2019 | Jaroch et al. | |
| 10,984,122 B2* | 4/2021 | Thomas | H04L 63/1433 |
| 11,089,047 B1* | 8/2021 | Kaushal | H04L 67/10 |
| 11,651,313 B1 | 5/2023 | Fridakis | |
| 2013/0191919 A1* | 7/2013 | Basavapatna | H04L 63/20 726/25 |
| 2015/0373043 A1* | 12/2015 | Wang | G06F 21/6254 706/12 |
| 2016/0173509 A1* | 6/2016 | Ray | H04L 63/1425 726/23 |
| 2019/0373008 A1* | 12/2019 | Brandwine | H04L 63/1425 |
| 2020/0076835 A1 | 3/2020 | Ladnai et al. | |
| 2020/0329066 A1* | 10/2020 | Kirti | H04L 41/28 |
| 2021/0250366 A1* | 8/2021 | Ladnai | G06F 21/562 |
| 2023/0109926 A1 | 4/2023 | Nair et al. | |
| 2023/0111304 A1 | 4/2023 | Thomas et al. | |
| 2023/0111864 A1 | 4/2023 | Thomas et al. | |
| 2023/0113375 A1 | 4/2023 | Thomas et al. | |
| 2023/0113621 A1 | 4/2023 | Griffin et al. | |
| 2023/0114719 A1 | 4/2023 | Thomas et al. | |
| 2023/0275917 A1* | 8/2023 | Karmali | G06F 16/9537 709/224 |

OTHER PUBLICATIONS

ISA/EP, "PCT Application No. PCT/US22/30859 Invitation to Pay Additional Fees mailed Sep. 14, 2022", 17 pages.

USPTO, "U.S. Appl. No. 17/825,070 Notice of Allowance mailed Apr. 9, 2024", NPL-1114, 20 pages.

USPTO, "U.S. Appl. No. 17/825,083 Notice of Allowance mailed Apr. 9, 2024", NPL-1115, 13 pages.

USPTO, "U.S. Appl. No. 17/825,098 Notice of Allowance mailed Apr. 8, 2024", NPL-1116, 19 pages.

* cited by examiner

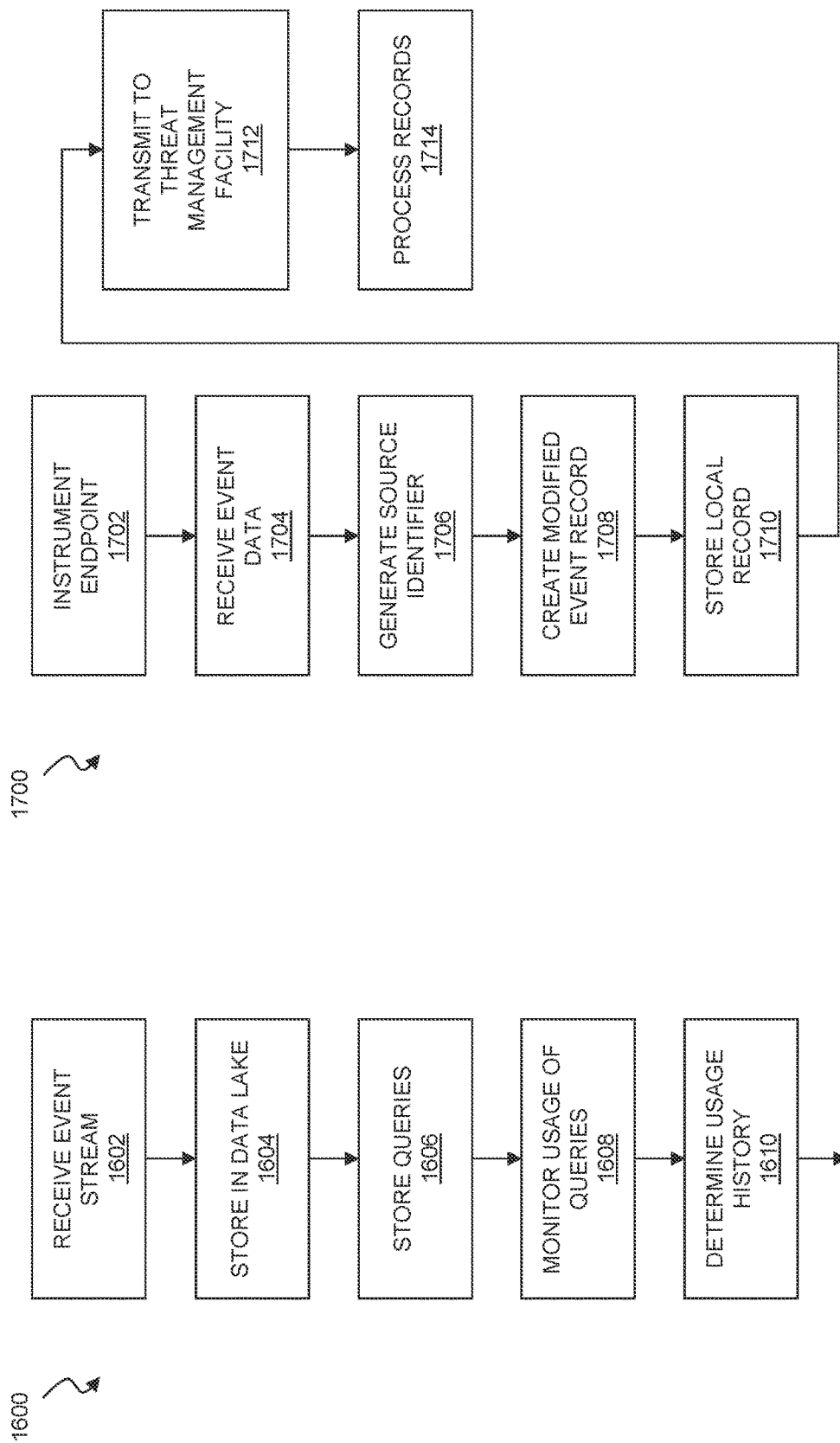

| TACTICS | | | | | |
|---|---|---|---|---|---|
| INITIAL ACCESS | EXECUTION | PERSISTENCE | PRIVILEGE ESCALATION | DEFENSE EVASION | CREDENTIAL ACCESS |
| DRIVE-BY COMPROMISE | POWER SHELL | BASH_PROFILE AND BASHRC | PROCESS INJECTION | PROCESS INJECTION | ACCOUNT MANIPULATION |
| EXPLOIT PUBLIC-FACING APPLICATION | SCHEDULED TASK | ACCESSIBILITY FEATURES | ACCESS TOKEN MANIPULATION | ACCESS TOKEN MANIPULATION | BASH HISTORY |
| EXTERNAL REMOTE SERVICES | WINDOWS MANAGEMENT INSTRUMENTATION | ACCOUNT MANIPULATION | ACCESSIBILITY FEATURES | APPLICATION ACCESS TOKEN | BRUTE FORCE |
| HARDWARE ADDITIONS | APPLE SCRIPT | APPCERT DLLS | APPCERT DLLS | BINARY PADDING | CLOUD INSTANCE METADATA API |
| REPLICATION THROUGH REMOVABLE MEDIA | CMSTP | APPINIT DLLS | APPINIT DLLS | BITS JOBS | CREDENTIAL DUMPING |
| SPEARPHISHING ATTACHMENT | COMMAND-LINE INTERFACE | APPLICATION SHIMMING | APPLICATION SHIMMING | BYPASS USER ACCOUNT CONTROL | CREDENTIALS FROM WEB BROWSERS |
| SPEARPHISHING LINK | COMPILED HTML FILE | AUTHENTICATION PACKAGE | BYPASS USER ACCOUNT CONTROL | CLEAR COMMAND HISTORY | CREDENTIALS IN FILES |
| SPEARPHISHING VIA SERVICE | COMPONENT OBJECT MODEL AND DISTRIBUTED COM | BITS JOBS | DLL SEARCH ORDER HIJACKING | CMSTP | CREDENTIALS IN REGISTRY |
| SUPPLY CHAIN COMPROMISE | CONTROL PANEL ITEM | BOOTKIT | DYLIB HIJACKING | CODE SIGNING | EXPLOITATION FOR CREDENTIAL ACCESS |
| TRUSTED RELATIONSHIP | DYNAMIC DATA EXCHANGE | BROWSER EXTENSIONS | ELEVATED EXECUTION WITH PROMPT | COMPILE AFTER DELIVERY | FORCED AUTHENTICATION |
| | | CHANGE DEFAULT FILE ASSOCIATION | EMOND | COMPILED HTML FILE | HOOKING |
| | | COMPONENT FIRMWARE | EXPLOITATION FOR PRIVILEGE ESCALATION | COMPONENT FIRMWARE | INPUT CAPTURE |
| | | COMPONENT OBJECT MODEL HIJACKING | EXTRA WINDOW MEMORY INJECTION | COMPONENT OBJECT MODEL HIJACKING | INPUT PROMPT |

FIG. 22A

| DISCOVERY | LATERAL MOVEMENT | COLLECTION | COMMAND AND CONTROL | EXFILTRATION |
|---|---|---|---|---|
| ACCOUNT DISCOVERY | WINDOWS ADMIN SHARES | AUDIO CAPTURE | WEB SERVICE | AUTOMATED EXFILTRATION |
| APPLICATION WINDOW DISCOVERY | APPLESCRIPT | AUTOMATED COLLECTION | COMMONLY USED PORT | DATA COMPRESSED |
| BROWSER BOOKMARK DISCOVERY | APPLICATION ACCESS TOKEN | CLIPBOARD DATA | COMMUNICATION THROUGH REMOVABLE MEDIA | DATA ENCRYPTED |
| CLOUD SERVICE DASHBOARD | APPLICATION DEPLOYMENT SOFTWARE | DATA FROM CLOUD STORAGE OBJECT | CONNECTION PROXY | DATA TRANSFER SIZE LIMITS |
| CLOUD SERVICE DISCOVERY | COMPONENT OBJECT MODEL AND DISTRIBUTED COM | DATA FROM INFORMATION REPOSITORIES | CUSTOM COMMAND AND CONTROL PROTOCOL | EXFILTRATION OVER ALTERNATIVE PROTOCOL |
| DOMAIN TRUST DISCOVERY | EXPLOITATION OF REMOTE SERVICES | DATA FROM LOCAL SYSTEM | CUSTOM CRYPTOGRAPHIC PROTOCOL | EXFILTRATION OVER COMMAND AND CONTROL CHANNEL |
| FILE AND DIRECTORY DISCOVERY | INTERNAL SPEARPHISHING | DATA FROM NETWORK SHARED DRIVE | DATA ENCODING | EXFILTRATION OVER OTHER NETWORK MEDIUM |
| NETWORK SERVICE SCANNING | LOGON SCRIPTS | DATA FROM REMOVABLE MEDIA | DATA OBFUSCATION | EXFILTRATION OVER PHYSICAL MEDIUM |
| NETWORK SHARE DISCOVERY | PASS THE HASH | DATA STAGED | DOMAIN FRONTING | SCHEDULED TRANSFER |
| NETWORK SNIFFING | PASS THE TICKET | EMAIL COLLECTION | DOMAIN GENERATION ALGORITHMS | TRANSFER DATA TO CLOUD ACCOUNT |
| PASSWORD POLICY DISCOVERY | REMOTE DESKTOP PROTOCOL | INPUT CAPTURE | FALLBACK CHANNELS | |
| PERIPHERAL DEVICE DISCOVERY | REMOTE FILE COPY | MAN IN THE BROWSER | MULTI-HOP PROXY | |
| PERMISSION GROUPS DISCOVERY | REMOTE SERVICES | SCREEN CAPTURE | MULTI-STAGE CHANNELS | |

FIG. 22B

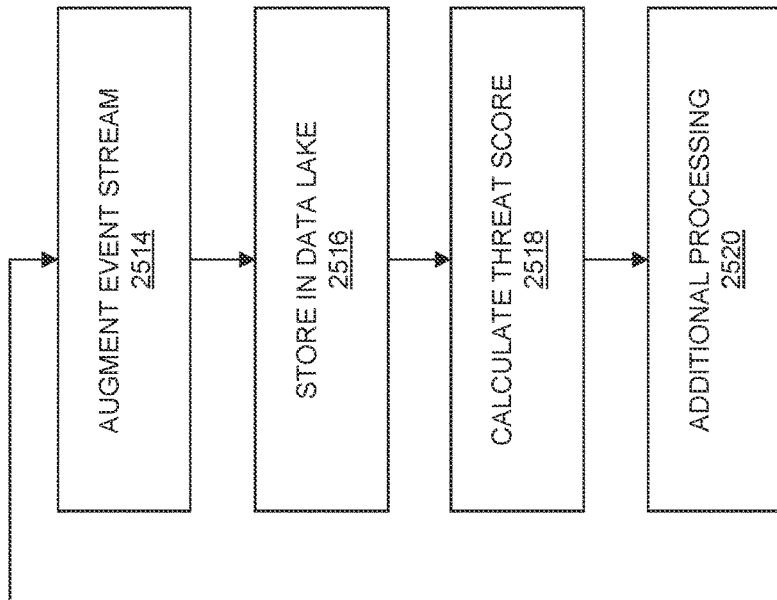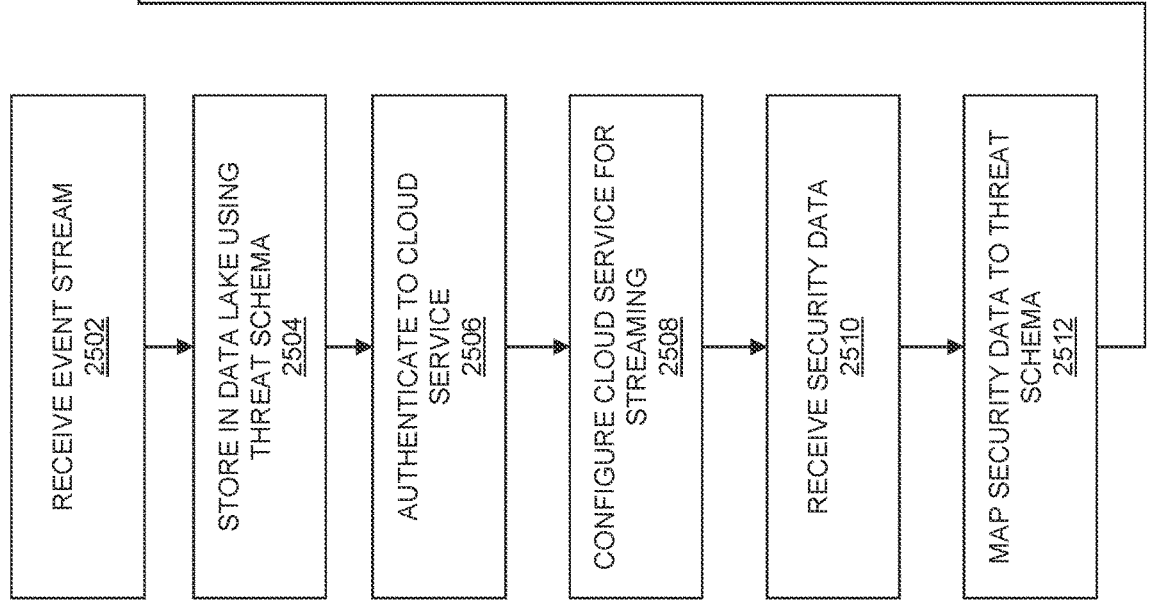
FIG. 25

INCREMENTAL ENRICHMENT OF THREAT DATA

CROSS-REFERENCE TO RELATED APPLICATIONS

This application is a bypass continuation that claims priority to International Patent Application No. PCT/US22/30859 filed on May 25, 2022, which claims priority to U.S. Provisional Pat. App. No. 63/254,368 filed on Oct. 11, 2021, the entire content of which is hereby incorporated by reference herein.

FIELD

The present disclosure relates to the use of event streams for recording, monitoring, and investigation of enterprise security.

BACKGROUND

As enterprise networks become more complex, and security threats become more sophisticated, there remains a need for improved techniques for monitoring security events and for identifying and investigating potential security threats within the enterprise network.

SUMMARY

A platform for network threat investigation is augmented with data from cloud resources such as third-party, cloud-based application platforms. The resulting merged data set can be incrementally updated and used to automatically launch investigations at appropriate times.

A threat management facility receives data from a variety of sources such as compute instances within an enterprise network, cloud service providers supporting the enterprise network, and third-party data providers such as geolocation services. In order to facilitate prompt notification of potential risks, the threat management facility may incrementally update data for use in threat assessments as the data becomes available from these different sources, and create suitable alerts or notifications whenever the currently accumulated data provides an indication of threat meeting a predetermined threshold.

In one aspect, a computer program product disclosed herein may include computer executable code embodied in a non-transitory computer readable medium that, when executing on one or more computing devices, causes the one or more computing devices to perform the step of receiving threat data asynchronously from a plurality of sources. The threat data may include at least: a local threat indication from a local security agent executing on a compute instance in an enterprise network, the local threat indication identifying a category of malicious activity associated with one or more events detected on the compute instance; geolocation data retrieved from a third-party service for a suspected threat detected on the compute instance; and cloud resource data based on an action associated with the compute instance at a cloud service supporting one or more cloud-based applications for users of the enterprise network. The computer program product may further include computer executable code that, when executing on the one or more computing devices, performs the steps of: in response to asynchronous data from one of the plurality of sources, incrementally calculating a composite threat score indicative of a threat risk for the compute instance based on the threat data; automatically creating an investigation container when the composite threat score meets a predetermined threshold, the investigation container associated with a user interface for interactively investigating sources of the composite threat score; displaying the composite threat score to a user in the user interface associated with the investigation container; and updating the composite threat score in the user interface in response to additional asynchronous data from one of the plurality of sources.

Implementations may include one or more of the following features. The computer program product may further include computer executable code that, when executing on the one or more computing devices, performs the step of creating an alert to the user when the composite threat score meets the predetermined threshold. The alert may include a message containing a link to the investigation container.

In one aspect, a method disclosed herein may include receiving threat data asynchronously from a plurality of sources. The threat data may include at least: a local threat indication from a local security agent on a compute instance in an enterprise network; contextual data from a third-party service for a suspected threat detected on the compute instance; and cloud resource data based on an action associated with the compute instance at a cloud service supporting users of the enterprise network. The method may further include, in response to asynchronous data from one of the plurality of sources, incrementally calculating a composite threat score indicative of a threat risk for the compute instance based on the threat data, and displaying the composite threat score to a user in a user interface associated with an investigation container.

Implementations may include one or more of the following features. The method may further include updating the composite threat score in the user interface in response to additional asynchronous data from one of the plurality of sources. The contextual data may include geolocation data. The method may further include automatically creating the investigation container for investigating activity associated with the composite threat score in response to the composite threat score meeting a predetermined threshold. The composite threat score may include a number of scores each individually based on one of the local threat indication, the contextual data, and the cloud resource data. The method may further include automatically launching the investigation container in response to the at least one of the number of scores meeting a predetermined threshold. The user interface associated with the investigation container may provide interactive access to supporting data for the composite threat score. The method may further include transmitting a notification with a link to the user interface associated with the investigation container to a device associated with a security technician for the enterprise network. The composite threat score may include a single score based on at least the local threat indication, the contextual data, and the cloud resource data. The cloud service may include one or more of a web application, a cloud storage service, an electronic mail application, an authentication service, a zero trust network access resource, a network monitor executing on a third-party firewall, a cloud computing service, and a virtualization platform. The plurality of sources may include a third party security service. The plurality of sources may include a source of malware signature updates. The plurality of sources may include two or more cloud service providers. The plurality of sources may include a threat management facility for the enterprise network, the threat management facility configured to augment information in the investigation container based on a history of responses by other users to a potential threat associated with the investigation container. The local threat indication may identify a category of malicious activity associated with one or more events detected on the compute instance. The local threat indication may include a malware detection from the local security agent executing on the compute instance.

In one aspect, a system disclosed herein may include: a plurality of compute instances associated with an enterprise network, and a threat management facility for the enterprise network. The threat management facility may be configured to receive threat data asynchronously from a plurality of sources, the threat data including at least: a local threat indication from a local security agent on a compute instance, the local threat indication identifying a category of malicious activity associated with one or more events detected on the compute instance; geolocation data retrieved from a third-party service for a suspected threat detected on the compute instance; and cloud resource data based on an action associated with the compute instance at a cloud service supporting one or more cloud-based applications for users of the enterprise network. The threat management facility may be configured to respond to asynchronous data from one of the plurality of sources by: incrementally calculating a composite threat score indicative of a threat risk for the compute instance; creating an investigation container when the composite threat score meets a predetermined threshold; displaying the composite threat score in a user interface associated with the investigation container; and updating the composite threat score in the user interface in response to additional asynchronous data from one of the plurality of sources.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 16 shows a method for discovery of enterprise threats based on security query activity.

FIG. 17 shows a method for augmenting data for use in threat investigation.

FIG. 22A illustrates a first portion of an attack matrix.

FIG. 22B illustrates a second portion of an attack matrix.

FIG. 25 is a flow chart of a method for security integration with cloud services.

DESCRIPTION

Figure 1:
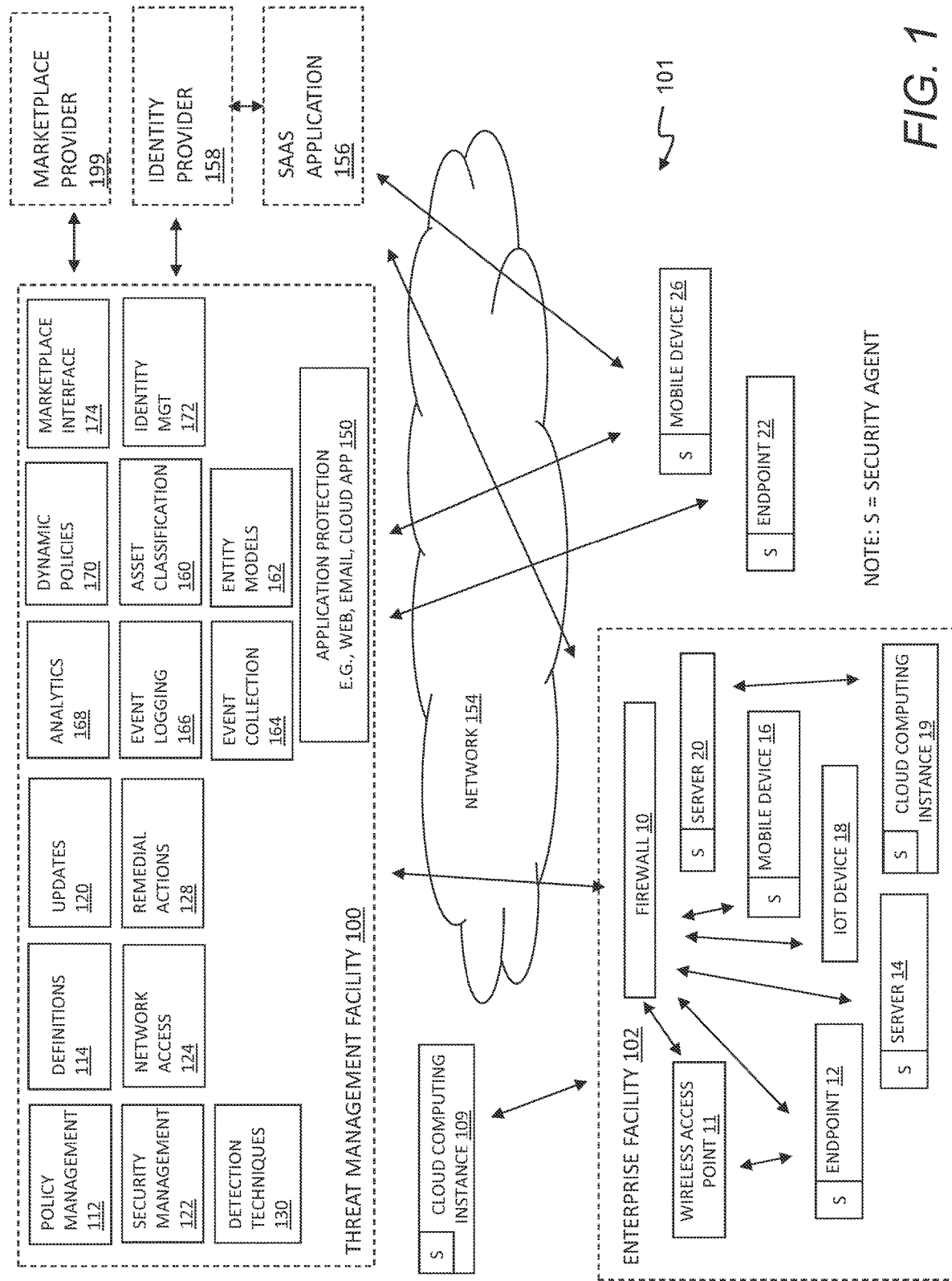
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a threat score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
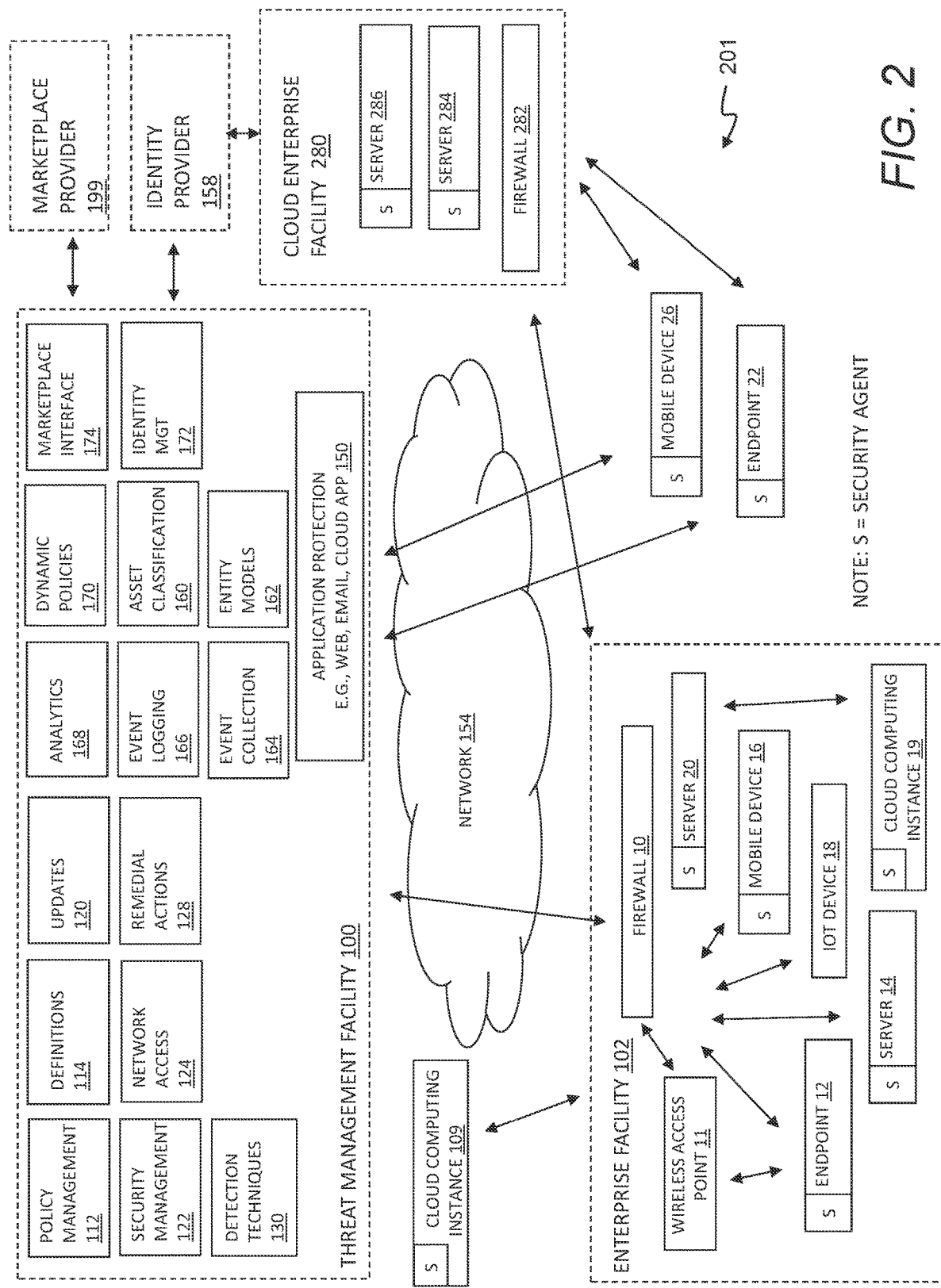
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
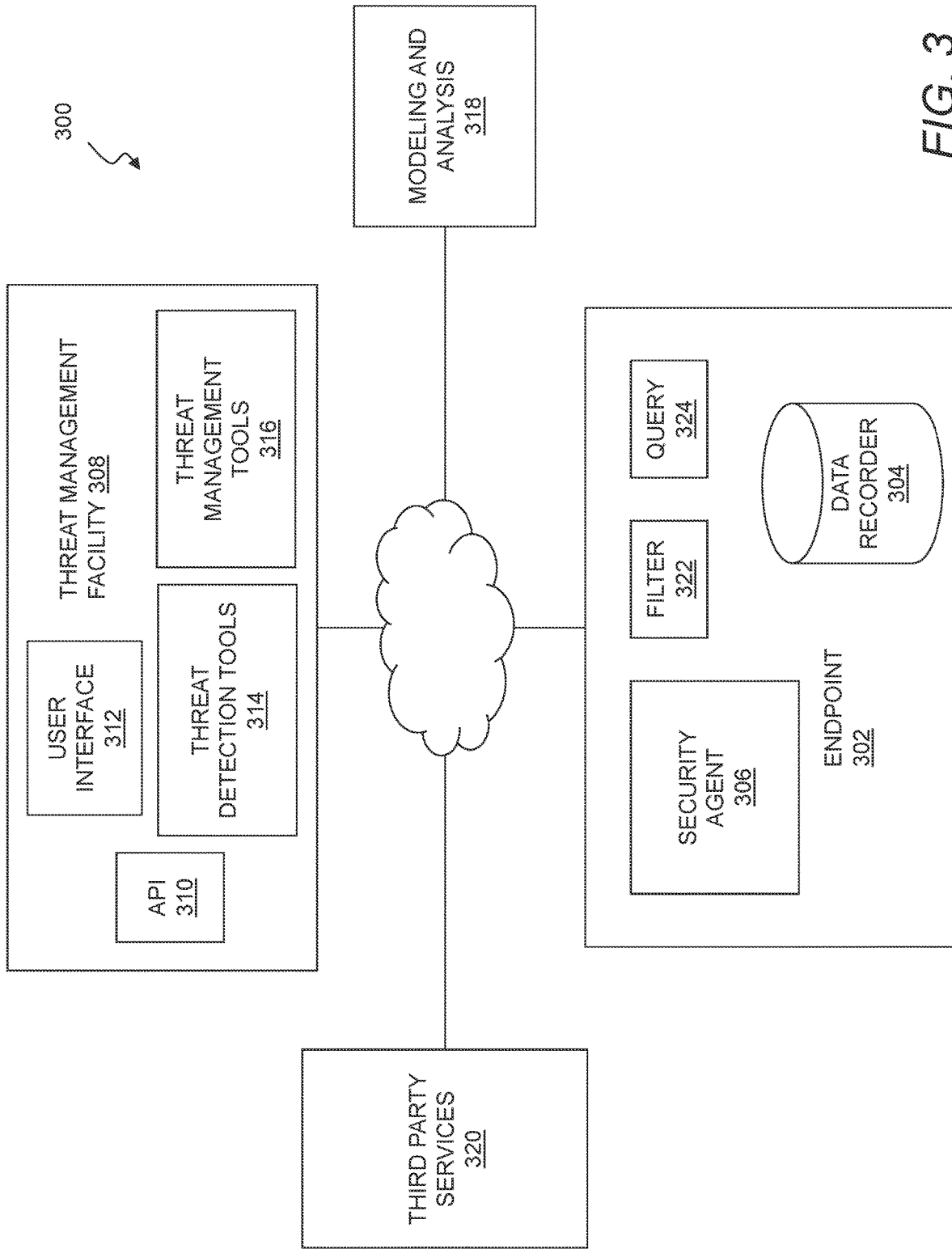
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream, and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g., models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus, for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be request for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
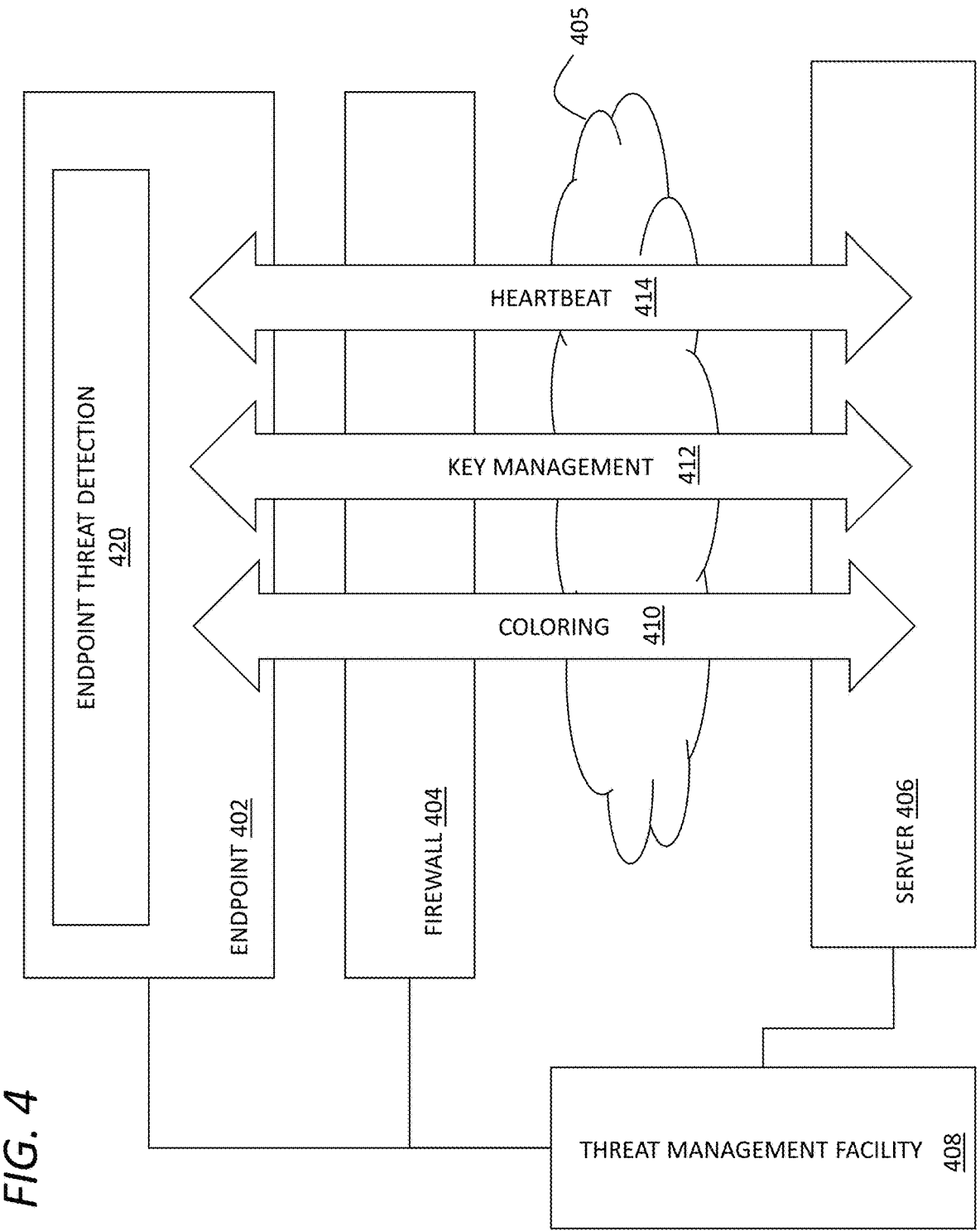
FIG. 4 illustrates a threat management system.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

Figure 5:
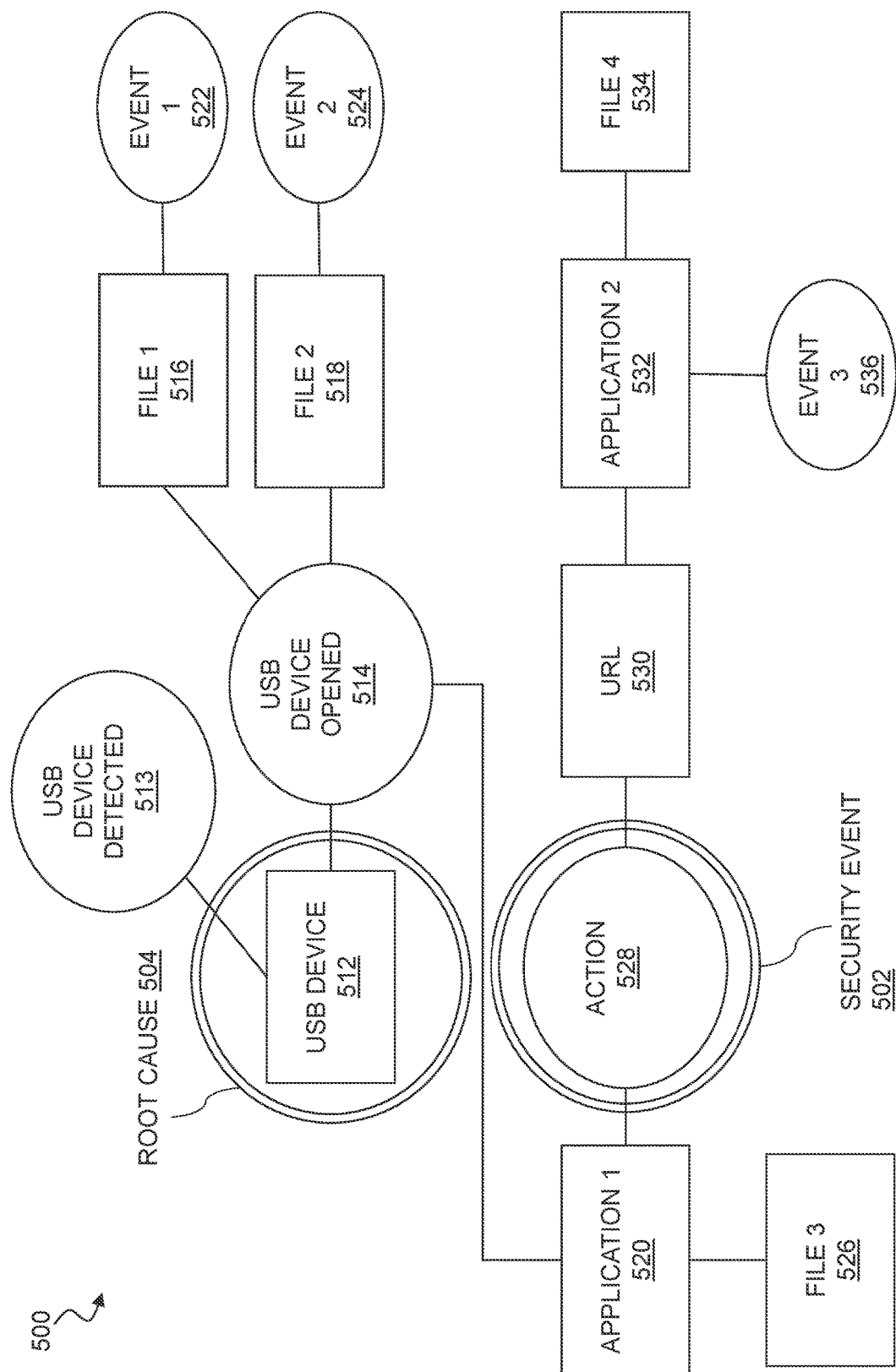
FIG. 5 illustrates an event graph stored by a data recorder.

FIG. 5 illustrates an event graph 500 stored by a data recorder such as any of the data recorders described herein. The event graph 500 may include a sequence of computing objects causally related by a number of events, and which provide a description of computing activity on one or more endpoints. The event graph 500 may be generated, for example, when a security event 502 is detected on an endpoint, and may be based on a data log or similar records obtained by an event data recorder during operation of the endpoint. The event graph 500 may be used to determine a root cause 504 of the security event 502 as generally described above. The event graph 500 may also or instead be continuously generated to serve as, or be a part of, the data log obtained by the data recorder. In any case, an event graph 500, or a portion of an event graph 500 in a window before or around the time of a security event, may be obtained and analyzed after a security event 502 occurs to assist in determining its root cause 504. The event graph 500 depicted in the figure is provided by way of example only, and it will be understood that many other forms and contents for event graphs 500 are also or instead possible. It also will be understood that while the figure illustrates a graphical depiction of an event graph 500, the event graph 500 may be stored in any suitable data structure or combination of data structures suitable for capturing the chain of events and objects in a manner that preserves causal relationships for use in forensics and malware detection as contemplated herein.

By way of example, the event graph 500 depicted in the figure begins with a computing object that is a USB device 512, which may be connected to an endpoint. Where the USB device 512 includes a directory or file system, the USB device 512 may be mounted or accessed by a file system on an endpoint to read contents. The USB device 512 may be detected 513 and contents of the USB device 512 may be opened 514, e.g., by a user of the endpoint or automatically by the endpoint in response to detection of the USB device 512. The USB device 512 may include one or more files and applications, e.g., a first file 516, a second file 518, and a first application 520. The first file 516 may be associated with a first event 522 and the second file may be associated with a second event 524. The first application 520 may access one or more files on the endpoint, e.g., the third file 526 shown in the figure. The first application 520 may also or instead perform one or more actions 528, such as accessing a URL 530. Accessing the URL 530 may download or run a second application 532 on the endpoint, which in turn accesses one or more files (e.g., the fourth file 534 shown in the figure) or is associated with other events (e.g., the third event 536 shown in the figure).

In the example provided by the event graph 500 depicted in the figure, the detected security event 502 may include the action 528 associated with the first application 520, e.g., accessing the URL 530. By way of example, the URL 530 may be a known malicious URL or a URL or network address otherwise associated with malware. The URL 530 may also or instead include a blacklisted network address that although not associated with malware may be prohibited by a security policy of the endpoint or enterprise network in which the endpoint is a participant. The URL 530 may have a determined reputation or an unknown reputation. Thus, accessing the URL 530 can be detected through known computing security techniques.

In response to detecting the security event 502, the event graph 500 may be traversed in a reverse order from a computing object associated with the security event 502 based on the sequence of events included in the event graph 500. For example, traversing backward from the action 528 leads to at least the first application 520 and the USB device 512. As part of a root cause analysis, one or more cause identification rules may be applied to one or more of the preceding computing objects having a causal relationship with the detected security event 502, or to each computing object having a causal relationship to another computing object in the sequence of events preceding the detected security event 502. For example, other computing objects and events may be tangentially associated with causally related computing objects when traversing the event graph 500 in a reverse order-such as the first file 516, the second file 518, the third file 525, the first event 522, and the second event 524 depicted in the figure. In an aspect, the one or more cause identification rules are applied to computing objects preceding the detected security event 502 until a cause of the security event 502 is identified.

In the example shown in the figure, the USB device 512 may be identified as the root cause 504 of the security event 502. In other words, the USB device 512 was the source of the application (the first application 520) that initiated the security event 502 (the action 528 of accessing the potentially malicious or otherwise unwanted URL 530).

The event graph 500 may similarly be traversed going forward from one or more of the root cause 504 or the security event 502 to identify one or more other computing objects affected by the root cause 504 or the security event 502. For example, the first file 516 and the second 518 potentially may be corrupted because the USB device 512 included malicious content. Similarly, any related actions performed after the security event 502 such as any performed by the second application 532 may be corrupted. Further testing or remediation techniques may be applied to any of the computing objects affected by the root cause 504 or the security event 502.

The event graph 500 may include one or more computing objects or events that are not located on a path between the security event 502 and the root cause 504. These computing objects or events may be filtered or 'pruned' from the event graph 500 when performing a root cause analysis or an analysis to identify other computing objects affected by the root cause 504 or the security event 502. For example, computing objects or events that may be pruned from the event graph 500 may include the USB drive 510 and the USB device being detected 513.

It will be appreciated that the event graph 500 depicted in FIG. 5 is an abstracted, simplified version of actual nodes and events on an endpoint for demonstration. Numerous other nodes and edges will be present in a working computing environment. For example, when a USB device is coupled to an endpoint, the new hardware will first be detected, and then the endpoint may search for suitable drivers and, where appropriate, present a user inquiry of how the new hardware should be handled. A user may then apply a file system to view contents of the USB device and select a file to open or execute as desired, or an autorun.exe or similar file may be present on the USB device that begins to execute automatically when the USB device is inserted. All of these operations may require multiple operating system calls, file system accesses, hardware abstraction layer interaction, and so forth, all of which may be discretely represented within the event graph 500, or abstracted up to a single event or object as appropriate. Thus, it will be appreciated that the event graph 500 depicted in the drawing is intended to serve as an illustrative example only, and not to express or imply a particular level of abstraction that is necessary or useful for root cause identification as contemplated herein.

The event graph 500 may be created or analyzed using rules that define one or more relationships between events and computing objects. The C Language Integrated Production System (CLIPS) is a public domain software tool intended for building expert systems, and may be suitably adapted for analysis of a graph such as the event graph 500 to identify patterns and otherwise apply rules for analysis thereof. While other tools and programming environments may also or instead be employed, CLIPS can support a forward and reverse chaining inference engine suitable for a large amount of input data with a relatively small set of inference rules. Using CLIPS, a feed of new data can trigger a new inference, which may be suitable for dynamic solutions to root cause investigations.

An event graph such as the event graph 500 shown in the figure may include any number of nodes and edges, where computing objects are represented by nodes and events are represented by edges that mark the causal or otherwise directional relationships between computing objects such as data flows, control flows, network flows and so forth. While processes or files are common forms of nodes that might appear in such a graph, any other computing object such as an IP address, a registry key, a domain name, a uniform resource locator, a command line input or other object may also or instead be designated to be a node in an event graph as contemplated herein. Similarly, while an edge may be formed by an IP connection, a file read, a file write, a process invocation (parent, child, etc.), a process path, a thread injection, a registry write, a domain name service query, a uniform resource locator access and so forth other edges may be designated. As described above, when a security event is detected, the source of the security event may serve as a starting point within the event graph 500, which may then be traversed backward to identify a root cause using any number of suitable cause identification rules. The event graph 500 may then usefully be traversed forward from that root cause to identify other computing objects that are potentially tainted by the root cause so that a more complete remediation can be performed.

Figure 6:
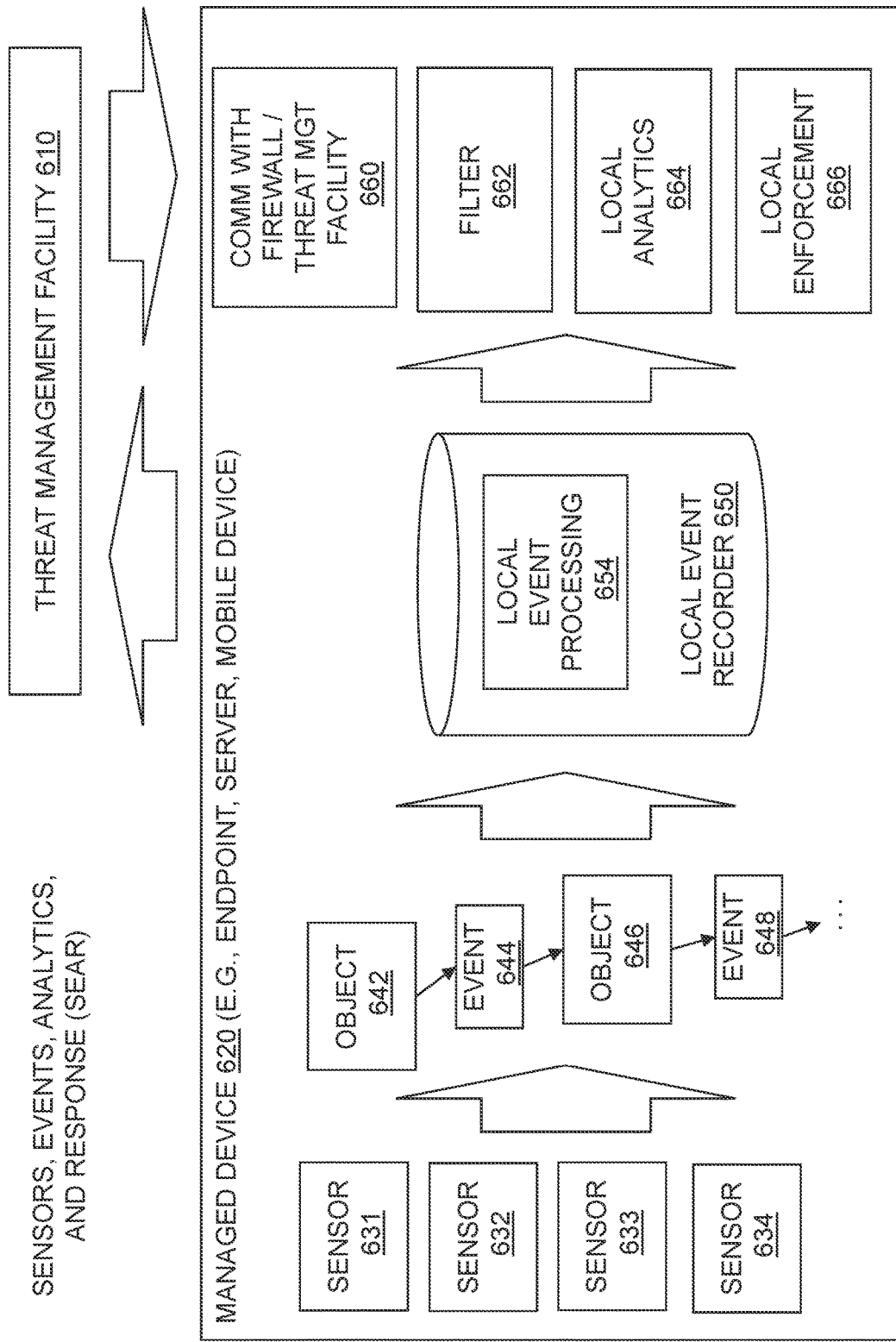
FIG. 6 depicts a Sensors, Events, Analytics, and Response (SEAR) environment.

FIG. 6 depicts a Sensors, Events, Analytics, and Response (SEAR) environment, which may be used on a compute instance 620 such as a managed device. The compute instance 620 may include sensors 631, 632, 633, 634 that produce data that are recognized as events according to the entity model. The sensors 631, 632, 633, 634 thus are sources of event information. The output of sensors 631, 632, 633, 644 may be objects 642 that are recognized as events 644. There may be multiple objects 642, 646 and events 644, 648 provided by a sensor. The events may be processed by a local event processing facility 654. The event processing may perform tokenizing and processing. Some events may be recognized and evaluated in real-time, other events may be evaluated in the context of other events. This may be stream or bulk processing. Events may have attributes (e.g., mandatory, optional (e.g., best effort), sensitive (tokenize it in local event store)), or associated contextual information.

A local event recorder 650 may be part of the event logging facility. Some recorded events may be stored locally and some may be communicated to another compute instance, such as the cloud. Some events will all be sent in real time, some only stored locally (and should be retrievable). An event filter 662 may be used to parse the events. Local analytics 664 on a compute instance may be used to locally identify events of interest. A communication facility 660 will communicate events to a central event store, such as a threat management facility 610, which may be a cloud facility. Local enforcement 666 may be used to take steps in response to events, as determined by the policy management facility 666. In embodiments, events can have attributes (e.g., mandatory, optional (e.g., best effort), sensitive (e.g., tokenize it in local event store)). Some events will all be sent in real time, some only stored locally (and should be retrievable).

A goal may be to discover as much as we can about the assets in the enterprise, and reduce surprises, such as compute instances that network administrators are not aware of, or unpatched compute instances, or valuable data leaving the enterprise.

As one non-limiting example, static policies may be assigned to access of files and data. Events involving files and data may be observed by sensors, for example, in a file system filter, generating events. The events may be determined to be of interest based on the policies.

Figure 7:
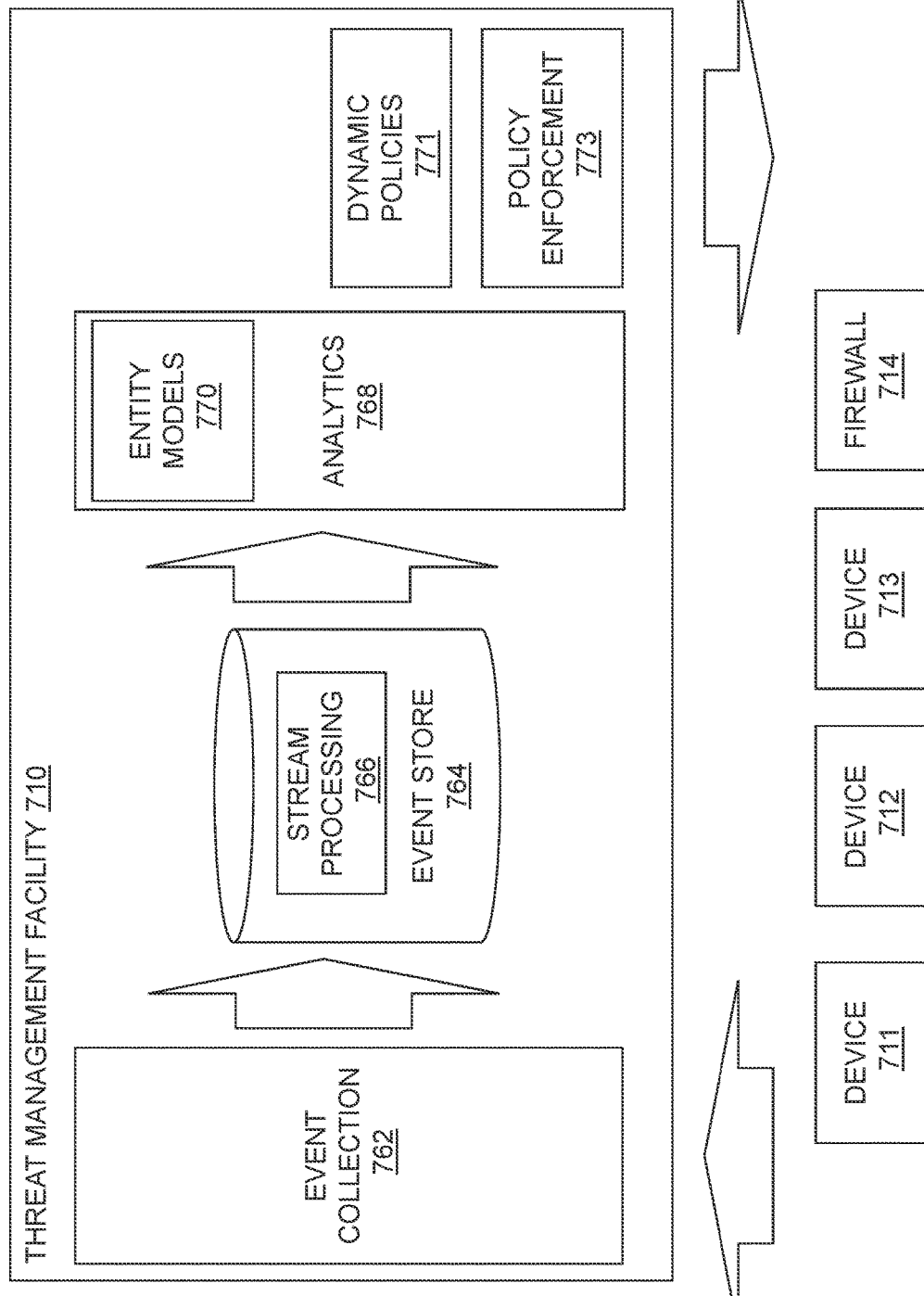
FIG. 7 depicts centralized event collection.

FIG. 7 depicts centralized event collection. Referring to FIG. 7, centralized event collection 700 may be used to receive and store events from various compute instances. Events are received at a threat management facility 710 by event collection 762. Events may be received from compute instances, shown for the sake of clarity of illustration as a device 711, a device 712, a device 713, and a firewall 714, although events may be received from any number or type of compute instances. Events may be stored in the event store 764, and also may be processed in real-time by the stream processing facility 766. The entity models 770 may be used by the analytics facility 768 to make observations and inferences based on the events.

In embodiments, events are continuously analyzed against a baseline. The baseline may be adjusted to account for normal behavior. Comparison to baselines may include looking for outliers and anomalies as well as impossible events. For example, if a user logs on from Germany and then logs in from San Francisco, that may be considered impossible. Comparisons may be made at different levels. For example, the entity may be compared to itself e.g., how does this user on Monday compare to this same user at some past time. The entity may also or instead be compared to a peer group, e.g., is a finance department member behaving similar to other finance department members. The entity may also or instead be compared to other entities within the enterprise. For example, the entity may be compared to other users at similar companies in the same industry, or in the same location, as well as to the universe of all users.

Real-time and retrospective threat intelligence may also be included, as well as vulnerability information and patch information.

With a sufficient level of confidence in the inferences, active, adaptive responses may be taken. For example, dynamic policies 771 may be updated to better fit the security profile to the environment that has been discovered and observed, e.g., by adjusting security settings within a security policy or group of security policies. A policy enforcement facility 773 may enforce these updated dynamic policies 771 at compute instances, such as the compute instances 711-714.

In embodiments, high-interaction interfaces allow an admin to interact with the event store 764 to better understand the assets in the enterprise facility and for specific purposes, such as threat hunting.

Figure 8:
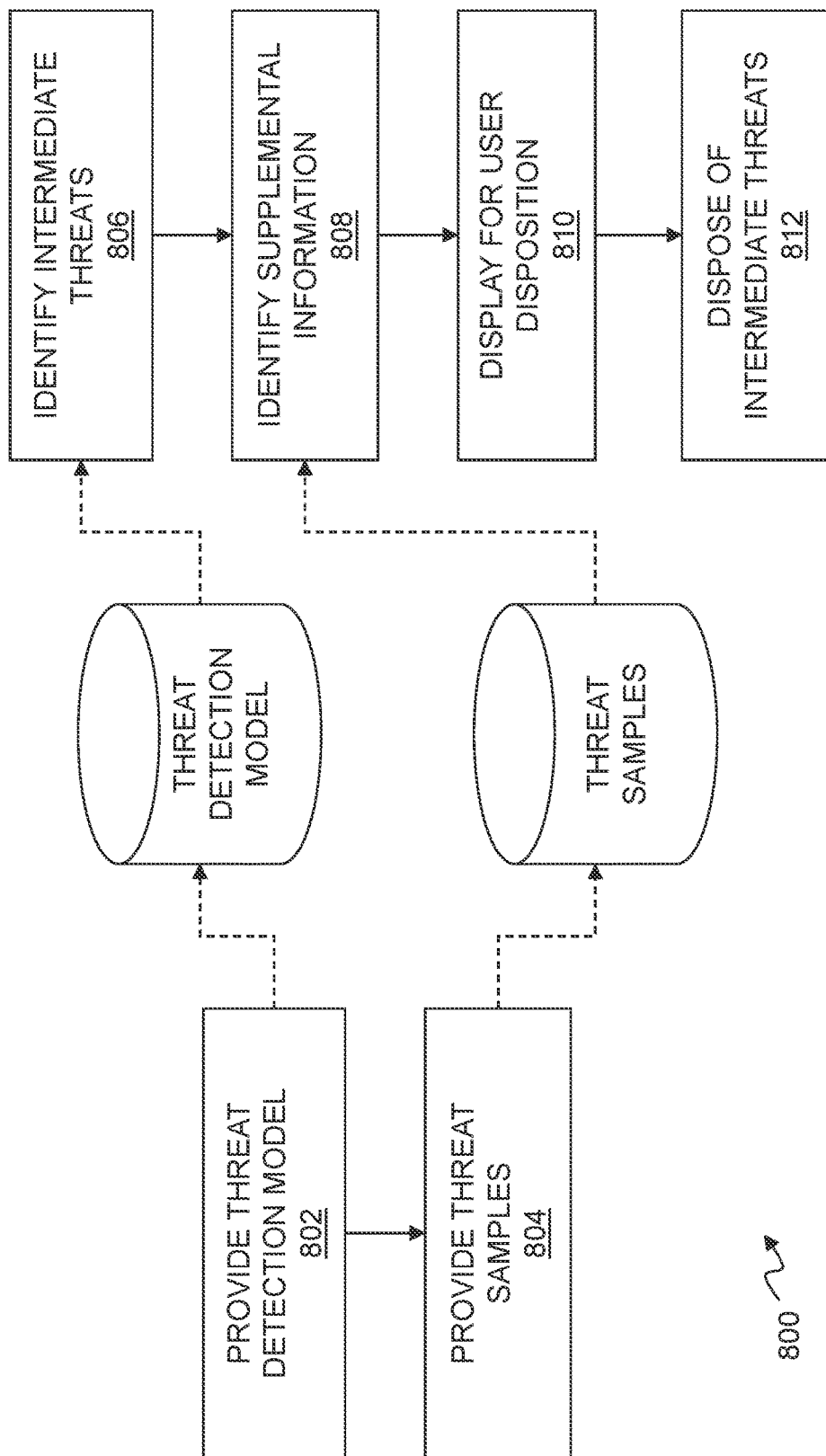
FIG. 8 shows a flow chart of a method for computer augmented threat evaluation.

FIG. 8 shows a flow chart of a method for computer augmented threat evaluation. In general, an automated system attempts to characterize code as safe or unsafe. For intermediate threat samples that are not placed with sufficient confidence in either category, human-readable analysis is automatically generated, such as qualitative or quantitative comparisons to previously categorized threat samples, in order to assist a human reviewer in reaching a final disposition. For example, a random forest over human-interpretable features may be created and used to identify suspicious features in a manner that is understandable to, and actionable by, a human reviewer. Similarly, a k-nearest neighbor algorithm or similar technique may be used to identify similar samples of known safe and unsafe code based on a model for one or more of a file path, a URL, an executable, and so forth. Similar code may then be displayed along with other information to a user for evaluation in a user interface. This comparative information can substantially improve the speed and accuracy of human interventions by providing richer context for human review of potential threats.

As shown in step 802, the method 800 may include providing a model such as a threat detection model for evaluating a likelihood that a threat sample is at least one of safe or malicious based on a training set of known threat samples. This may include any of the machine learning models or other threat detection models contemplated herein. As shown in step 804, the method 800 may also include providing threat samples such as samples of code that are known to be safe and samples of code that are known to be malicious. This may also or instead include known safe and unsafe samples of network activity, file content, file activity, behaviors, events, and so forth. The threat detection model may include a machine learning model trained using these threat samples, or any other suitable training set, or some combination of these. Thus, providing the model may include training a machine learning model to identify malicious code in a training set including threat samples that are known to be safe and known to be malicious.

The model may include a model for evaluating a likelihood that a threat sample is at least one of safe or malicious based on a training set of known threat samples. The model may also or instead include an integrative model that evaluates a potential threat by a threat sample based on a combination of a first model configured to identify malicious code based on behavioral tags, a second model configured to identify malicious code based on an executable file path, and a third model configured to identify malicious code based on a Uniform Resource Locator within the threat sample, or any of the other integrative models contemplated herein.

As shown in step 806, the method 800 may include identifying intermediate threats. For example, this may include identifying a new threat sample as an intermediate threat that is not within a predetermined likelihood of being malicious or safe according to the model, or using any of the other techniques described herein.

As shown in step 808, the method 800 may include identifying supplemental information relevant to evaluation of the new threat sample, such as relevant features of the new threat sample contributing to an inference of malicious code.

For example, the method 800 may include identifying one or more features, such as relevant features of the new threat sample associated with an inference of malicious code, using a random forest over human-interpretable features associated with an inference of malicious code in the training set of known threat samples (or any other suitable training set or the like). Random forests or random decision forests are an ensemble learning method for classification, regression, and other tasks, that operate by constructing a multitude of decision trees at training time and outputting the class that is the mode of the classes (classification) or mean prediction (regression) of the individual trees. As a significant advantage, the structure of the decision tree(s) can be organized around human-interpretable features such as whether a threat sample is signed or whether the threat sample opens new files during execution. While the creation of a random forest is generally computationally expensive, and other more efficient techniques are known for automated classification, the output of a random forest over human-interpretable features can provide highly useful context to a human reviewer when evaluating intermediate threats as contemplated herein, and thus provides particular advantages over other classification techniques in this context, even when used in addition to other (possibly more computationally efficient) classification models and techniques for evaluating riskiness of unknown threat samples.

Identifying supplemental information may also or instead include identifying similar threat samples known to be safe or malicious including one or more safe threat samples similar to the new threat sample and one or more malicious threat samples similar to the new threat sample. In this context, similarity may usefully be computed based on a k-nearest neighbor algorithm. The similar threat samples may, for example, include a list of safe threat samples ranked based on similarity to the new threat sample according to the k-nearest neighbor algorithm, which may in turn be presented as a ranked list in a user interface. The similar code may also or instead include a list of malicious threat samples ranked based on similarity to the new threat sample according to the k-nearest neighbor algorithm. Using these ranked lists, a user may advantageously be presented with an ordered list of nearest, known safe threat samples and nearest, known unsafe samples. A k-nearest neighbor algorithm is a non-parametric method that assigns a new item to a particular class based on a closest neighbor within a (usually multi-dimensional) features space for training data.

While this approach provides a computationally efficient technique for evaluating similarity for certain data types, it will be understood that other computational measures of similarity are known in the art, and may usefully be employed to evaluate similarity of a new threat sample to known safe an unsafe threat samples as contemplated herein. For example, a nearest centroid classifier or nearest prototype classifier uses a classification model that assigns a classification based on a closest centroid that may be used to assess similarity as contemplated herein. As another example, an n-gram analysis supports efficient approximate matching and may be used to perform fast, large scale similarity analysis for a given file path over a large database of known malicious and known benign file paths and URLs.

While certain portions of this description emphasize the analysis of executables for detection of suspiciousness or the identification of intermediate threats, it should be understood that the term "threat sample" is not so limited. Other threat samples based on, e.g., files, caches, or other data sources may be used. Events, e.g., in a filtered event stream may also or instead be used, and the techniques described herein for use with code samples are also generally applicable to other threat samples instead of explicit computer code such as network activity, content, event streams that identify activities or behaviors, and so forth. Thus, for example, activities such as visiting a particular URL, opening an attachment, sending an electronic mail, or other events may also or instead be analyzed as threat samples by an integrative model or other threat detection tools to identify potential malware threats on an endpoint or group of endpoints.

As shown in step 810, the method 800 may include displaying the intermediate threat(s) and supplemental information in a user interface for user disposition, or otherwise augmenting a description of the new threat sample in a user interface with the supplemental information. This may, for example, include presenting a description of the new threat sample, the one or more relevant features, and the similar threat samples in a user interface. In one aspect, the method may include displaying a list of the similar threat samples ranked according to similarity to the new threat sample using, e.g., a k-nearest neighbor algorithm or any other suitable technique for measuring similarity. This may, for example, include similarity of executable code, similarity of behaviors, similarity of filenames, similarity of URL's called, or similarity of any other objective feature or combination of features that can be correlated to risk (or lack of risk). In one aspect, a number of the most similar safe samples and a number of the most similar unsafe samples may be presented together, and ranked, e.g., based on relative threat or based on similarity. The threat samples may be displayed along with descriptive information, attributes, behavioral characteristics, metadata and so forth, as well as any other information that might help a human user assess relative similarity when disposing of the current, new threat sample.

More generally, any supplemental information that might be helpful to a user in assessing a new threat sample may usefully be gathered and displayed to the user. For example, this may include augmenting the description of the new threat sample with a reputation of the new threat sample, e.g., based on reputation information available from a threat management facility. This may also or instead include augmenting the description of the new threat sample with a suspiciousness score based on a genetic analysis of features of the new threat sample. In another aspect, this may include augmenting the description of the new threat sample with contextual information such as users, related processes, associated data sources or files used by the threat sample, signature analysis, behavioral analysis, software update history or status for the endpoint, and so forth.

As shown in step 812, the method 800 may include disposing of the intermediate threat(s), such as by receiving user input through the user interface categorizing the new threat sample as safe, unsafe, or undetermined. Thus, in one aspect, the user interface may be configured to receive a user input categorizing the new threat sample as safe, unsafe, or undetermined. Where a disposition as unsafe does not automatically initiate a remedial action, the user interface may also be configured to receive an express instruction for a remedial action such as any of the remedial actions described herein, or any other actions suitable for disposing of or otherwise managing a new threat. In another aspect, the user interface may be configured to receive user input to adjust filtering of an event stream from an endpoint that provided the new threat sample, which may permit an increase or decrease in the amount of event reporting from the endpoint instead of, or in addition to, a specific characterization of the new threat sample.

In another aspect, a system as contemplated herein includes a memory storing a first model for evaluating a likelihood that a threat sample is at least one of safe or malicious, a second model characterizing a manner in which a number of human-interpretable features contribute to an evaluation of suspiciousness of a file, and a third model for evaluating similarity of threat samples. The system may include a threat management facility including a processor configured to apply the first model to identify a new threat sample as an intermediate threat when the new threat sample is not within a predetermined likelihood of being malicious or safe according to the first model. The system may also include a web server configured to present a user interface including a description of the intermediate threat, augmented by one or more features of the intermediate threat identified with the second model and one or more similar threat samples identified with the third model, the web server further configured to receive input from a user through the user interface disposing of the intermediate threat. Disposing of the intermediate threat may include remediating the intermediate threat. Disposing of the intermediate threat may also or instead include characterizing the intermediate threat as safe, unsafe, or undetermined.

Figure 9:
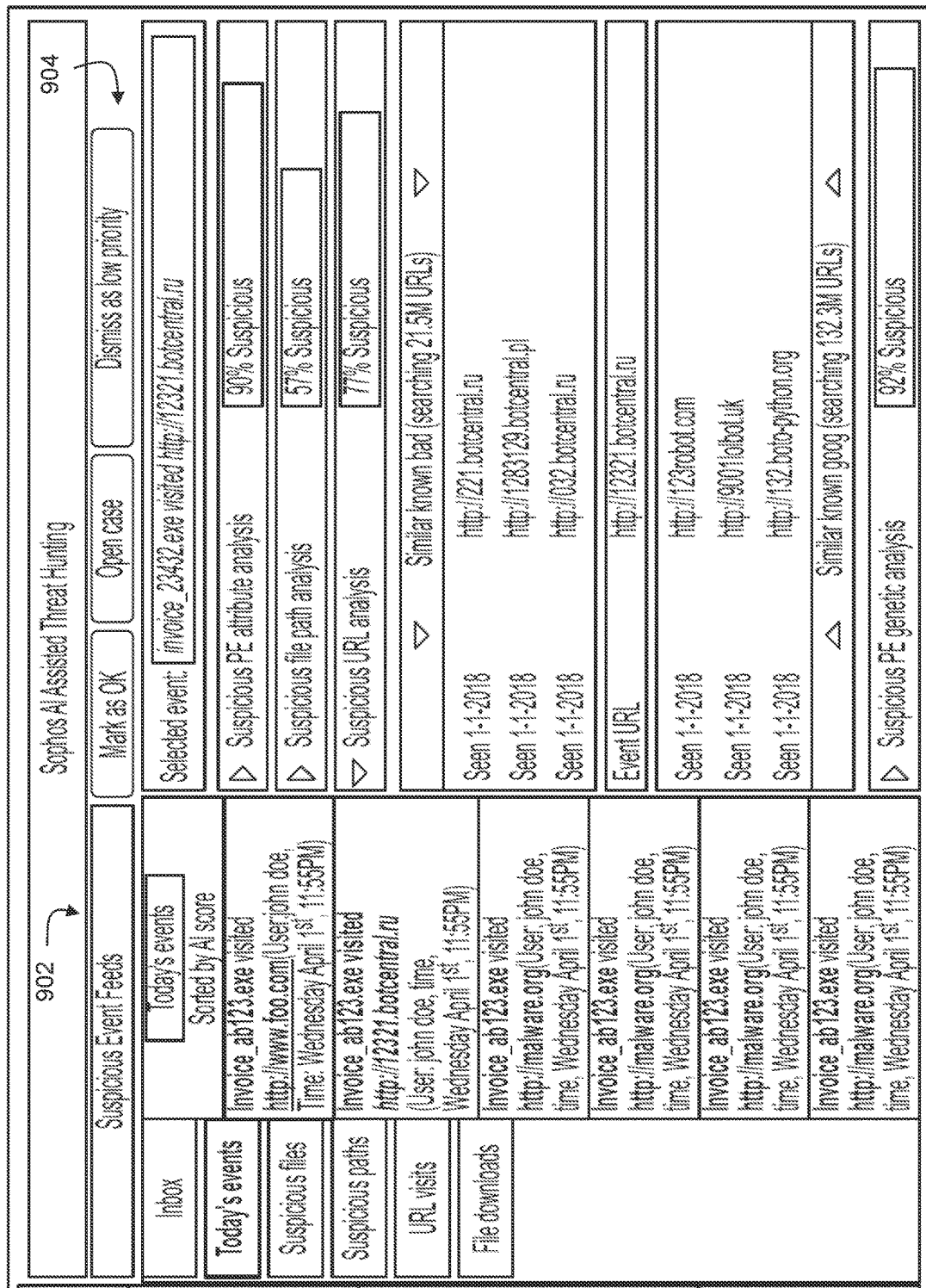
FIG. 9 shows a user interface for managing intermediate threats in an enterprise network.

FIG. 9 shows a user interface for managing intermediate threats in an enterprise network. The user interface 900 may be provided, e.g., as a web page or other content presented from the threat management facility for display on a user device such as an end user endpoint. The user interface 900 may show a feed 902 of suspicious events. The events within this feed 902 may be sorted, e.g., into files, URL visits, executables, processes, downloads, and so forth, or any other useful categories for review, or the events may be combined into a single feed. As noted above, threat samples may include executable code, however, the techniques contemplated herein may also or instead be applied to threat samples such as files, network activity, or streams of event data.

A variety of tools 904 for explicit disposition of new threat samples may be provided. For example, the user interface 900 may include tools 904 such as buttons or similar controls for a user to mark a particular event as, e.g., safe, unsafe, low priority, unknown, or the like. The user interface 900 may also provide controls for querying the enterprise network for additional information, for adjusting filtering of event streams from endpoint data recorders, for initiating scans or other analysis, and so forth.

In one aspect, the user interface 900 may display a window 906 with more granular information about features contributing to suspiciousness. For example, an analysis of a threat sample may return a 90% suspicion of malicious code, while a file path analysis may return a 57% suspicion, and a URL analysis may return a 77% suspicion. While an integrative model may combine these various features into a single estimate of suspiciousness or potential risk, the individual values may be useful to a user attempting to manually dispose of an intermediate threat. Furthermore, for any particular feature (e.g., the URL analysis in FIG. 9), a number of most similar events or threat samples for that feature may be displayed, with similarity evaluated using, e.g., a k-nearest neighbor algorithm or other algorithm for evaluating similarity within a feature space. These more granular estimates of suspiciousness may be presented in separate sub-windows, which may usefully be arranged in an accordion, a stacked group of drop-down lists, or any other suitable control element or combination of control elements that permits each type of estimate to be expanded or collapsed under user control.

Figure 10:
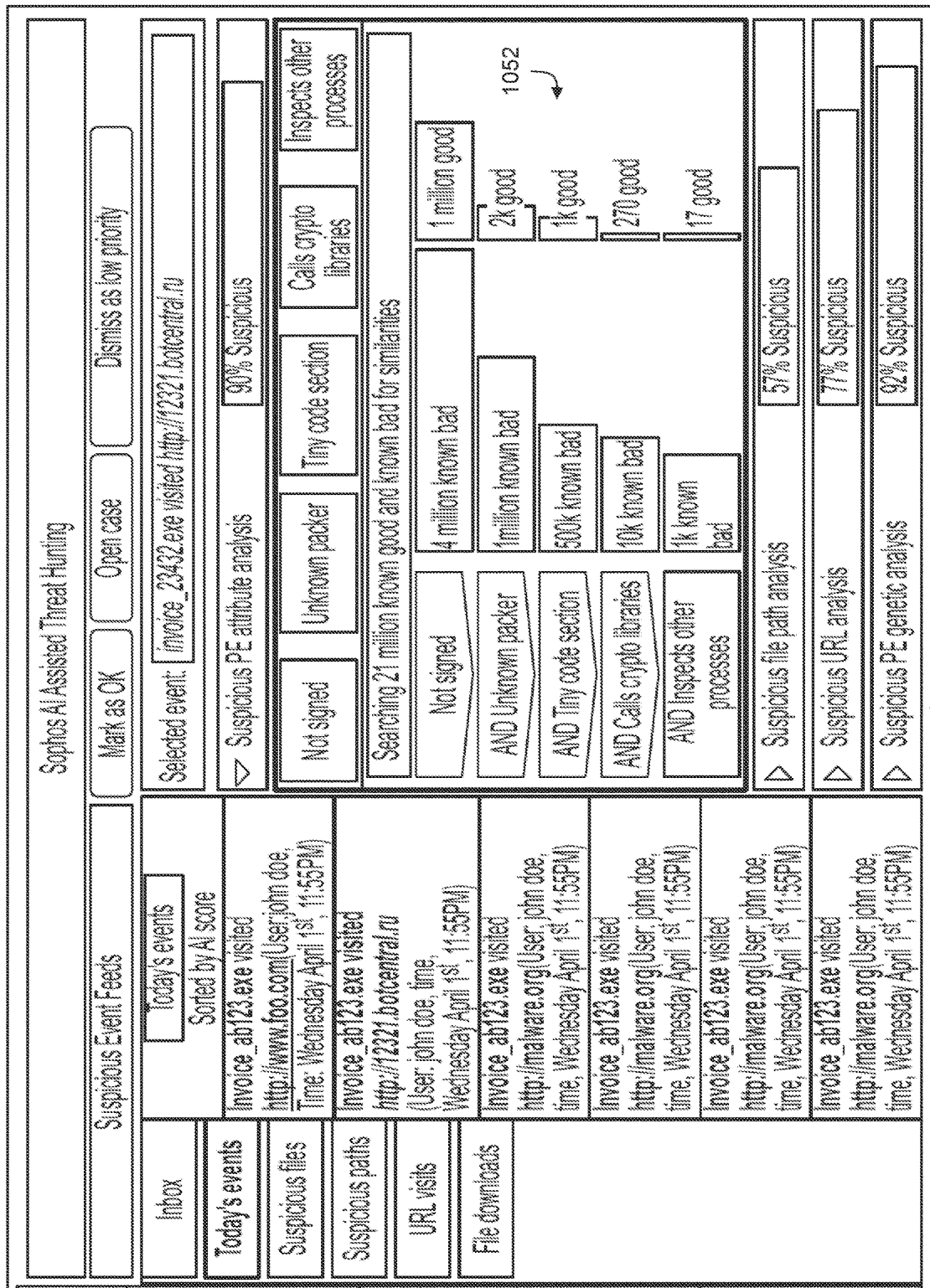
FIG. 10 shows a user interface for managing intermediate threats in an enterprise network.

FIG. 10 shows a user interface for managing intermediate threats in an enterprise network. The user interface 1050 may, for example, include any of the user interfaces described herein.

In one aspect, the user interface 1050 may show a window 1052 listing human interpretable features contributing to an estimate of suspiciousness. For example, the user interface 1050 may present particular features in the window 1052 such as whether a threat sample is signed, whether the threat sample calls cryptographic libraries, and whether the threat sample inspects other processes. For each such feature, the user interface 1050 may further present the number of known good and known bad threat samples for that feature, with the features progressively nested according to the hierarchy of a random decision forest.

The features displayed in this list may be a subset of features in a random forest over human-interpretable features that is selected based on relevance, e.g., how strongly indicative those features are of safety or suspiciousness. In one aspect, this may include features that are most heavily weighted on a percentage basis toward safety or suspiciousness. In another aspect, this may include features with the largest number of relevant samples (e.g., higher up the decision tree). In another aspect, these and any other factors may be weighted or otherwise collectively evaluated to select a subset of features for display to a user. This approach may usefully assist a human user when evaluating an intermediate threat for manual disposition by providing a display of features that contribute more significantly or most significantly to the potential risk associated with a threat sample.

In another aspect, the user interface may provide a display of the random forest output (e.g., quantitative data about various human-interpretable features), or a display of most similar safe and unsafe threat samples, or some combination of these. For example, the user interface may provide one or more user controls for the user to select among these different analyses, and/or other analyses, contextual information, or other supplemental information.

Figure 11:
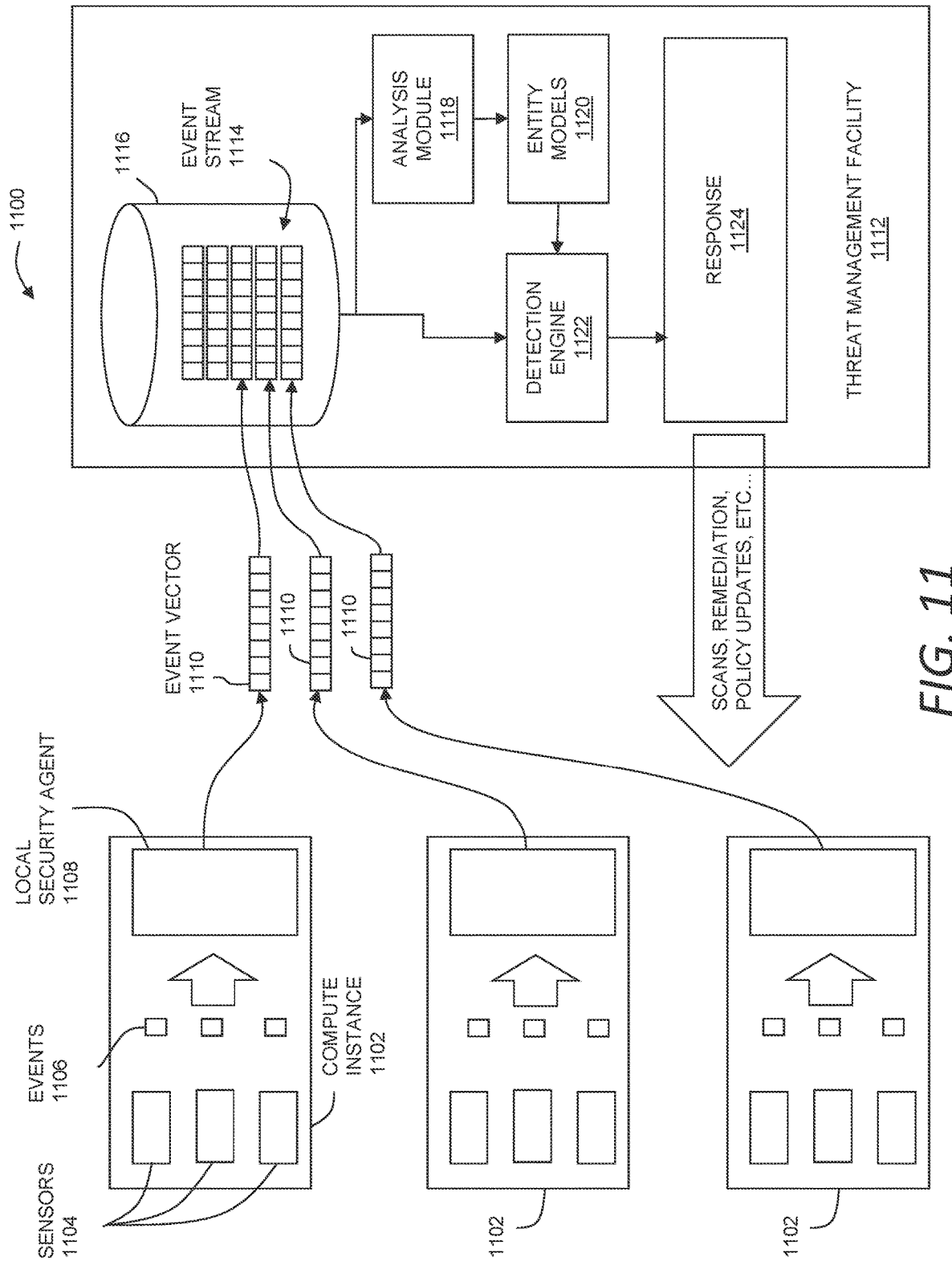
FIG. 11 shows a system for event monitoring and response.

FIG. 11 shows a system for event monitoring and response. In general, the system may include a number of compute instances 1102 that use local security agents 1108 to gather events 1106 from sensors 1104 into event vectors 1110, and then report these event vectors 1110 to a threat management facility 1112. The threat management facility 1112 may store the event vectors 1110 from a number of compute instances 1102 as a data stream 1114 in a data repository 1116 such as a memory or other data store of the threat management facility 1112. The event stream 1114 may be analyzed with an analysis module 1118, which may in turn create entity models 1120 useful for detecting, e.g., unexpected variations in behavior of compute instances 1102. A detection engine 1122 may be applied to the event stream 1114 in order to detect unusual or malicious activity, e.g., based on the entity models 1120 or any other techniques. Where appropriate, the threat management facility 1112 may deploy responses to the compute instances 1102 using a response facility 1124.

The compute instances 1102 may be any of the compute instances described herein, including without limitation any physical device such as a laptop, desktop, gateway, router, firewall, smartphone, tablet, or the like, as well as a virtualized instance of any of the foregoing or any other computer, user device, container, or the like. The sensors 1104 and events 1106 may also generally be any of the sensors and events described herein. The local security agent 1108 may be any of the security agents described herein, or any other software component or the like executing on or in association with one of the compute instances 1102 to locally manage security of the compute instance and/or coordinate security services with the threat management facility 1112 and other remote resources.

The local security agent 1108 may collect events 1106 from sensors 1104 on the compute instance 1102, and form the collected events 1106 into event vectors 1110 for communication to the threat management facility 1112. The sensors 1104 and/or local security agent 1108 may usefully process events 1106 in a number of ways in order to facilitate communication, computational efficiency, or downstream processing. For example, events 1106 may be tokenized. That is, a process that causes or creates an event 1106 may be assigned a number or other identifier, which may be used locally by a compute instance or globally within the enterprise to identify a particular, known process. An event 1106 may also encode (tokenized or otherwise) a relationship among different processes. For example, for a particular process that caused an event 1106, a parent-child relationship or other dependency with other processes may be encoded by providing process identifiers or the like within the event 1106, along with information characterizing the relationship among the processes. A Uniform Resource Locator or other information for identifying resources or network locations may also be tokenized or otherwise processed to support efficiency, consistency, and the like. For example, a URL may be encoded in an event 1106 as a hash of a URL, or as a portion of a URL, or some combination of these (e.g., a literal encoding of the top level domain, and a hash of some or all of the remaining path information). Other events 1106 such as registry changes, system calls, remote procedure calls and the like may be literally encoded into an event 1106 where they are relatively compact, or identified using any suitable tokenization, compression, or the like.

Other techniques may also or instead be used. For example, user-specific or machine-specific information may be altered where appropriate to anonymize the event vectors 1110 and mitigate exposure of sensitive information during network communications. An event vector 1110, or individual events 1106 therein, may also or instead be encrypted in order to secure the contents against malicious interception. In another aspect, the events 1106 or event vectors 1110 may be compressed to conserve network resources. The event vectors 1110 may also or instead be prioritized, e.g., in order to increase sensitivity and decrease response times for event vectors 1110 associated with a high likelihood of malicious activity. In this latter aspect, the local security agent 1108 may locally analyze events 1106 and/or event vectors 1110 in order to permit suitable prioritization, as well as to support local detection and response to malicious, or potentially malicious activity.

It will also be appreciated that events 1106 and/or event vectors 1110 may usefully be labelled in a variety of ways. While labeling with process identifiers is described above, this may also or instead include an identification of an entity associated with the event 1106 or event vector 1110. In this context, the entity may be any physical, logical, or conceptual entity useful for monitoring activity of compute instances 1102 as described herein. For example, the entity may include a user, a physical device, a virtualized machine, an operating system, an application, a process, a hardware subsystem (e.g., a network interface card, USB drive, camera, etc.), a network resource, a domain controller, a remote software service, and so forth. It should also be understood that the various entity types may be concurrently associated with a particular event 1106, sensor 1104, or event vector 1110, or particular events 1106 may be associated with multiple entities or event vectors 1110. Thus, for example, storing a file may be an event 1106 associated with a particular user, a particular machine, a particular operating system, a particular physical storage device, and so forth.

In one aspect, the event vectors 1110 may be organized around entities. Thus, for example, a request for access to a network resource may be an event 1106. When such a request is initiated by a user, an event vector 1110 for that user may be created and reported along with other temporally adjacent or otherwise related events 1106 associated with that user. Where the network request involves an interaction with, e.g., an authentication and identity management system, this may be represented as another entity, or as an event 1106 (or group of events 1106) in the event vector 1110 for the user. At the same time, a second event vector 1110 for the compute instance 1102 may also be created and reported along with other temporally adjacent or otherwise related events 1106 associated with that compute instance 1102. Alternatively, the event vectors 1110 may be organized around chronology. That is, groups of events 1106 within a window of time may be reported as an event vector 1101. The event vectors 1110 may also or instead be organized around other aspects of the system 1100, such as particular sensors 1104 or groups of sensors 1104, causal relationships among events 1106, particular triggers, types of activity (e.g., network communications, operating system, processes, etc.) and so forth. In general, the source of each event 1106, such as a particular sensor 1104, or some entity, computing object or the like associated with the sensor 1104, may be encoded with the event 1106 to permit explicit identification by the threat management facility 1112 or other downstream processing resources. Although depicted in FIG. 11 as having similar size, it will also be understood that the event vectors 1110 may be any size, and may usefully encode any number of different events 1106.

The event vectors 1110 may be received by the threat management facility 1112 and stored as an event stream 1114 in a data repository 1116, which may be any data store, memory, file or the like suitable for storing the event vectors 1110. The event vectors 1110 may be time stamped or otherwise labeled by the threat management facility 1112 to record chronology. In general, the event stream 1114 may be used for analysis and detection as further described herein.

In general, an analysis module 1118 may analyze the event stream 1114 to identify patterns of events 1106 within the event stream 1114 useful for identifying unusual or suspicious behavior. In one aspect, this may include creating entity models 1120 that characterize behavior of entities, such as any of the entities described herein. Each entity model 1120 may, for example, include a multi-dimensional description of events 1106 for an entity based on events 1106 occurring over time for that entity. This may be, e.g., a statistical model based on a history of events 1106 for the entity over time, e.g., using a window or rolling average of events 1106.

The entity models 1120 may, for example, be vector representations or the like of different events 1106 expected for or associated with an entity, and may also include information about the frequency, magnitude, or pattern of occurrence for each such event 1106. In one aspect, the entity model 1120 may be based on an entity type (e.g., a particular type of laptop, or a particular application), which may have a related event schema that defines the types of events 1106 that are associated with that entity type. This may usefully provide a structural model for organizing events 1106 and characterizing an entity before any event vectors 1110 are collected, and/or for informing what events 1106 to monitor for or associate with a particular entity.

As an event stream 1114 is collected, a statistical model or the like may be developed for each event 1106 represented within the entity model so that a baseline of expected activity can be created. In one aspect, an existing model may be used, e.g., when the entity or entity type is already known and well characterized. The entity model may also or instead be created by observing activity by the entity (as recorded in the event stream 1114) over time. This may include, for example, monitoring the entity for an hour, for a day, for a week, or over any other time interval suitable for creating a model with a sufficient likelihood of representing ordinary behavior to be useful as a baseline as contemplated herein. In one practical example, certain software applications have been demonstrated to yield a useful baseline within about two weeks. It will also be understood that, once an entity model is created, the entity model may usefully be updated, which may occur at any suitable intervals according to, e.g., the length of time to obtain a stable baseline, the amount of activity by the entity, the importance of the entity (e.g., to security, operation of a compute instance 1102, and so forth), or any other factors.

These techniques may be used to create an entity model 1120 for any of the entities described herein, including without limitation physical hardware items, virtualized items, software items, data and date stores, programming interfaces, communications interfaces, remote resources, and so forth, or any of the other entities, computing objects, assets or the like described herein. In one aspect, the entities may be arranged around a conceptual stack for an endpoint in an enterprise network, such as by providing entities for a domain controller, a compute instance, a user, an operating system, a library, an application, a process, and data. This may also or instead include any of a number of physical devices such as a laptop, a desktop, a gateway, a router, a firewall, a smartphone, a tablet, a personal computer, a notebook, a server, a mobile device, an IoT device. The entity may also or instead include hardware subsystems such as a peripheral, a keyboard, a mouse, a display, a network interface card, a USB drive, a camera, a disk drive or other physical storage device, and so forth. The entity may also or instead include a virtualized instance of any of these physical devices or systems, or any other virtualized compute instance or other computing resource such as a virtual machine, a hypervisor, or the like. In another aspect, this may include computing objects or resources such as a container, an operating system, a library, an application, a process, a file or other data, or the like. An entity may also or instead include remote resources, such as a cloud computing resource, cloud data resource, remote software service, or any other network resource or the like. An entity may also include other entities such as a user or related identity, or more specific system resources such as a kernel driver, system registry, process cache, and so forth. More generally, any physical, virtual, logical, or other computing resource, asset, or the like that can usefully be instrumented and/or monitored to provide events for use as contemplated herein may be an entity as that term is used in this description.

As noted above, the entities of interest here may exist non-exclusively at various levels of hardware and software abstraction, and the entity models may similarly be of varying and overlapping scope. By way of a non-limiting example, an entity model for a laptop may include applications running on the laptop. In one aspect, the entity model may incorporate all network activity by the laptop, while in another aspect, network activity may be associated with the entity models for specific applications. Or the network activity may be associated with both entities, e.g., such that a single event is incorporated into multiple event vectors associated with multiple entities. In general, these design choices may affect the granularity of detections, the amount of processing and communications overhead, and so forth, and any such variations consistent with deployment within an enterprise network as contemplated herein are intended to fall within the scope of this disclosure.

According to the foregoing, in one aspect an entity model may contain a schema or the like describing events associated with an entity (or a type of entity), along with information about normal or expected behavior for each event 1106 associated with the entity. In one aspect, an entity type (e.g., laptop, or laptop by manufacturer X, or virtual machine in environment Y) may be used to select a schema for an entity model, while activities of a particular instances of that entity type may be used to generate the baseline for the entity model used in detections and the like. Thus, for example, if a user installs an office productivity suite, an entity model for that entity type may be selected based on the types of events 1106 known to be associated with the use the application, or the capabilities of the application. However, different users may use the software differently, so the baseline of expected behavior may be evaluated for a particular installation of the application by monitoring activity of the application over time. In another aspect, the schema for an entity model may itself be extensible. That is, the schema of different events 1106 may be created based on observations of activity associated with the entity. When a new type of event 1106 is detected for that entity, the event 1106 may be added to the schema for a corresponding entity type.

Once an entity model 1120 has been created and a stable baseline established, the entity model 1120 may be deployed for use in monitoring prospective activity. This monitoring may, for example, use the same event stream 1114 that was used to create the entity model 1120, or a filtered or otherwise processed version of the event stream 1114. It will be appreciated that the entity models 1120 may generally be deployed as fixed or relatively static or discrete models, or any one or more of the entity models 1120 may be continuously updated so that they change over time as new information becomes available, e.g., in the event stream 1114 or otherwise.

The detection engine 1122 may compare new events 1106 generated by an entity, as recorded in the event stream 1114, to the entity model 1120 that characterizes a baseline of expected activity. By representing the entity model 1120 and the event vectors 1110 in a common, or related, vector space, deviations from expected behavior can usefully be identified based on the vector distance between one or more event vectors 1110 and the entity model 1120. This comparison may usefully employ a variety of vector or similarity measures known in the art. For example, the comparison may use one or more vector distances such as a Euclidean distance, a Mahalanobis distance, a Minkowski distance, or any other suitable measurement of difference within the corresponding vector space. In another aspect, a k-nearest neighbor classifier may be used to calculate a distance between a point of interest and a training data set, or more generally to determine whether an event vector 1110 should be classified as within the baseline activity characterized by the entity model.

It will be understood that, while event vectors 1110 and entity models 1120 as described herein provide one useful technique observing deviations from a baseline of expected behavior by entities within an enterprise, the detection engine 1122 may also or instead employ other detection techniques based on the event stream 1114, e.g., to support real time detection of suspicious or malicious behavior. For example, certain events 1106 may be independently and directly indicative of malicious activity, such as initiating communications with a known command and control center for an advanced persistent threat. Other events 1106 may be potentially indicative of malicious activity, such as initiating disk-wide encryption or transmitting sensitive information from an endpoint. While tools exist for detecting these types of malicious activity, relevant events 1106 may be present in the event stream 1114, and the response facility 1124 may usefully trigger additional analysis, investigation, or other responses based on the event stream 1114 instead of or in addition to monitoring for deviations from entity baselines. In another aspect, concurrent deviations by different entities, or a pattern of deviations for a single entity or among entities, may also be usefully monitored. For example, a deviation in the behavior of a trusted application across multiple compute instances 1102, either concurrently or in succession, may indicate a rollout of a software update rather than malicious behavior. Conversely, if a number of compute instances 1102 concurrently begin contacting an unknown network address, this may be an indication of malware propagating among devices in an enterprise network. More generally, deviations among different entities, or among multiple instances of a particular entity, may provide useful information about actual or potential causes of the change, and may inform subsequent manual or automated investigations.

In general, where the event stream 1114 deviates from a baseline of expected activity that is described in the entity models 1120 for one or more entities, any number of responses may be initiated by the response facility 1124 of the threat management facility 1112. In one aspect, this may include deployment of known remediations for malicious activity such as quarantine, termination of network communications, termination of processes or applications, an increase in local monitoring activity on affected compute instances 1102, messages to a network administrator, filtering of network activity, antivirus scans, deployment of security patches or fixes, and so forth. This may also in policy updates. For example, security policies for compute instances 1102, users, applications or the like may be updated to security settings that impose stricter controls or limits on activity including, e.g., limits on network activity (bandwidth, data quotas, permitted network addresses, etc.), limits on system changes (e.g., registry entries, certain system calls, etc.), limits on file activity (e.g., changes to file permissions), increased levels of local activity monitoring, and so forth.

Figure 12:
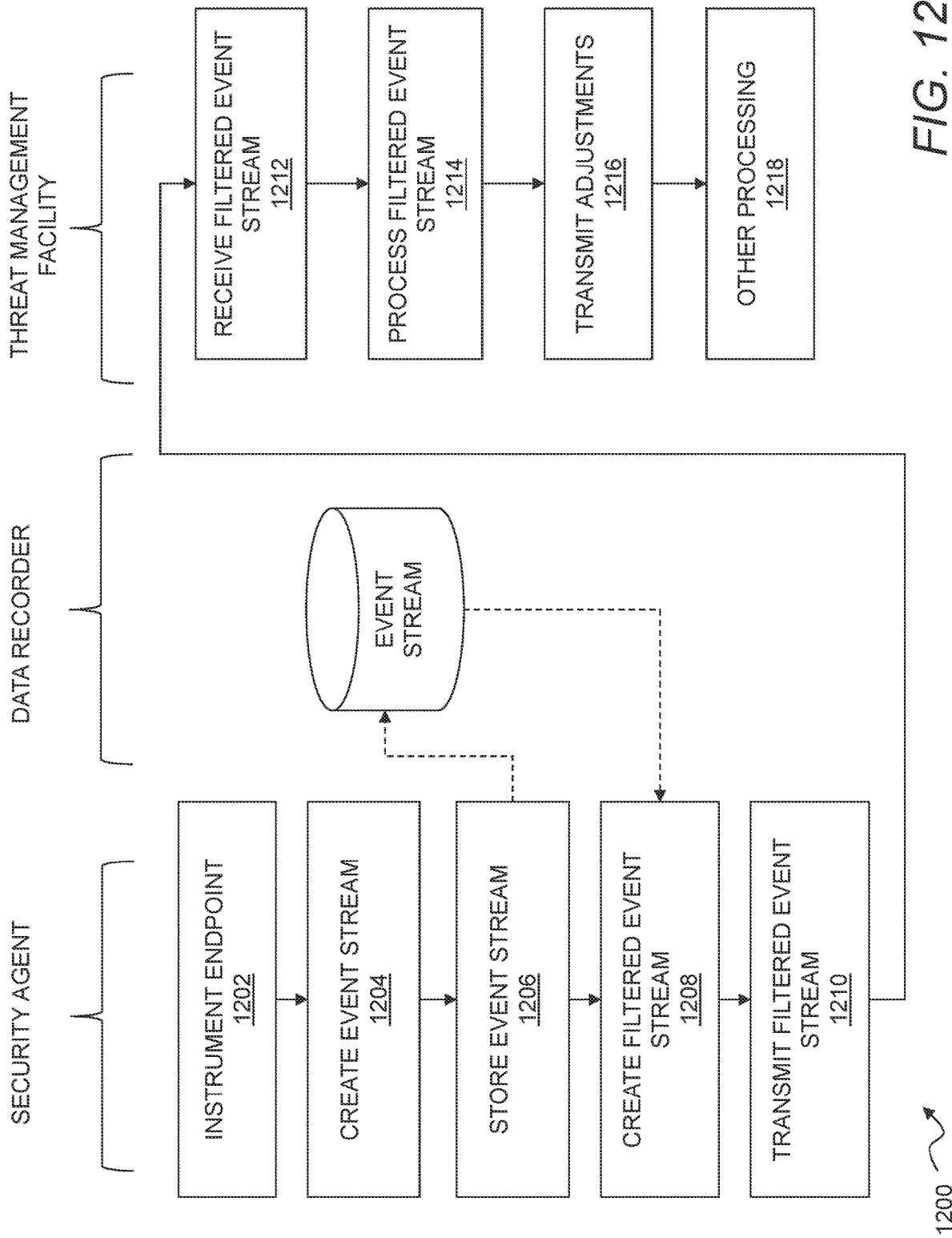
FIG. 12 shows a flow chart of a method for dynamic filtering of endpoint event streams.

FIG. 12 shows a flow chart of a method for dynamic filtering of endpoint event streams. In general, activity on an endpoint is monitored in two stages with a local agent. In a first stage, particular computing objects on the endpoint are selected for tracking. In a second stage, particular types of changes to those objects are selected. By selecting objects and object changes in this manner, a compact data stream of information highly relevant to threat detection can be provided from an endpoint to a central threat management facility. In order to support dynamic threat response, the locus and level of detection applied by the local agent can be controlled by the threat management facility.

As shown in step 1202, the method 1200 may include instrumenting the endpoint, e.g., with a local agent, to detect a plurality of types of changes to a plurality of computing objects. In general, the changes may be any of the events or other actions described herein, and the computing objects may be any of the computing objects described herein. For example, the computing objects may include a number of files, a number of processes, and/or a number of executables. The computing objects may also or instead include one or more of an electronic communication, a registry of system settings, a secure kernel cache, or any other data or data structure stored on an endpoint or communicated to or from the endpoint. Similarly, the types of changes may be any types of changes that might usefully be monitored in a threat management context as contemplated herein. For example, the endpoint may be instrumented to detect file reads and writes, but not file opens or closes. Or the endpoint may be instrumented to monitor inbound and outbound electronic mail, but not outbound electronic mail to other users within the enterprise. As another example, the endpoint may be instrumented to monitor changes to operating system registry entries by non-system processes, or to monitor read/write activity that substantially increases file entropy. More generally, any types of changes that might contribute to a determination of suspiciousness or safety can usefully be monitored, with instrumentation of suitable, corresponding computing objects, all as contemplated herein.

As shown in step 1204, the method 1200 may include creating an event stream from the local agent including each type of change to each of the computing objects detected on the endpoint.

As shown in step 1206, the method 1200 may include storing the event stream in a data recorder on the endpoint. This may generally be an unfiltered event stream containing additional event data not including in a filtered event stream that is sent to a threat management facility, and may include some or all of the event data that the endpoint is instrumented to detect. For example, the unfiltered event stream may include additional ones of the plurality of types of changes to the plurality of computing objects in a filtered event stream, or changes to additional ones of the plurality of computing objects not included in the filtered event stream.

As shown in step 1208, the method 1200 may include processing the event stream with a filter at the endpoint to provide a filtered event stream including a subset of the types of changes to a subset of the computing objects. In one aspect, the subset of computing objects includes one or more of a file, an executable, a process, a database, and a message. In another aspect, the types of changes include at least one of a file read, a file write, a file copy, a file encrypt, a file decrypt, a network communication, a registry update, a software installation, a change in permissions, and a query to a remote resource. It will be understood that, while the filtered event stream is illustrated as flowing from the event stream stored by the data recorder, the filtered event stream may also or instead be created directly by a security agent as the unfiltered event stream is captured and forwarded to the data recorder for storage.

Processing the event stream with the filter may also include locally adjusting the filter at the endpoint, e.g., in response to local changes detected on or by the endpoint. For example, the level of filtering may be locally adjusted by the endpoint based on a reputation score for one or more processes, files, or the like on the endpoint. This filtering may be done for all detectable events on the endpoint, or for specific processes. Thus, for example, when a reputation for a new process or other computing object is unknown, the endpoint may decrease filtering to provide greater data reporting to the threat management facility for that particular process. Thus, while step 1216 below contemplates controlling the filter from a central threat management facility or the like, the filter may also or instead be controlled locally on an endpoint in response to changes in security posture, policy compliance posture, or any other events, context, malware detections, and so forth.

In one aspect, the filtered event stream may be arranged around anchor points such as a file, a domain name, or any other useful piece of data or metadata for which the presence can be monitored on an endpoint. For example, a file hash may be created for a file and used to test for the presence of that file on endpoints throughout an enterprise. Whenever this anchor point, e.g., the corresponding file hash, is detected on an endpoint, a collection of related events, metadata, context and so forth may be added to the filtered event stream for reporting to a central threat management facility.

In another aspect, the level of filtering may be locally controlled based on factors or requirements other than threat detection. For example, an event stream may be filtered to remove personal identifying information, e.g., for compliance with data privacy regulations. As another example, filtering may be controlled based on network usage restrictions, e.g., so that a particular endpoint does not exceed a predetermined hourly, daily, or weekly quota of bandwidth for event reporting.

Further, it will be understood that the filtered event stream may include synthetic events that characterize other collections of events in a single event or condensed group of events. This approach advantageously permits more compact communication of relevant information to a threat management facility, as well as more compact storage of information on the endpoint. In one aspect, the synthetic events may be stored by the data recorder in place of (e.g., to reduce memory requirements) or in addition to (e.g., to reduce communications requirements while preserving a more complete log or related activity) more detailed logging of granular events on the endpoint. In another aspect, the data recorder may store complete event details, and the endpoint may (e.g., with the security agent) create synthetic events dynamically to facilitate more compact communication to the threat management facility.

As shown in step 1210, the method 1200 may include transmitting the filtered event stream to a threat management facility. The filtered event stream may be transmitted at any suitable frequency including periodic, aperiodic, or other scheduled transmittal, as well as pushed transmittal (e.g., at intervals determined by the endpoint) or pulled transmittal (e.g., at intervals determined by the threat management facility, or any combination of these. Thus, for example, the endpoint (or security agent on the endpoint) may periodically report the filtered event stream on a predetermined schedule, with supplemental transmittals provided when the security agent detects a potential threat, or requested when the threat management facility detects a potential threat.

As shown in step 1212, the method 1200 may include receiving the filtered event stream at the threat management facility.

As shown in step 1214, the method 1200 may include processing the filtered event stream at the threat management facility to evaluate a security state of the endpoint. This may include any processing suitable for analyzing the events within the filtered event stream. For example, processing the filtered event stream may include searching for potential malicious activity on the endpoint, e.g., based on a pattern of activities within the filtered event stream, or based on a specific activity such as an unauthorized change to a registry entry. Processing the filtered event stream may also or instead include searching for a security exposure on the endpoint such as a missing security patch, a change in a firewall configuration, a de-installation of a malware scanner, and so forth. In another aspect, processing the filtered event stream may include securely verifying a status of the endpoint, e.g., with a secure heartbeat or the like from the endpoint, in order to ensure that the endpoint has not been otherwise compromised. In another aspect, processing the filtered event stream may include monitoring for changes that bring the endpoint out of compliance with a security policy for an enterprise, or otherwise present an actual or potential risk to network security for the enterprise.

As shown in step 1216, the method 1200 may include conditionally transmitting adjustments to filtering by the endpoint. For example, the method 1200 may include, in response to a predetermined security state detected by the threat management facility, transmitting an adjustment to the endpoint for at least one of the types of changes or the computing objects used by the filter to process the event stream. This may include transmitting an adjustment to a filter used by the endpoint to select which of the plurality of types of changes to the plurality of computing objects the data recorder reports in the filtered event stream. Thus, for example, when the security state indicated by the filtered event stream is a potentially compromised state of a file, process or the like, the threat management facility may decrease filtering in order to receive more data about various changes to or by computing objects on the endpoint. This may include general changes to the level of filtering, or targeted changes that focus on specific computing objects or types of changes that might be related to a potential compromise. In one aspect, the adjustment to endpoint filtering may include a change to the subset of types of changes included in the filtered event stream, such as by increasing the types of changes included in the filtered event stream when the endpoint is potentially compromised, or decreasing the types of changes included in the filtered event stream when a potential compromise has been remediated. The adjustment may also or instead include a change to the subset of computing objects included in the event stream, such as by monitoring additional processes, directories or the like when a potential compromise is detected.

Adjustments may also be made to filtering by other endpoints within an enterprise network. For example, where a compromise is detected on one endpoint, behaviors or other patterns detected in the (filtered) event stream for that endpoint may be used to adjust the filtering on other endpoints to facilitate the detection of similar or related patterns elsewhere within the enterprise network. Similarly, endpoints or data resources known to contain high business value assets may have filtering adjusted to facilitate more detailed and frequent monitoring of related assets.

In another aspect, filtering may be adjusted independently of the current filtered event stream, e.g., based on other context. For example, when an employee is about to leave a company, filtering may be reduced on or removed from any associated compute instances so that computing or network activity can be more closely monitored until departure.

As shown in step 1218, the method 1200 may include other processing based on the filtered event stream. For example, the method 1200 may include correlating the filtered event stream to a malware event on the endpoint and searching for the malware event on one or more other endpoints coupled to the enterprise network based on a pattern of events in the filtered event stream. In another aspect, the method 1200 may include storing the filtered event stream at the threat management facility. In another aspect, the method 1200 may include, when the filtered event stream shows that the security state of the endpoint is compromised, initiating a remedial action, e.g., using any of the remediation tools available to the threat management facility.

According to the foregoing, there is also disclosed herein a system including an endpoint and a threat management facility. The endpoint may execute a data recorder to store an event stream including a plurality of types of changes to a plurality of computing objects detected on the endpoint, and the endpoint may execute a local agent to process the event stream with a filter into a filtered event stream including a subset of the plurality of types of changes to a subset of the plurality of computing objects. The local agent may be further configured to communicate the filtered event stream to a remote resource over a data network. The threat management facility may be configured to receive the filtered event stream from the endpoint and to process the filtered event stream to evaluate a security state of the endpoint. The threat management facility may be further configured to respond to a predetermined change in the security state by transmitting an adjustment to the endpoint for at least one of the types of changes or the computing objects used by the filter to process the event stream. In one aspect, the threat management facility may be configured to initiate a remediation of the endpoint when the security state of the endpoint is compromised.

Figure 13:
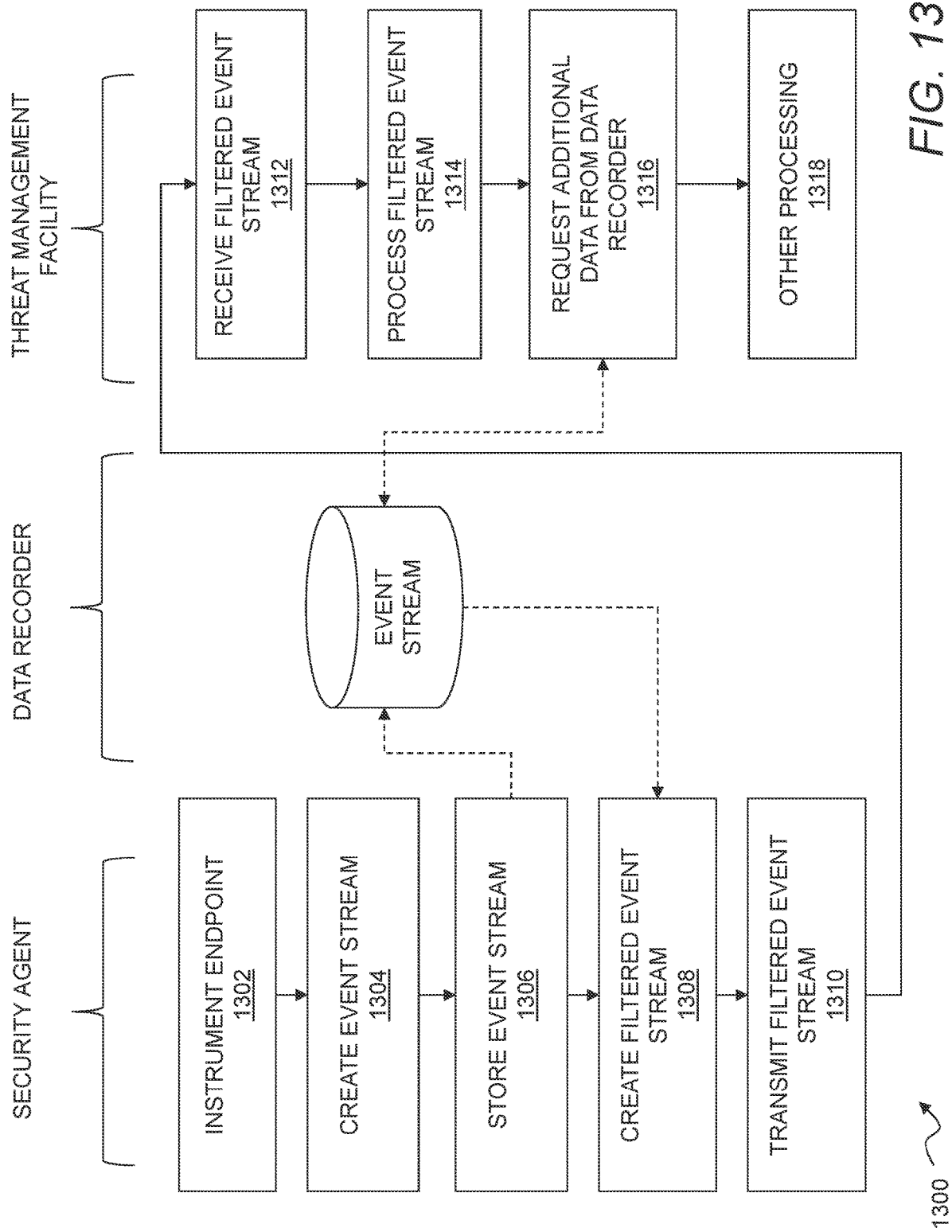
FIG. 13 shows a flow chart of a method for forensic query of local event streams in an enterprise network.

FIG. 13 shows a flow chart of a method for forensic query of local event streams in an enterprise network. In general, activity on an endpoint is monitored in two stages with a local agent. In a first stage, particular computing objects on the endpoint are selected for tracking. In a second stage, particular types of changes to those objects are selected. By selecting objects and object changes in this manner, a compact data stream of information highly relevant to threat detection can be provided from an endpoint to a central threat management facility. At the same time, a local data recorder creates a local record of a wider range of objects and changes. The system may support forensic activity by facilitating queries to the local data recorder on the endpoint to retrieve more complete records of local activity when the compact data stream does not adequately characterize a particular context.

As shown in step 1302, the method 1300 may include instrumenting the endpoint as described herein, e.g., with a local agent, to detect a plurality of types of changes to a plurality of computing objects. In general, the changes may be any of the events or other actions described herein, and the computing objects may be any of the computing objects described herein. For example, the computing objects may include a number of files, a number of processes, and/or a number of executables. The computing objects may also or instead include one or more of an electronic communication, a registry of system settings, and a secure kernel cache.

As shown in step 1304, the method 1300 may include creating an event stream from the local agent including, for example, each type of change to each of the computing objects detected on the endpoint.

As shown in step 1306, the method 1300 may include storing the event stream in a data recorder on the endpoint. As described above, this may generally be an unfiltered event stream containing additional event data not including in a filtered event stream that is sent to a threat management facility, such as some or all of the event data that the endpoint is instrumented to detect. For example, the unfiltered event stream may include additional ones of the plurality of types of changes to the plurality of computing objects in a filtered event stream, or one or more of the plurality of types of changes to additional ones of the plurality of computing objects.

As shown in step 1308, the method 1300 may include processing the event stream with a filter at the endpoint to provide a filtered event stream including a subset of the types of changes to a subset of the computing objects. In one aspect, the subset of computing objects includes one or more of a file, an executable, a process, a database, and a message. In another aspect, the types of changes include at least one of a file read, a file write, a file copy, a file encrypt, a file decrypt, a network communication, a registry update, a software installation, a change in permissions, and a query to a remote resource.

As shown in step 1310, the method 1300 may include transmitting the filtered event stream to a threat management facility, e.g., as described above.

As shown in step 1312, the method 1300 may include receiving the filtered event stream at the threat management facility.

As shown in step 1314, the method 1300 may include processing the filtered event stream at the threat management facility to evaluate a security state of the endpoint. This may include any processing suitable for the events within the filtered event stream. For example, processing the filtered event stream may include searching for potential malicious activity on the endpoint, e.g., based on a pattern of activities within the filtered event stream, or based on a specific activity such as an unauthorized change to a registry entry. Processing the filtered event stream may also or instead include searching for a security exposure on the endpoint such as a missing security patch, a change in a firewall configuration, a de-installation of a malware scanner, and so forth. In another aspect, processing the filtered event stream may include securely verifying a status of the endpoint, e.g., with a secure heartbeat or the like from the endpoint, in order to ensure that the endpoint has not been otherwise compromised. More generally, this may include any of the processing described herein that might usefully be performed by a threat management facility based on an event stream from one or more endpoints associated with an enterprise network.

As shown in step 1316, the method 1300 may include conditionally transmitting a request to the endpoint, or more specifically, the data recorder on the endpoint, for additional event data in the unfiltered event stream. For example, this may include, in response to a predetermined security state detected by the threat management facility, requesting additional event data from the data recorder for at least one of other ones of the types of changes than the subset of the types of changes or other ones of the plurality of computing objects than the subset of the computing objects. The request may include a request for all event data in an unfiltered event stream stored by the data recorder over a predetermined time window. The request may also or instead include a request for a larger group of types of changes or events from additional computing objects. The predetermined change in the security state may be any change raising suspicion or otherwise indicating that additional information may be useful for manual review, automated review, forensic documentation, or some combination of these. For example, the predetermined change in the security state of the endpoint may include an increased likelihood of malicious activity associated with the endpoint. The change may also or instead include a change in policy compliance, detection of known malware, suspicious network communications, access to highly valuable business assets, and so forth.

As shown in step 1318, the method 1300 may include other processing based on the filtered event stream. For example, the method 1300 may include correlating the filtered event stream to a malware event on the endpoint and searching for the malware event on one or more other endpoints coupled to the enterprise network based on a pattern of events in the filtered event stream. In another aspect, the method 1300 may include storing the filtered event stream at the threat management facility. In another aspect, the method 1300 may include, when the filtered event stream shows that the security state of the endpoint is compromised, initiating a remedial action, e.g., using any of the remediation tools available to the threat management facility. More generally, any action necessary or helpful for detecting, investigating, disposing of, or otherwise managing threats based on the filtered event stream may usefully be performed in this step.

According to the foregoing, in one aspect, there is disclosed herein a system including an endpoint and a threat management facility. The endpoint may execute a data recorder to store an event stream of event data including a plurality of types of changes to a plurality of computing objects detected on the endpoint. The endpoint may also execute a local agent configured to process the event stream with a filter into a filtered event stream including a subset of the plurality of types of changes to a subset of the plurality of computing objects. The local agent may be further configured to communicate the filtered event stream to a remote resource over a data network. The threat management facility may be configured to receive the filtered event stream from the endpoint and to process the filtered event stream to evaluate a security state of the endpoint, the threat management facility further configured to respond to a predetermined change in the security state by transmitting a request to the endpoint for additional event data stored by the data recorder. In one aspect, the threat management facility is further configured to initiate a remediation of the endpoint when the security state of the endpoint is compromised.

Figure 14:
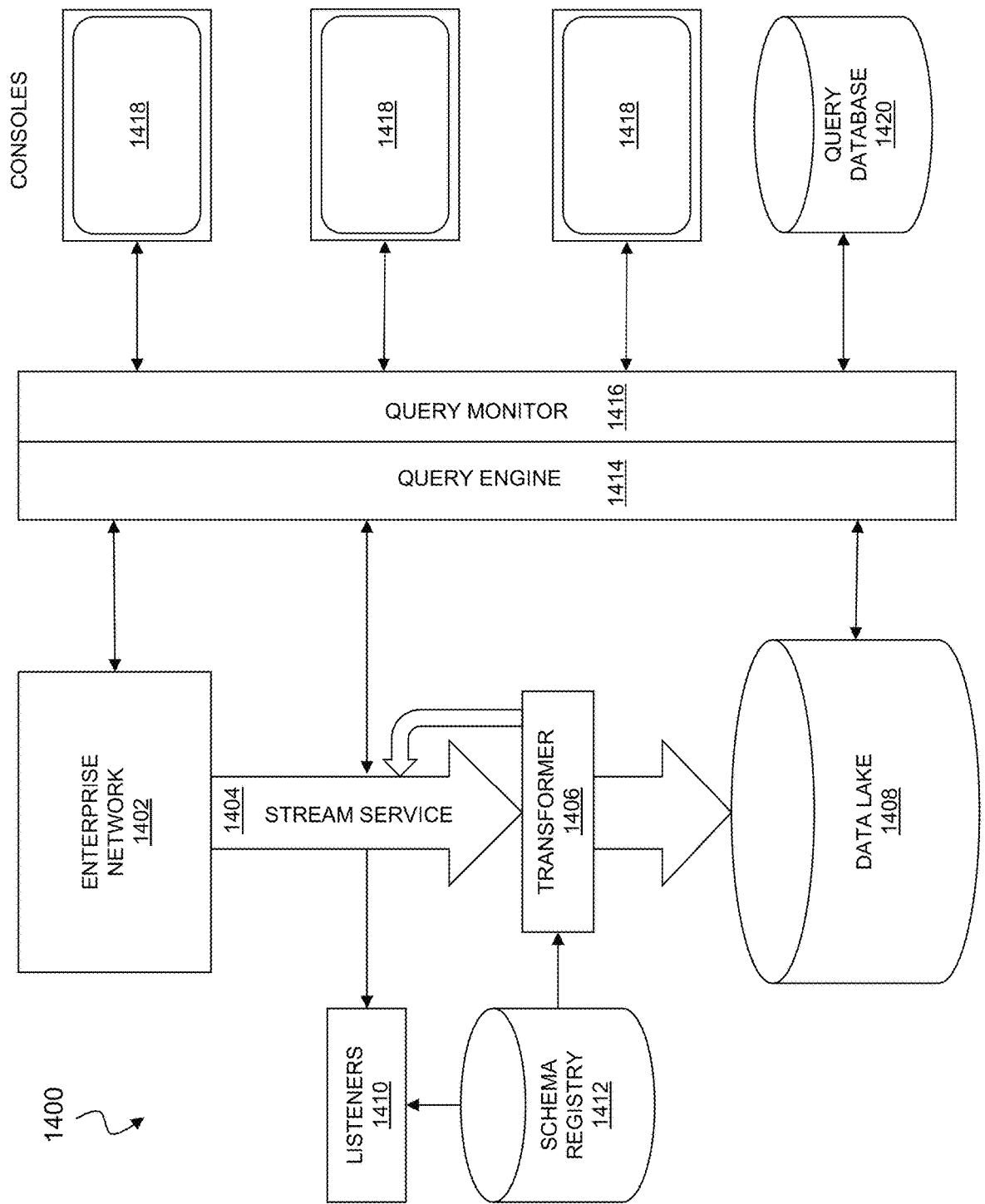
FIG. 14 shows a platform for managing data related to threat management.

FIG. 14 shows a platform for managing data related to threat management. In general, the platform 1400 may include an enterprise network 1402, a stream service 1404, a transformer 1406, a data lake 1408, and a number of listeners 1410. An event stream of events and related data in the stream service 1404 may be organized using schemas that are stored in a schema registry 1412 or similar resource available to various entities interacting with the stream service 1404 and/or data lake 1408. The platform may also include a query engine 1414 for user access to the data lake 1408 and other sources of data in the data platform 1400 (including remote resources accessible to the data platform 1400), along with a query monitor 1416 for monitoring queries and related activity and one or more consoles 1418 that provide user interfaces for the platform 1400 and the query engine 1414. A database 1420 may store queries for use by the query engine 1414, along with query histories and related activity logged by the query monitor 1416. In general, these components may cooperate to support monitoring, data storage, query, retrieval, and analysis of events and other data related to enterprise security, or any other activities useful in managing a security infrastructure as described herein. Each of the foregoing components of the platform 1400 may be realized as software, hardware, or some combination of these.

The enterprise network 1402 may include any of the endpoints described herein such as laptops, desktops, mobile devices, or other compute instances for users, as well as firewalls, gateways, and any other participants, security infrastructure, network infrastructure, or the like forming an enterprise network as described herein. In general, the enterprise network 1402 may produce a stream of events such as any of the events described herein. This may include events from sensors, events from local security agents, events from network elements or points of presence (such as firewalls, gateways, WiFi routers, access points, etc.), and so forth. It will be appreciated that these events may in general be streaming events that are provide to, and ingested by, the stream service 1404 in real time, or batches of events that are provided as collections of events in a single transmission, e.g., based on a local reporting schedule used within the enterprise network 1402 or based on network availability.

The stream service 1404 may ingest events from the enterprise network 1402 including any of the events and the like described herein. In one aspect, the stream service 1404 may receive events through an interface using pre-signed Uniform Resource Locators or other techniques that can automatically append prefixes that identify a customer, a device, or other source information for each event or collection of events. The stream service 1404 may also or instead receive data from any other sources of events relevant to enterprise security or otherwise useful for managing the data platform 1400 as described herein. For example, this may include receiving signature updates for threat detection from third party security resources, receiving software updates and patches from software vendors, and so forth. In general, the stream service 1404 may include any suitable event stream processing storage or technology, or any similar hardware and/or software layer suitable for storing, managing, processing, and querying streams of events as contemplated herein, or otherwise supporting event-driven information. Some or all of the data in the stream service 1404 may also or instead be stored in a high-speed storage facility for queries or other data processing having high-performance requirements.

The transformer 1406 may generally process events in the stream service 1404, e.g., by organizing data according to one or more applicable schemas from the schema registry 1412, and augmenting the data with any suitable metadata to provide augmented event data for use in threat detection, investigation, and management. For example, the transformer 1406 may add a customer identifier, a firewall identifier, or other information for identifying a source of an event. The transformer 1406 may also or instead add a schema version that specifies a schema in the schema registry 1412 that can be used to organize data provided to the stream service 1404 or the data lake 1408. The transformer 1406 may also or instead create a timestamp, file size, hash, file path, or other information useful for identifying or describing data associated with an event, or the source or interpretation thereof, which may be appended to the event(s) before storing in the data lake 1408. In general, the transformer 1406 may transmit transformed event data back to the stream service 1404 for short-term usage (e.g., one hour, one day, seven days, etc.) by the listeners 1410 or high-speed access by the query engine 1414. The transformer 1406 may also or instead transmit transformed event data to the data lake 1408 for long-term storage (e.g., one week, one month, one year, etc.). It will be understood that the general boundaries for short-term and long-term storage may vary according to, e.g., storage capacity, processing speed, data volume, and so forth. When the transformer 1406 sends messages with metadata to the stream service 1404, the transformer 1406 may use any suitable data format, and may usefully compress the stream representation by including pointers to replace, e.g., a schema, the underlying source data, and so forth.

While shown as a single transformer 1406, it will be understood that the platform 1400 may use any number of transformers, operating in sequence or in parallel, or some combination of these, suitable for timely processing events and maintaining the stream service 1404 in a state suitable for, e.g., real time threat detection, remediation, and/or other security-related functions.

The data lake 1408 may receive messages from the transformer 1406, and store the message data in a manner that supports long-term storage and permits search and retrieval by the query engine 1414. In general, the data lake 1408 may provide a single store of data including source data in a natural or originally-provided raw data format, e.g., as binary large objects ("blobs") or other files or the like, along with any metadata or transformed data added thereto. The data lake 1408 may contain structured data (e.g., from relational databases), semi-structured data containing CSV, logs, XML, JSON and so forth, and/or unstructured data such as emails, documents, PDFs, and binary data such as images, audio, video, and any other data that might be received from the enterprise network 1402 or other sources relevant to network security system as described herein. In one aspect, source data in the stream service 1404 may be filtered or otherwise processed by the transformer 1406 in order to improve the quantity and quality of data maintained in the data lake 1408 for the various uses described herein. A variety of cloud-based technologies and other data lake technologies are known in the art and commercially available, and may be adapted for use with the data lake 1408 described herein.

The listeners 1410 may be user-configurable or pre-configured listeners that monitor the stream service using, e.g., metadata provided by the transformer 1406, for events of interest. Each listener 1410 may monitor an event stream supported by the stream service 1404, and generate suitable alerts, actions, or other responses by applying rules, application logic, filters, and so forth to events in the event stream.

The schema registry 1412 may store schemas for use by, e.g., the transformer 1406 and/or the listeners 1410 when writing data to the stream service 1404, reading data from the stream service 1404, or otherwise processing or interacting with data in the stream service 1404 or the data lake 1408. In general, schemas may be versionable or otherwise extensible, and each message in the stream service 1404 using a schema to structure data may include an identifier for the schema in the message to facilitate interpretation and other use by consumers of the stream service 1404. Users of the platform 1400 in general, and the stream service 1404 and data lake 1408 in particular, may inspect current schemas, update schemas (that they own or control), and otherwise access the schema registry 1412 to interact with the stream service 1404 and data lake 1408 in a structured manner, or otherwise support various functions of the platform 1400 described herein. As new schemas are created, e.g., to address new types of data or information, or as current schemas are updated, a history of the schema identifiers and versions may be retained in the schema registry 1412 for subsequent reference, and/or a newest schema may be pushed onto data in the data lake 1408 and/or the stream 1404.

The query engine 1414 may be any search engine suitable for querying the data lake 1408 and other data sources. This may include automated queries run according to a schedule from the query database 1420. This may also or instead include pre-configured queries run from the query database 1420 by a user from one of the consoles 1418. This may also or instead include queries containing customizations of pre-configured queries, or fully custom queries initiated by users from the consoles 1418. It will be understood that, while the data lake 1408 is a useful target for queries by the query engine 1414, the query engine 1414 may also or instead request data from other resources such as the stream service 1404, endpoints or security agents in the enterprise network 1402, or third party data sources such as threat libraries and the like.

The query monitor 1416 may generally monitor query activity by the query engine 1414 as well as other activity by the user consoles 1418. This may include monitoring query activity by users of the consoles 1418, as well as automated or scheduled query activity managed using the query database 1420. In one aspect, the query monitor 1416 may log specific queries initiated by the query engine 1414 in order to track, e.g., popularity of existing queries, user modifications to existing queries, and the like. Thus, for example, a query that is frequently modified by users may be republished to the query database 1420 in its modified form for subsequent use as a pre-configured query. In another aspect, the query engine 1414 may monitor a context in which queries are initiated or adapted. For example, a pattern of queries or query modifications may be correlated to a concurrent development of a known threat, and used to create query-based threat detection techniques or to identify query activity that can be associated with effective management of a live threat. As another example, when specific (non-query) measures are initiated from one of the consoles 1418 following a query, including activity such as scans, remedial measures, or the like, this may be used to evaluate an effectiveness of the query and identify queries that appear to be more helpful or informative to users. Thus, by monitoring query activity initiated through the query engine 1414 and/or other contextual activity by users through the consoles 1418, the query monitor 1416 may correlate specific queries to threat identification, threat response, and so forth, or otherwise track the popularity of a query or sequence of queries. All of this information may be stored in the query database 1420 along with query logs, pre-configured queries, and the like for use in monitoring and evaluating query activity as described herein.

The consoles 1418, which may be administrative consoles for system administrators, or any other user consoles or the like, may be deployed from a server or other remote or hosted system using, e.g., web technologies or the like to support a local interface on any suitable end user devices. In general, each console 1418 may display query information, security information, user options, and the like, and may provide user controls for inputting text, selecting options, configuring queries, and so forth. Thus, in one aspect, a host device for the platform 1400 may cause one of the consoles 1418 including a user interfaced to be presented on an end user device for an administrator or other end user. Each console 1418 may also include a local agent for tracking activity by console users. While a query monitor 1416 in the data platform 1400 may generally track query activity by a local query engine 1414, an agent on each console may advantageously support tracking of other user activity that does not involve direct interactions with the query database 1420 or query engine 1414.

The database 1420 may be any database useful for storing query-related information as described herein. This may, for example, include pre-configured queries for deployment from one of the consoles 1418 through the query engine 1414, as well as a log of queries performed by the query engine 1414 along with metadata such as a time of the query, a user who initiated the query, and the structure of the query. This may also or instead include contextual information such as activity at one of the consoles 1418 before, during, and/or after initiating a query, or any other information that might be useful in evaluating the effectiveness or diagnostic significance of queries initiated through the query engine 1414.

Figure 15:
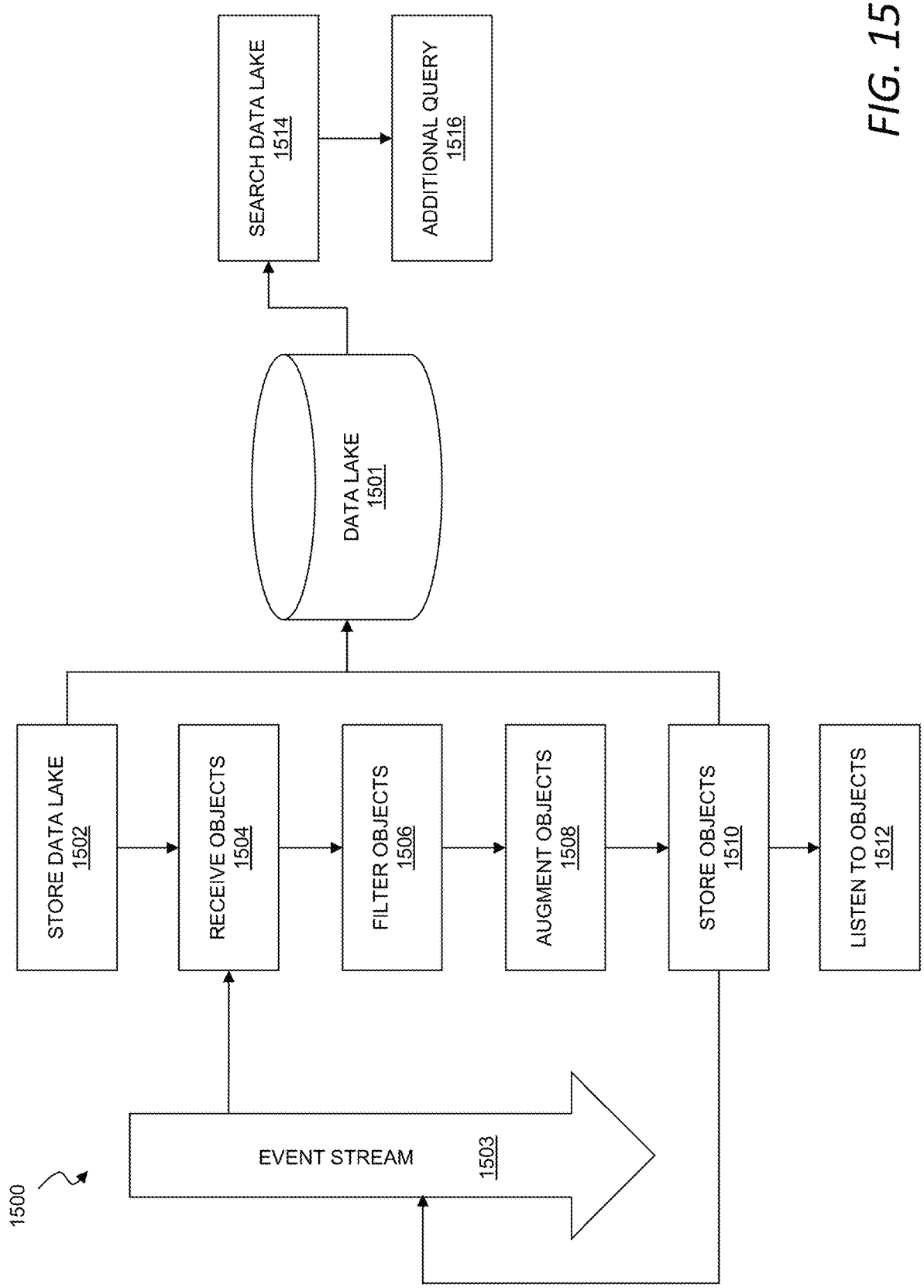
FIG. 15 shows a method for creating a data lake for use in enterprise security.

FIG. 15 shows a method for creating a data lake for use in enterprise security. In general, the data lake may be created for an enterprise from an asynchronous streams of security events by deduplicating objects and creating metadata related to downstream security functions. Deduplication of objects may be efficiently performed with a bloom filter as objects are ingested into the data lake. The objects may also be augmented with metadata arranged in schemas to facilitate monitoring and use within the data lake.

As shown in step 1502, the method 1500 may include storing a data lake 1501, such as any of the data lakes described herein. This may, for example, include storing a data lake containing a first plurality of data objects representing security events and a plurality of descriptions for the first plurality of data objects. The first plurality of data objects may include security events from one or more data recorders on endpoints in an enterprise network, which may be received in an event stream 1503 such as an event stream hosted by the stream service described above, or in any other suitable service or data repository. The plurality of descriptions may be organized according to one or more schemas that characterize the structure of data contained in the data objects. These schemas may, for example, be stored in a schema registry and used to transform or describe the structure of data on the event stream.

In one aspect, the data lake 1501 may use a flat schema employing columnar storage organized by fields such as a user name, time, device, and the like. The data objects in the data lake may also be organized for ease of use, e.g., by placing identifiers or other high level metadata in a small separate file, by placing commonly used data (e.g., extracted or derived data for analytics dashboards, real time event listening, and the like) in a second, small file, and by placing remaining data into a larger data file for access if/when needed.

As shown in step 1504, the method 1500 may include receiving a second plurality of data objects. These data objects may be received in an asynchronous stream of security events from the enterprise network. In one aspect, the asynchronous stream of security events may include one or more batch transfers including groups of security events. In another aspect, the asynchronous stream of security events may include streaming transfers of individual security events. The asynchronous stream may also or instead include a combination of batch transfers and streaming transfers, such as where some devices in the enterprise network stream events in real time, other devices store and forward events and batches, and other devices will send events in a connectivity-dependent manner based on, e.g., the availability, quality, or bandwidth of an available connection. In general, the data objects in the data lake may include security events from one or more data recorders on endpoints in the enterprise network, or any other information from any other source or combination of sources useful for security analysis and the like.

As shown in step 1506, the method 1500 may include filtering the received data objects, e.g., using the transformer described above. This may include filtering the second plurality of data objects to remove duplicate data objects already included in the first plurality of data objects. With multiple sensors and endpoints sourcing events in an asynchronous manner, it is possible that a particular event may be reported more than once. In order to avoid contaminating the data lake 1501 with duplicative data, the transformer may usefully remove duplicative information. For example, filtering may include applying at least one bloom filter to identify one of the second plurality of data objects that might be in the data lake and selectively performing a deduplication lookup in the data lake for the one of the second plurality of data objects only where there is a possibility of a duplicate, e.g., where the bloom filter indicates that the data object might already be present in the data lake.

A bloom filter is a space-efficient data structure that uses hashing techniques to test whether an element is a member of a set. In general, a bloom filter eliminates the possibility of false negative matches, but not false positive matches. While other filtering techniques are possible, such as a brute force search of existing records in the data lake 1501, the bloom filter provides a compact and computationally efficient technique that is advantageously extensible with the addition of new elements to a set. Thus, a bloom filter may be created and advantageously used with a growing data lake to efficiently test for whether a particular data object has already been stored in the data lake 1501, and to reduce the number of queries to the data lake 1501 that might otherwise be needed for deduplication. This may significantly increase the efficiency of the transformer, particularly where a query to the data lake 1501 is substantially slower than applying the bloom filter. It will also be understood that a separate bloom filter may be created for each device in order to manage size. Thus, when a new device appears in the enterprise network, a new bloom filter may be created and associated with a device identifier or other identifier for the new device so that the new bloom filter can be applied to events associated with the device identifier.

As shown in step 1508, the method 1500 may include augmenting the second plurality of data objects, for example by augmenting each of the second plurality of data objects with a corresponding description that is organized according to at least one of the one or more schemas used by the transformer described above to structure data in an event stream and data lake. For example, an event or message on the event stream 1503 may be processed into a number of different files including, e.g., a first metadata file with high-level metadata that identifies an event such as a source device, an event time, and an objective identifier such as a size, hash, filename, or the like for the object. This first metadata file may use a global schema (e.g., for identification) for all of the data objects placed in the event stream 1503 and/or data lake 1501.

A second metadata file may include tagging or analysis to support real time listening. More generally, the second metadata file may include any identification information or relevant event descriptions, summaries, analysis, and the like to support high-speed processing of the event stream 1503. This may include any tagging or characterization useful for automated listeners to identify relevant data or events on the event stream 1503, and may be customized by a particular user according to intended use. For example, the second metadata file may identify an entity type (e.g., firewall, gateway, mobile device, etc.), an event type (e.g., policy violation, configuration change, network event, etc.), a user type (e.g., system, human, etc.), a traffic type, a reputation (including quantitative reputation such as a reputation score, or qualitative reputation information such as "good," "bad," or "unknown"), or any other attribute(s) or information that might be useful to listeners. The schemas for this information may be selected, e.g., for particular users of the data lake 1501, for particular devices providing security events, for particular network locations, and so forth. Thus, in one aspect, one of the schemas used to characterize data objects may include a device-dependent schema selected for one of the data objects according to a source of the one of the data objects when received in the asynchronous stream. While device-dependent schemas may usefully be employed to structure metadata differently for different source devices, the schemas may also or instead be specific to a user, a network location, an application, a process, or any other network, physical, or logical source of an event.

In one aspect, the one or more schemas may be columnar schemas to provide a flat, non-hierarchical structure for metadata in order to improve efficiency, e.g., when processing real time event data in the event stream 1503.

As shown in step 1510, the method 1500 may include storing the second plurality of data objects and a corresponding plurality of descriptions according to the one or more schemas with the first plurality of data objects in the data lake. In addition to any metadata files (such as the two described above), this may include a raw data file containing a complete data object as it natively appeared on the event stream 1503 from the enterprise network. After the processing above, the resulting collection of files may be stored in the data lake 1501 in an augmented form including the raw data file along with the first and second metadata files, and/or any other descriptive data or analysis that might be useful to subsequent users. The data objects may be stored in the data lake 1501 in any of a number of forms to optimize storage and use. For example, the data objects may use a flat schema, and may be flagged according to any suitable restrictions on access or use. This may include tagging data as, e.g., sensitive, confidential, financial, technical, valuable, containing personally identifiable information, and so forth. As a transformer or other system processes data for storage, the data objects may also or instead be structured for optimal use on the event stream 1503 and/or in subsequent queries to the data lake 1501.

In another aspect, the metadata files may be stored on the event stream 1503 for real time processing, while the (typically larger) raw data object is sent to the data pool 1501. In this case, the metadata files may include a pointer or other location identifier to assist in retrieval of the raw data from the data pool 1501 when requested, e.g., by one of the listeners. In another aspect, the raw data object may never enter the event stream 1503, and may instead be sent directly to a transformer or similar entity for processing and storage in the data lake 1501. In this manner, the event stream 1503 may be used exclusively for high-speed processing of smaller metadata files, with the raw data objects stored separately in the data lake 1501 for access if/when needed by a listener that detects relevant information in the metadata, or by a user querying the data lake 1501.

As shown in step 1512, the method 1500 may include listening to objects 1512. This may include monitoring the event stream 1503, e.g., by monitoring metadata placed onto the event stream 1503 by a transformer using one or more registered schemas, to identify any relevant attributes, events, actions, or the like in the event stream 1503 that may be relevant to a function of one of the listeners. Where relevant metadata is detected, a corresponding listener may take any suitable action including creating an alert or user notification, initiating remedial action, requesting additional information from endpoints in an enterprise network (e.g., by requesting data stored in local data recorders), by retrieving a corresponding raw data object from the data lake 1501 for analysis, and so forth. In general, this listening may occur as new items are placed on the event stream 1503 (e.g., in real time), or as raw data objects and/or metadata files are stored in the data lake 1501, or any combination of these.

As shown in step 1514, the method 1500 may include searching the data lake 1501 for security events of interest. This may include searching metadata in metadata files that augment raw data objects, searching directly in raw data objects, or some combination of these. It will be understood that security events of interest may include any events from the enterprise network that might be indicative of malicious activity, vulnerabilities, policy compliance, or otherwise relevant to threat detection and security management as described herein.

As shown in step 1516, the method 1500 may include performing any additional queries. For example, where a confidential file is electronically mailed from an endpoint, this may be a permissible communication when performed by a human user with suitable credentials, but an impermissible communication when no human user is present on the endpoint. Where a local security agent monitors for human presence, corresponding information may be stored in a local data recorder but not automatically sent to the event stream. In this case, in response to data obtained during the data lake search, the method 1500 may include directly querying at least one of the endpoints for additional information. It will be understood that this example is intended to be non-limiting, and any event or combination of events suggesting further inquiry may be used as a trigger for requesting additional information from one or more endpoints or data recorders in the enterprise network as contemplated herein.

Thus, more generally, while searching the data lake 1501 for security events of interest, an event may be identified that requires additional information from an endpoint, and the method 1500 may include a variety of searches or other tools to support subsequent manual (e.g., human) or automated (e.g., machine) investigation. These additional queries may be performed for any number reasons, for example as the investigation of a developing threat continuous, as the historical analysis of a prior security breach is performed, or as suspicious activity emerges within the enterprise network. Any of this may cause an analyst to create new searches, change the parameters for existing searches, drill down on particular search results, and so forth, and all such types of investigation may usefully be supported by the data lake 1501, including any augmented metadata contained therein.

According to the foregoing, there is described herein a system including a data lake, a stream service, and a transformer service. The data lake may include a data storage medium storing a first plurality of data objects representing security events within an enterprise network and a plurality of descriptions for the first plurality of data objects, each of the plurality of descriptions organized according to one or more schemas. The stream service may be configured to receive an asynchronous event stream of additional data objects representing security events from the enterprise network. The transformer service may be configured to process the asynchronous event stream by filtering the additional data objects to remove duplicates of one or more data objects already stored in the data lake, thereby providing filtered data objects, to augment each of the filtered data objects with a corresponding description organized according to one of the one or more schemas, thereby providing augmented data objects, and to store the augmented data objects in the data lake.

The asynchronous event stream may include at least one of a batch transfer including a group of security events, a streaming transfer of one or more individual security events, and a connectivity-dependent transfer. Filtering the additional data objects may include applying a bloom filter to the asynchronous event stream to detect a first group of the additional data objects that are definitely not in the data lake and a second group of the additional data objects that might be in the data lake. The transformer service may be further configured to perform a deduplication lookup in the data lake on each of the second group of the additional data objects. In one aspect, the system may further include a query engine configured to search the data lake for one or more security events of interest, and/or to request data from local data records operating on endpoints within the enterprise network.

FIG. 16 shows a method for discovery of enterprise threats based on security query activity. In general, a threat management system as described herein may provide a collection of queries for investigating security issues within an enterprise. Useful inferences can be drawn about the value of different queries, and about the security posture of the enterprise, by monitoring contextual activity such as the popularity and context of query usage, patterns of end user modification to queries, and post-query activity.

As shown in step 1602, the method 1600 may include receiving an event stream including security events from an enterprise network such as security events from one or more sensors on compute instances in the enterprise network. The event stream may be received, e.g., at a stream service or other suitable resource. This may include any events described herein, such as events captured by sensors on endpoints throughout the enterprise network.

As shown in step 1604, the method 1600 may include storing the event stream in a data lake. This may include any of the data lakes described herein, which may be augmented with metadata files for efficient search and analysis. It will be understood that events may also or instead be locally stored in data records of endpoints, or in any other intermediate location(s). While the data lake may provide a useful medium for storage and search of relevant information, local data records may also or instead be used to advantageously permit offloading of more granular storage, or unprocessed event information, at local devices throughout the enterprise network. These distributed resources may be queried as helpful and/or necessary while investigating enterprise threats.

As shown in step 1606, the method 1600 may include storing a plurality of queries for execution against the event stream and/or data lake. In general, the plurality of queries may be configured to investigate security issues within the enterprise network based on the event stream and/or other information available to a query engine and relevant to investigation of security issues. This may, for example, include database queries or the like configured for use with the data lake.

As shown in step 1608, the method 1600 may include monitoring usage of the plurality of queries, e.g., with a monitoring agent or other automated monitoring system. This may include monitoring usage of the plurality queries as they are issued by users from one or more administrative consoles to a threat management facility for the enterprise network. This may also or instead include monitoring automated queries that are issued, e.g., on a scheduled basis from the query database or other automated tool.

In one aspect, this may include monitoring changes to one or more of the plurality of queries. In another aspect, this may include monitoring post-query remediation activity initiated at one or more administrative consoles. For example, where a particular type of remediation is consistently initiated by a user after receiving the results of a particular pre-configured query, then the query may, itself, be used as an indicator of a corresponding threat, e.g., the threat being remediated after the query. This permits improved contextual recommendations to a user initiating the query, and/or a variety of preemptive and/or automated responses based on an inference that the threat is present in the enterprise network. In another aspect, this may include monitoring queries for a plurality of enterprise networks, e.g., so that activity for a number of enterprises may be aggregated and analyzed to identify best practices (and poor practices), and to learn how query activity by administrators maps to developing threats and/or the success of threat responses. Thus, query activity may be effectively crowdsourced to permit individual enterprise administrators to benefit from successes and mistakes identified in activity by other administrators for other networks.

In one aspect, this may include monitoring usage of the plurality of queries by one or more experts, such as a professional security analyst or technician, in order to develop an expert system or the like for use in generating recommendations or guidance for others when managing networks. This system may make contextual recommendations, respond to inquiries and request for help, and so forth.

As shown in step 1610, the method 1600 may include determining a usage history based on the usage of the plurality of queries. In one aspect, this may include usage of the queries themselves, such as when and how often queries are used, or whether and how they are modified when deployed by users from the administrative consoles. For example, the usage history may include a popularity of one or more of the plurality of queries. This may aid in identifying which queries are perceived as useful so that these queries can be preferentially suggested to users, optimized for higher performance, or otherwise adapted for more widespread and frequent usage.

In another aspect, the usage history may include a pattern of changes to one or more of the plurality of queries. A variety of useful inferences are available based on patterns of change. For example, a change, modification, or customization that is consistently requested for a particular stored query might suggest that the stored query is not optimal for many users. In this case, the stored query may be updated to reflect this user preference. In another example, different types of changes to a popular query may correspond to different threats or other security issues. In this case, a particular modification to a query to focus on, e.g., events in a particular time window, on particular device types (mobile devices, USB drives, etc., devices with a particular operating system, etc.), at particular locations (e.g., path names, network locations, etc.), and so forth may be used to draw useful inferences about a threat or threat resolution in progress.

In another aspect, a pattern of post-query activities initiated from an administrative console (or other user interface or the like) may provide a usage history useful for security analysis. For example, where a particular query is consistently followed by a particular security response such as remediation, malware scanning, network isolation, and the like, then the query may be used as an indicator of a corresponding threat. Similarly, a consistent pattern of post-query activity may suggest that a particular query is valuable or useful, and the query may be ranked more highly in lists of queries presented to a user, or suggested more often in response to user inquiries. Other types of inferences may also be usefully drawn, such as the addition of a new user, a structural re-organization of an enterprise, a change in network security policy, and so forth. By enabling a query monitor or similar tool to monitor activity at administrative consoles beyond data lake search activity, or by providing a local monitoring agent for each administrative console, additional context can be made available to assist in recognizing patterns associated with malware threats, threat remediation and so forth beyond what might be discovered based exclusively on events reported by sensors within the enterprise network. As a significant advantage, this type of monitoring indirectly captures human levels of interest and response that might not otherwise be available when applying rules to streams of events from the enterprise network. A context in which queries are executed may also or instead usefully be employed as a part of the usage history, and may include information about a user of the administrative console, additional global threat or security information from sources other than the enterprise network, business value and reputation associated with security events, heartbeats from endpoints that are providing reports, reputation associated with endpoints or endpoint users, and so forth.

Other context may also or instead be used, such as whether an existing workflow, process, connectivity, or the like has been interrupted immediately prior to a new query. For example, where an administrative console diverts attention to a particular endpoint or sequence of events, this may provide useful context concerning the locus of a developing threat. Similarly, threat mitigation activity may provide useful context for the value of a particular query and the circumstances under which the query might be used. Relevant threat mitigation activity may, for example, include machine isolation, forensic analysis, creation of malware traps, and so forth, as well as additional queries that might be used to evaluate how a particular machine became infected or the like.

As shown in step 1612, the method 1600 may include initiating an action by the threat management facility based on the usage history. This may include any of a variety of automated remedial actions or the like, as well as alerts or notifications to administrators or other users that may be affected by a security breach. For example, initiating the action may include identifying a pattern of queries associated with a known threat and generating a recommendation for one or more responsive remedial actions. Initiating the action may also or instead include evaluating a usefulness of one of the plurality of queries based on a pattern of post-query activity. In another aspect, initiating the action may include evaluating a usefulness of one of the plurality of queries based on a pattern of query modifications by users.

More generally, any useful action may be initiated by the system based on aggregated search behavior, context for search behavior, user actions before, during, and after searches, or inferences available from combinations of the foregoing. For example, if a particular query is highly popular, then data for this query may be regularly pre-fetched for improved response times. Similarly, where one particular query is very frequently followed by another particular query, data for the second query may be pre-fetched when the first query is initiated. As another example, when a particular query is regularly followed by requests for additional information from local data recorders on endpoints within the enterprise network, the query monitor or some other suitable automated software agent may initiate requests for corresponding data from security agents on the endpoints in order to begin aggregating the anticipated data for use. This may be particularly advantageous in contexts where there is some significant expected latency in responses from the individual security agents throughout the enterprise network.

In another aspect, a general record of events surrounding a threat including, e.g., any of the context described above along with a pattern of queries, query modifications, requests for additional data (e.g., from data recorders), and other query activity or user actions and the like, may usefully characterize a particular threat in a manner that permits subsequent identification of similar threats. For example, this data may be converted into training sets for machine learning, and a model may be trained to detect future threats, or to provide guidance in responding to threats, based on these observations.

According to the foregoing, there is described herein a system including a data lake, an administrative console, a database, and a query monitoring agent. The data lake may store an event stream including security events from one or more sensors on compute instances in an enterprise network. The administrative console may receive queries from users and cause the queries to be executed against the event stream. The database may store a plurality of queries for execution against the event stream at the administrative console, the plurality of queries configured to investigate security issues within the enterprise network based on the event stream. The query monitoring agent may provide a query monitor configured to monitor a usage of the plurality of queries at the administrative console, to determine a usage history based on the usage of the plurality of queries, and to initiate an action by a threat management facility based on the usage history.

FIG. 17 shows a method for augmenting data for use in threat investigation. In general, an endpoint in an enterprise network may be instrumented with sensors to detect security-related events occurring on the endpoint, e.g., as described herein. Event data from these sensors may be augmented with contextual information about a source of each event in order to facilitate improved correlation, analysis, and visualization at a threat management facility for the enterprise network.

As shown in step 1702, the method 1700 may include instrumenting an endpoint in an enterprise network with a sensor and a local security agent. The sensor may include any of the sensors described herein, and may be configured to generate an event record in response to an event. The local security agent may be configured to locally receive the event record from the sensor, or otherwise receive event data responsive to an event occurring on (or detected on) the endpoint.

As shown in step 1704, the method 1700 may include receiving event data, such as event records or the like from sensors on the endpoint.

As shown in step 1706, the method 1700 may include generating a source identifier that identifies a source of the event in a context of the sensor. This may include determining the context of the sensor (e.g., with the local security agent) by inspecting one or more network resources associated with the endpoint. In general, this contextual identifier may augment source identification information using any information locally available to the local security agent and useful for determining a source of any corresponding event (s). The source identifier may combine any source identifiers available in the local context of the security agent such as one or more logical, physical, and/or virtual identifiers of a source of an event.

For example, the source identifier may include a physical address associated with the source, a network address associated with the source, and at least one temporal address assigned by the endpoint to the source of the event. As a more specific example, the physical address may include a medium access control address associated with the source, or any other physical layer address or the like associated with a physical address of the source and/or useful for identifying or accessing the source, e.g., in a physical layer of a network protocol stack. The network address may, for example, include an Internet Protocol address associated with the source, or any other network layer address or the like associated with a network address of the source and/or useful for identifying or accessing the source in a network layer of a network protocol stack. The temporal address may, for example, include the name of a process executing on the endpoint that is associated with the source, a directory location or path name, or any other transient identifier created by the endpoint to refer to an object or location on the endpoint, or a resource accessible to the network. The temporal address may also or instead include an identifier for at least one of a user of the endpoint, a device associated with the endpoint, a path associated with a computing object on the endpoint, a process executing on the endpoint, an application on the endpoint, or any other address created or assigned by the endpoint or the like. More generally, information on an endpoint may change. Directory structures may be altered. Files may be moved or renamed. Processes may be stopped and restarted with different process identifiers. By capturing such transient information around the time that an event occurs, temporal address information can provide an improved contextual perspective on the event, as well as the event's relationship to other events and other entities in an enterprise network.

Locally augmenting source identifiers can also permit context for an event to be explicitly associated with other source identification information, which can simplify the identification of associations or correlations among events that are being processed remotely from the endpoint. For example, there may be a half dozen sensors on an endpoint recording on a particular Internet Protocol address, without specifying whether each is a source of traffic from that IP address, a destination for network traffic from that source, a user of a resource at that IP address, and so forth. Similarly, an event may have multiple IP addresses associated with it, without specifying how each IP address relates to the event. For example, a firewall may receive three different IP addresses for a network request, such as an IP address for an endpoint, an IP address for a service requested from the endpoint, and an IP address for an authentication system used in connection with the request. Each of these IP addresses may properly be associated with a network request from the endpoint, but may have different relationships to another event from the endpoint, or from a different endpoint communicating through the firewall. By pre-computing this type of information at the endpoint and establishing the relationship of these various identifiers to an event, e.g., by explicitly identifying the relationship of the source with the IP address, and/or by specifying other address information associated with the source, a threat management facility can more quickly and efficiently analyze events in the proper context. Similarly, this type of extended source identification permits more accurate targeting of inquiries, analysis, and remediation.

For example, if an attack is detected from an IP address, the threat management facility can more quickly and directly inquire about what else in the enterprise network is associated with the IP address, what other devices or resources have a relationship with the IP address, and so forth. This permits identification of not only an IP address, but a particular user, a particular process, and the like, as well as a more accurate picture of what other network resources (e.g., other connectivity pathways), users, and resources are associated with that IP address. Similarly, this permits specific associations at particular points in time. Thus, for example, an IP address may be explicitly associated with a particular MAC address, a particular user and/or a particular user at the time an event is recorded, even though these relationships are transient in nature.

The general approach described above advantageously supports joining of relevant information to an event record based on local contextual information at the point of origin, rather than requiring inferences about relationships to be made at a remote threat management facility where multiple event records from multiple sensors and endpoints are received. This permits an accurate, local join of the full state of an event, including information such as a known user, a known process, a known network adapter (or other hardware), and so forth. In particular, this permits a capture of transient, temporal information that may not otherwise be clearly associated with an event when analyzing data, and in particular, values that may change over time, such as an IP address, a user identifier, a MAC address, an application identifier, a process identifier, a file hash, and so forth. In one aspect, these temporal labels may be combined or associated with non-temporal information (e.g., a hardware device identifier for an endpoint) to facilitate useful and accurate correlations during downstream processing. Similarly, this supports improved graph creation and graph navigation by a human investigator, where events, entities, and relationships can be more accurately identified in order to support pivoting to different views or analysis as an investigation proceeds. It will also be appreciated that some or all of this contextual information may be stored on local data recorders unless/until requested or needed by a central threat management facility.

In addition to augmenting source identification information using local context available to the endpoint at the time an event is detected or recorded, an event may be further augmented with causally related events that are also available in the local context of the endpoint. For example, an event may be augmented with an event graph using, e.g., the techniques described herein. This mini-event graph may, for example, include a relatively small, local collection of causally related events. In one aspect, the mini-event graph may include one or more (causally) immediately preceding events, or one or more (causally) immediately following events. In another aspect, the mini-event graph may be a highly filtered event graph that includes one or two additional events such as a root cause identified for the event, a final action in a graph of events including the event, a known malicious action following, and causally related to, the event, and so forth. This may also or instead include condensed or summarized events, such as by condensing an auto-save or a copy to a USB drive as a single, summarized event in place of any number of related literal events associated with a particular user action or computer activity.

As shown in step 1708, the method 1700 may include creating a modified event record by appending the source identifier to the event record. This modified event record can include the event record from the sensor, along with any relevant event details, as well as an augmented source identifier as described above based on information available to a local security agent for the endpoint. This source identifier may usefully identify a source of the event in a context of the sensor and/or endpoint.

As shown in step 1710, the method 1700 may include storing the modified event record in a data recorder on the endpoint. This permits local logging with any desired duration or level of granularity independent of storage requirements or restrictions at a threat management facility that might receive the modified event record. Thus, for example, if a remote threat management facility determines that a particular modified event record is not immediately relevant or useful, the local data recorder may nonetheless retain a copy in case a request for additional information is subsequently received from the threat management facility. The method 1700 may also or instead include storing a plurality of modified event records in the data recorder such as a stream of modified event records from multiple sensors on the endpoint, e.g., according to any logging policy, storage restrictions, or other considerations. In general, this permits the data recorder (e.g., under control of the local security agent) to respond to queries from resources external to the endpoint for additional data stored in the data recorder.

As shown in step 1712, the method 1700 may include transmitting the modified event record to a threat management facility.

As shown in step 1714, the method 1700 may include processing the modified event records, along with any other available information, at a remote threat management facility such as any of the threat management facilities described herein. In general, a relationship of one of the modified events record with one or more other modified event records stored at the threat management facility may be determined based on source identifiers that have been augmented with contextual data as described herein before transmitting to the threat management facility. A variety of useful tools for, e.g., forensic analysis, threat investigation, policy compliance, and so forth, may be performed at a threat management facility based on these modified event records.

For example, the method 1700 may include providing a user interface from the threat management facility for navigating a chain of events based on relationships among a plurality of source identifiers in a plurality of modified event records received at the threat management facility. This may include a display of associations among source identifiers that permits a user to navigate from source to source based on overlapping or otherwise related source identifiers in the augmented event record data. Similarly, the user interface may be configured to support navigating a chain of events based on relationships among a plurality of source identifiers in a plurality of modified event records, e.g., by displaying events in a graph, along with associations among the nodes that are identified or inferred based on the modified event records. The method 1700 may also or instead include creating a graph that causally associates two or more events based on a plurality of source identifiers in a plurality of modified event records received at the threat management facility, which may be displayed in the user interface, or otherwise used to process or analyze collections of events based on the modified event records.

In another aspect, this may include processing a stream of modified event records to evaluate security threats to an enterprise network, e.g., using any of the various techniques described herein, to detect threats and track causal chains of events back to a root cause. Similarly, processing may include processing a stream of modified event records at the threat management facility to evaluate a security state of the endpoint, e.g., by ensuring that particular events are associated with suitable users or processes, and so forth. In one aspect, sequences of events may be associated with one another, e.g., by determining a relationship of a source identifier for one event with one or more other source identifiers in modified event records received at the threat management facility. In another aspect, processing the stream of modified event records at the threat management facility may include deduplicating one or more event records based on a reconciliation of source identifiers. Other techniques for processing streams of modified event records may also or instead be employed.

In one aspect, there is disclosed herein a system including a local security agent executing on an endpoint and configured to receive data characterizing an event from a sensor on the endpoint; to generate an event record in response to the event; to determine a context of the sensor including a physical address associated with a source of the event and a temporal address assigned by the endpoint to the source of the event; to append a source identifier to the event record that identifies the source of the event including the context of the sensor, thereby providing a modified event record including the event record and the source identifier; and to transmit the modified event record to a remote resource. The local security agent may also or instead process events and augment event records to create modified event records as more generally described herein.

The system may also include a threat management facility such as any of the threat management facilities described herein. The threat management facility may, for example, be configured to receive a stream of modified event records from a plurality of endpoints in an enterprise network that includes the endpoint, and to evaluate security threats to the enterprise network based on the stream of modified event records, or to otherwise process a stream of modified event records as described herein.

Figure 18:
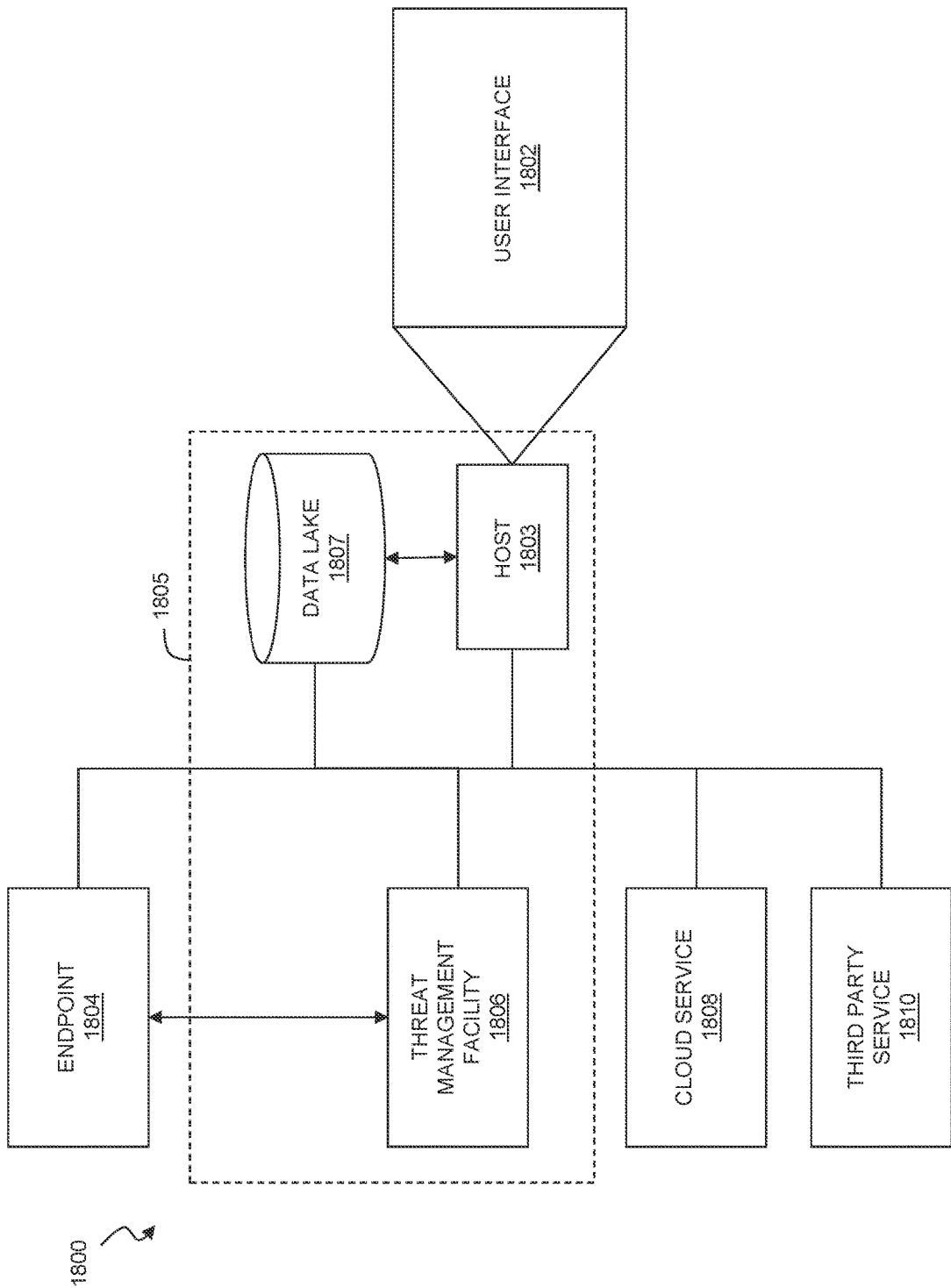
FIG. 18 shows an augmented threat investigation system.

FIG. 18 shows an augmented threat investigation system. In general, the system 1800 may include a user interface 1802 for threat investigation that provides access to threat-related data from multiple sources such as an endpoint 1804, a threat management facility 1806, a cloud service 1808, and a third party service 1810. As disclosed herein, a platform for managing threat data using the augmented threat investigation system of FIG. 18 may integrate threat data from a variety of sources including internal threat data from instrumented compute instances associated with an enterprise network and threat data from one or more independent, external resources. Threat assessments may be incrementally revised as this threat data is asynchronously received from various sources, and a threat investigation container may be automatically created and presented to an investigator when a composite threat score for one or more of the compute instances meets a predetermined threshold.

The user interface 1802 may be any of the user interfaces described herein and may be hosted, for example, on a host 1803 for a threat management facility 1806 or other network resource for use in managing network security and investigating potential security threats, and rendered on any suitable end user device. The user interface 1802 may be a web-based interface, or other proprietary interface or the like suitable for access and use by a technician responsible for network security matters for a managed domain such as an enterprise network or the like. As described herein, the user interface 1802 may be presented by the threat management facility 1807, e.g., in a display to a user such as an administrator, technician, or other security personnel or user. The user interface 1802 may generally provide interactive access to the threat management facility 1806, the data lake 1807, and any associated sources of security data as described herein. The threat management facility 1806 may be configured to transmit a link to the user interface 1802 in a message to the user such as an electronic mail message, a text message, or a pop-up window in a threat management facility interface.

The user interface 1802 may be associated with an investigation container such as any of the investigation containers described herein, which may be configured to support augmented threat investigation as described herein. For example, the user interface 1802 may include a control for requesting additional event data captured by a data recorder of one of the plurality of compute instances for a time window prior to creation of the investigation container. The user interface 1802 may also or instead include a control for adjusting a filter applied by one of the plurality of compute instances to a local event stream when selecting local security events to communicate on the event stream to the data lake. The user interface 1802 may also or instead include a tool for querying the data lake.

An endpoint 1804, which may be any of the endpoints or other compute instances described herein, may include a local security agent such as any of the local security agents described herein. The local security agent may detect an event (or more specifically, receive a detection from a sensor on the endpoint 1804) and forward a local threat indication to the host 1803, either as an individual event or in an event vector containing other contemporaneous event data. This may, for example, include data pre-computed on the endpoint 1804 such as a severity score, a threat classification (such as a MITRE classification or the like), or other contextual information related to the detected event, any of which may be used by the host 1803 for display within the user interface 1802, or as a basis for additional queries or investigation to identify other information potentially relevent to an investigation of a potential threat. Although not depicted, it will be understood that the endpoint 1804 may be coupled to an enterprise network that includes, or is associated with, the threat management facility 1806 and other components such as the host 1803 for the user interface 1802 and the data lake 1807.

While depicted as a single endpoint 1804, it will be understood that the enterprise network may more generally include a plurality of compute instances. For example, the plurality of compute instances may include at least one network device such as a switch, a router, a wireless access point, a gateway, a firewall, and so forth. In another aspect, the plurality of compute instances may include at least one virtual computing device hosted on a virtualization platform such as a virtual desktop infrastructure or other cloud computing resource or the like.

In general, the security events provided from these compute instances may include asynchronous data that is locally gathered and transmitted incrementally as the data is acquired by the compute instances, e.g., at unknown, unscheduled, and/or unsynchronized time intervals from the various compute instances. In another aspect, the security events may include batch data from one or more of the plurality of compute instances. In one aspect, the batch data may be gathered and transmitted at scheduled intervals. In another aspect, the batch data may be asynchronously communicated, e.g., in response to local triggering events such as a local threat detection, a change in computing activity, or an accumulation of batch data meeting a predetermined threshold for duration, size, or activity type. In one aspect, the security events may include threat detection data from a local security agent executing on one of the plurality of compute instances, and/or from multiple local security agents on multiple compute instances.

A threat management facility 1806 may provide information relevant to threat detection and investigation. For example, the threat management facility may receive event data from the endpoint 1804 and other endpoints within an enterprise network. In one aspect some such data may be used in raw form by the host 1803 for display in the user interface 1802. In another aspect, the event data may be processed by the threat management facility 1806 to generate a contextual threat score for the event detected by the endpoint 1804 based on, e.g., other events or context for the endpoint, other events within an enterprise network, or any other available data. As described herein, in one aspect, the threat management facility 1806 may be configured by computer executable code or the like to perform the step of updating a composite threat score based on the number of sources of security data as the event stream is asynchronously received from the number of sources of security data. In another aspect, the threat management facility 1806 may be configured by computer executable code or the like to perform the step of automatically creating an investigation container for interactive investigation of security risks when the composite threat score meets a predetermined threshold for initiating an investigation.

As described herein, the threat management facility 1806 may be configured to support augmented threat management in a variety of ways. For example, the threat management facility 1806 may be configured to calculate a composite threat score for a compute instance by mapping the security events in the event stream to an attack matrix that enumerates malware strategies in a first dimension and malware techniques for each of the malware strategies in a second dimension. Based on this mapping, the threat management facility 1806 may calculate the composite threat score based on a pattern of traversal of the attack matrix by a chronology of the security events. The threat management facility 1806 may also or instead be configured to calculate the composite threat score by applying a machine learning algorithm to the pattern of traversal of the attack matrix to determine a likelihood of threat. In another aspect, the composite threat score may also or instead include two or more scores based on two or more of the number of sources of security data. In this case, the predetermined threshold for launching an investigation container (or otherwise creating an alert or the like) may be based on an aggregated threshold for the two or more scores, or a separate threshold for each of the two or more scores. In another aspect, the threat management facility 1806 may be configured to revise the composite threat score downward when a false positive is identified, and in response, to automatically close the investigation container when the composite threat score meets a second predetermined threshold for terminating the investigation. That is, where objective evidence indicates a decreased risk posture, an automatically created investigation container may be deleted or otherwise disposed of without requiring further administrative intervention.

A data lake 1807, such as any of the data lakes described herein, may generally receive an event stream including events from a plurality of sources of security data, such as any of the events, event streams, and data sources described herein. In one aspect, this may include data sources from within the enterprise network such as security events from one or more sensors on the plurality of compute instances coupled to the enterprise network. Other types of events from internal sources may usefully be included in the event stream for the enterprise network. For example, the threat management facility 1806 and/or host 1803 may be instrumented with a monitor for a query interface to the data lake 1807. As described herein, the pattern of queries and responsive activities from within an administrative console may provide useful information for detecting and remediating threats in the enterprise network. And as such, the monitor for the query interface may provide a useful source of security data for the event stream.

The data lake 1807 may also or instead receive data from data sources external to, but associated with, the enterprise network such as cloud resource data from a cloud service 1808 supporting the plurality of compute instances coupled to the enterprise network. For example, the cloud service 1808 may include one or more of a web application, a cloud storage service, an electronic mail application, and an authentication service, a zero trust network access resource, a cloud computing service, and a virtualization platform. In another aspect, the cloud service 1808 may include a network monitor executing on a third-party firewall and securely coupled to the threat management facility 1806. This latter embodiment may be useful, for example, where a firewall or other third-party component can locally log information useful for threat analysis, but does not provide a secure interface for accessing such local logs. To address this security issue, a network monitor may be installed on the firewall to provide a secure communications interface for remote access to the local data log of security events. The network monitor may automatically stream data at suitable intervals, or may be configured to respond to remote queries for log data, or some combination of these.

The data lake 1807 may also or instead receive data from data sources external to, and independent from, the enterprise network such as contextual data for activity by the plurality of compute instances from a third-party service 1810. Useful contextual data may, for example include geolocation data from a third-party service that provides a geolocation for a compute instance, resource, threat sample, or the like. Geolocation data may, for example, be based on active geolocation using Global Positioning System data, cellular network triangulation data, WiFi network signal strength analysis, or the like, or passive geolocation using, e.g., Internet Protocol (IP) address lookups for location data correlated to an IP address for a device. In another aspect, useful contextual data may include threat detection data from third party threat management services. For example, this may include threat classification, threat identification, signature analysis, and so forth, provided by one or more remote resources based on data available on the event stream or in the data lake, e.g., from the plurality of compute instances.

As generally indicated by an arrow 1806, the threat management facility 1806 and the endpoint 1806 may be connected to an associated enterprise network, and may share data and control information for management of security for the associated enterprise network. It will be understood that, while illustrated as a separate entity, the threat management facility 1806 may be the same as the host 1803 for the investigative user interface 1802, or collocated with the host 1803 and the data lake 1807, or otherwise coupled in a communicating relationship with these components, as generally indicated by an outline 1805 enclosing these entities. In another aspect, the host 1803 may be operated by a third party independently from a threat management facility 1806 for an enterprise network, so that either a technician for the enterprise can log in and use the user interface 1802 or a third party security service can use the host 1803 and user interface 1802 to manage security on an outsourced basis for an enterprise network managed by the threat management facility 1806.

In one aspect, the threat management facility 1806 may use a data lake, such as any of the data lakes or similar repositories of event stream data as described herein, to store information related to events occurring within a managed estate, any of which may be useful for investigating potential threats as described herein.

The cloud service 1808 may be any cloud service, application platform, data facility, or the like that provides user access to data and services in the cloud. In one aspect, the cloud service 1808 may be a zero trust network access resource providing secure access to applications and the like for users associated with an enterprise network. In another aspect, the cloud service 1808 may include a cloud data warehouse or other remote data storage facility. The cloud service 1808 may also or instead include a cloud computing platform, a software-as-a-service (SaaS) solution, or other cloud-based service or combination of services. In one aspect, the cloud service 1808 may include an authentication service, identity management platform, or the like used to identify and authenticated authorized users for various network resources. In another aspect, the cloud service 1808 may include a network monitor associated with third party network infrastructure or the like. For example, a firewall or other network hardware may be instrumented with a network monitor configured to obtain local activity logs and report these to other entities through a secure communication channel.

The cloud service 1808 may provide a range of information useful for investigating potential threats associated with the endpoint 1804. For example, the cloud service 1808 may provide application usage statistics, file or data transfer activity, logins and login attempts, and so forth. The cloud service 1808 may also or instead report on administrative activity such as new accounts, authentication histories, and so forth. In one aspect, the cloud service 1808 may also or instead expose underlying data that may be helpful in assessing threats. For example, where a user's electronic mail account is hosted on a cloud service 1808, electronic mail traffic (inbound, outbound, or both) may be analyzed to investigate, e.g., potential sources and targets of malicious activity. Other platforms such as ecommerce accounts, social media accounts, and the like, may also usefully be analyzed for relationships to potential malicious activity absent privacy restrictions or the like. While a single cloud service 1808 is shown, it will be understood that any number of cloud resources 1808 may be used by an endpoint 1804, and may provide data to a host 1803 as generally described herein.

The third party service 1810 may be any third party security service useful for identifying and/or investigating potential threats. For example, this may include a classification service such as MITRE ATT&CK™ which provides a framework for categorizing security threats deployed based on patterns of malicious tactics and techniques. As another example, this may include a dictionary of threat signatures or a real time database of active threats. More generally, any third party resource for identifying, characterizing, or responding to various threats may be used as a third party resource as described herein. In one aspect, MITRE data may be used to provide human readable categorizations and descriptions for potentially malicious activity detected on the endpoint 1804.

According to the foregoing, in one aspect there is described herein a system including a plurality of compute instances coupled to an enterprise network, a data lake storing an event stream from a number of sources of security data, the event stream including, and a threat management facility. The event stream may, for example, include security events from one or more sensors on the plurality of compute instances coupled to the enterprise network, cloud resource data from a cloud service supporting the plurality of compute instances coupled to the enterprise network, and contextual data for activity by the plurality of compute instances from a third-party service. The threat management facility may be configured to perform the steps of updating a composite threat score based on the number of sources of security data as the event stream is asynchronously received from the number of sources of security data, and automatically creating an investigation container for interactive investigation of security risks when the composite threat score meets a predetermined threshold for initiating an investigation.

Figure 19:
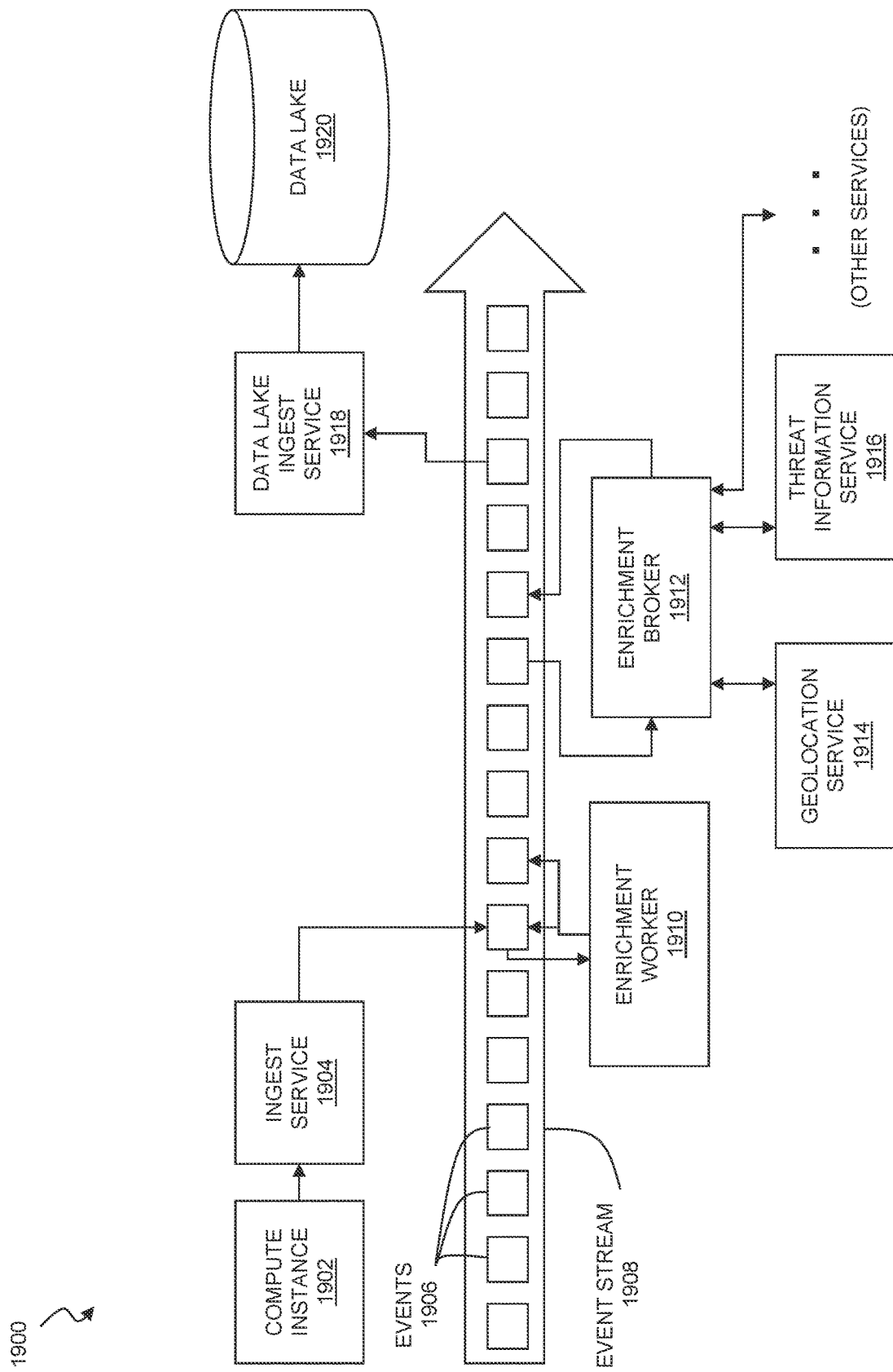
FIG. 19 shows an architecture for obtaining security data from a third party service.

FIG. 19 shows an architecture for obtaining security data from a third party service. In general, the system 1900 may use an enrichment broker or the like to inspect messages in an event stream, and then access external resources such as a geolocation service or a threat information service in order to enrich data in the event stream before persistent storage in a data lake.

A compute instance 1902, such as any of the endpoints or other compute instances described herein, may execute a local security agent that is instrumented to store local events in a data recorder and publish the data on any suitable schedule. The events may be any of the events, detections, and the like described herein, and the data recorder may include any of the data recorders described herein. As described herein, the compute instance 1902 may be associated with an enterprise network that is managed by a threat management facility.

An ingest service 1904 may execute on the compute instance 1902 or externally from the compute instance 1902, and may be deployed for example, using a microservices architecture to support flexibility and scalability. In general, the ingest service 1904 may receive (or request/retrieve) events 1906 from the compute instance 1902, format the events 1906 as needed, and publish the events 1906 to an event stream 1908. It will be understood that an "event" may include any of the events described herein, including events detected by a compute instance, events stored in a data store, threat detections and other indications of compromise derived from such events, events published to the event stream, augmented events that are enriched or otherwise processed on the event stream, and events stored in the data like. Although the format and content of such events may vary significantly, all such events are intended to be included in the scope of the term "event" unless a different meaning is explicitly provided or otherwise clear from the context.

The event stream 1908 may include any infrastructure, including hardware and software, suitable for managing and processing a stream of events. This may, for example, include any of a number of commercially available event processing technologies, data stream management systems, and the like, as well as proprietary event processing platforms with similar capabilities, and/or combinations of these suitable for use in an event-driven information system. In general, the event stream 1908 may support event visualization, event storage, event-driven processing, complex event processing, and so forth.

The system 1900 may include one or more enrichment workers 1910, which may monitor events 1906 on the event stream 1908, and enrich these events 1906 in any suitable manner. This may include formatting the events 1906 according to one or more schemas for the event stream 1908, normalizing the events 1906 for consistent representation of events 1906 from different sources, filtering the events 1906 to remove duplicate or unnecessary data, augmenting the events 1906 to provide additional data, mapping event data to known threat types, processing events 1906 to generate additional events 1906 for publication to the event stream 1908, and so forth.

While enrichment workers 1910 may usefully facilitate data normalization, filtering, deduplication, augmentation, and the like based on internal rules for an enterprise network, the system 1900 may also employ one or more enrichment brokers 1912 for enriching events 1906 in the event stream 1908 using external resources. This architecture advantageously provides a bridge to a wide range of external resources useful in detecting, identifying, and remediating threats to an enterprise network. The enrichment broker 1912 may generally monitor events 1906 on the event stream 1908, request data from one or more external resources based on event data in in the events 1906, and provide responsive data and analysis from the external resources. The responsive data may be used to enrich the corresponding events 1906, e.g., by writing directly to one or more fields in a schema of an existing event, or to create new events 1906 for publication to the event stream 1908, or some combination of these.

For example, in one aspect, the enrichment broker 1912 may access a geolocation service 1914 remote from the enterprise network and provided by a third party in a manner accessible to the enrichment broker 1912 through a data network. In one aspect, the geolocation service 1914 may respond to a request containing an IP address by providing any available geolocation data available for that IP address, including, by way of example and not limitation, a city, a state, a country, a country code, a postal code, a latitude, a longitude, and any other location information associated with the IP address. In another aspect, additional identifying information may be provided to the geolocation service 1914 such as a MAC address or other machine identifying information, where such information can be used by the geolocation service 1914 to improve an accuracy of location of a device.

As another example, the enrichment broker 1912 may access a security resource such as a threat information service 1916. In this context, the enrichment broker 1912 may provide a hash, metadata, code sample, or the like for a computing object such as a file or the like contained in or otherwise associated with one of the events 1906. The threat information service 1916 may respond with reputation data such as, for example, a reputation score associated with the computing object, a detection name such as a malware type and/or family for the computing object, and a reputation band that categorizes the computing object or the reputation score associated with the computing object using discrete bins or risk ranges. For example, the reputation bands may include a category for malware, possibly unwanted application, unknown application, or known good application. A threat information service 1916 may also or instead provide other information based on an analysis of a computing object sample. For example, the threat information service 1916 may provide remediation strategies, source identification, cryptographic authentication, or any other data useful for analyzing or assessing risks associated with computing objects and related events 1906 on the event stream 1908.

Other services may also or instead be used to enrich data on the event stream 1908. For example, this may include third party security services that identify or characterize risks, machine learning services configured to identify confidential or sensitive information (such as addresses, names, account numbers, and so forth), key management systems, and so forth. In another aspect, the service may include a lookup service that analyzes, e.g., file hashes, URLs, IP addresses, or other contextual data or metadata associated with an event. In another aspect, services such as a sandbox or other analytics tool may be provided, e.g., to execute code samples in a safe environment and provide any resulting analysis.

The system 1900 may include a data lake ingest service 1918 that generally serves to persist the enriched and augmented data on the event stream 1908 to the data lake 1920 in a manner that is consistent and queryable. This may include storing the events 1908 using any suitable schemas, which may be managed in a schema registry or the like. The data lake ingest service 1918 may also further augment data, e.g., by adding a customer identifier so that different events 1906 associated with different customers may be individually tracked, managed, and analyzed in the data lake 1920. The data lake 1920 may include any of the data lakes described herein, and may be accessed through a user interface hosted, e.g., by a threat management facility for the enterprise network.

Figure 20:
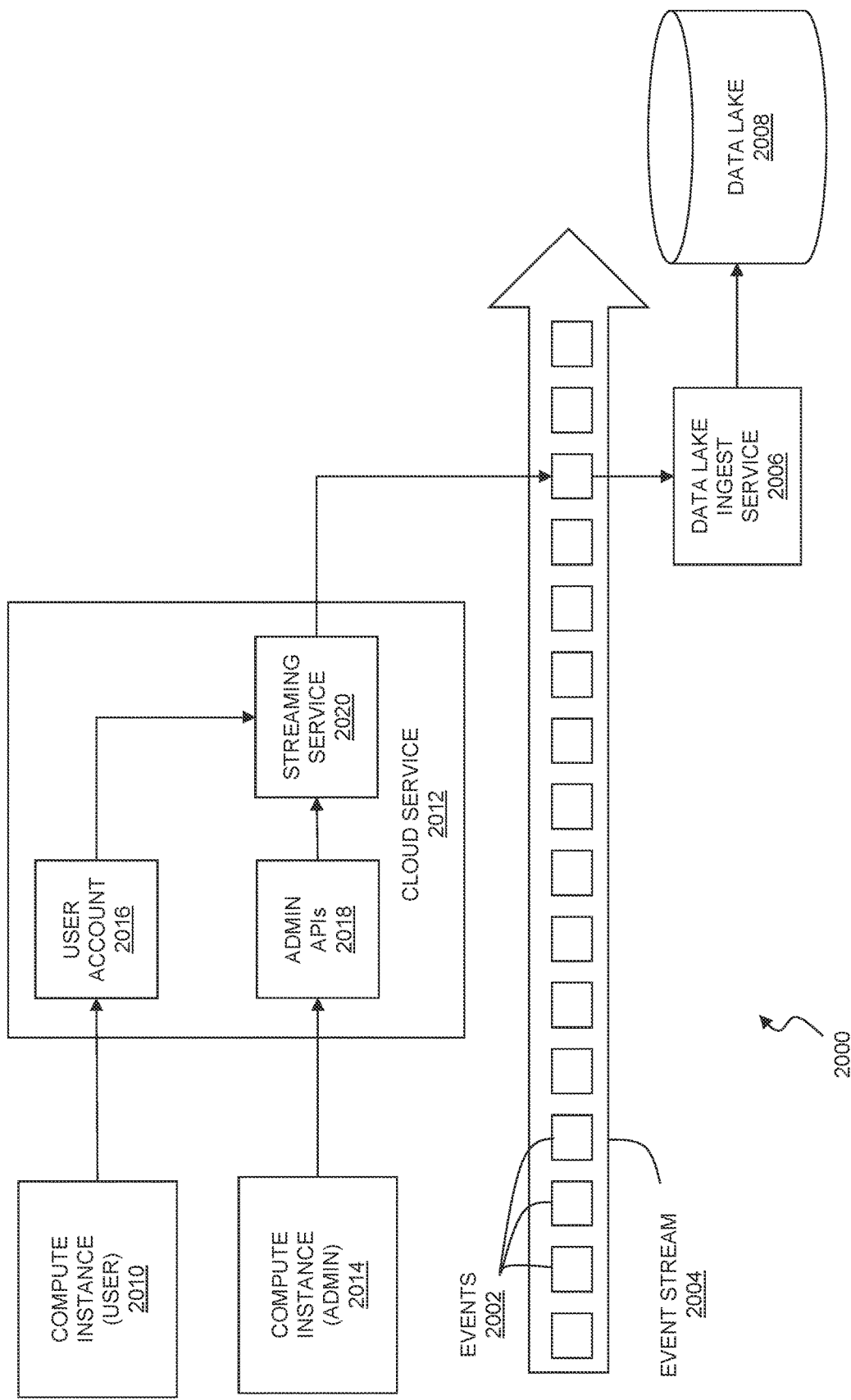
FIG. 20 shows an architecture for obtaining security data from a cloud service.

FIG. 20 shows an architecture for obtaining security data from a cloud service. While an enrichment broker may conveniently access external resources to enrich data on an event stream (e.g., the event stream 1908 described above), an enterprise network may also use any of a variety of cloud services to support users associated with the enterprise network. This can create additional challenges such as accessing user data and application usage data from the cloud service(s) and converting any resulting data feeds to be consistent in form and content with data in the data lake from other sources.

In general, a system 2000 may include events 2002 on an event stream 2004, such as any of the events and event streams described herein. The events 2002 may be processed by a data lake ingest service 2006, such as any of the ingest services described herein, for persistent storage in a data lake 2008, such as any of the data lakes described herein, for subsequent search and analysis.

A compute instance 2010 associated with an enterprise network, such as any of the compute instances described herein, may use a cloud service 2012 that supports users associated with the enterprise network. For example, a user at the compute instance 2010 may log in to a user account 2016 at the cloud service 2012, e.g., by authenticating to the cloud service 2012 with user credentials, authentication factors, or other data that identifies the user to the cloud service 2012.

The cloud service 2012 may include any remote computing resource, service, or the like that is external to an enterprise network, and accessible to users associated with the enterprise network through a data network or internetwork such as any combination of the public or private data networks described herein. For example, the cloud service 2012 may include an application platform such as Office 365 provided by Microsoft corporation, or any other similar network-accessible application suite for, e.g., electronic mail, document processing, presentations, spreadsheets, databases, and so forth. The cloud service 2012 may also or instead include a cloud storage service including file storage resources, databases, backup utilities, and so forth. In another aspect, the cloud service 2012 may include a cloud computing platform that provides computing resources for deploying applications, virtual servers, and so forth. In another aspect, the cloud service 2012 may include a virtualization platform for instantiating virtual compute instances for the enterprise network. Thus, by way of non-limiting examples, the cloud service 2012 may include any combination of an electronic mail application, a cloud storage service, a cloud computing service, a virtualization platform, an authentication service, an identity management platform, a web application, a zero trust network access resource, a social networking platform, a multi-tenant database, a virtual reality or augmented reality resource, and so forth.

In one aspect, a non-cloud resource may be configured to behave as a cloud resource for purposes of event monitoring. For example, an enterprise network may include a third-party firewall that logs traffic data locally. While it may be advantageous to publish log data from the firewall to the event stream 2004, the firewall may not include capabilities for secure external data communications. In this case, a network monitor may be installed on the firewall to communicate securely with external resources on one hand, and to query and report data from the firewall data log on the other. Thus, in one aspect, the cloud service 2012 may include a network monitor executing on a device such as a third-party firewall that is configured to provide a remote, secure interface to events locally detected on the device.

Once a user has accessed the cloud service 2012, the cloud service 2012 may internally generate cloud resource data of interest in threat investigation and management. For example, this may include authentication to the cloud service 2012, or the use of an identity management platform to authenticate to some other service. This may also or instead include administrative events at the cloud service 2012 such as user account changes, account permissions or preferences, notification rules, forwarding rules, and so forth. In another aspect, this may include application activity at the cloud service 2012 initiated from the compute instance 2010, such as opening, editing, sending, creating, or retrieving files, or other activities such as file searches, file sharing, and the like. For other tools such as an electronic mail server, this may include mail reading activity, as well as responses, deletions, handling of attachments, and so forth. It will be understood that by monitoring cloud resource data directly in or from the cloud service 2012, it may be possible to perform detections that are not possible by monitoring user activity directly. For example, if a user receives a large number of suspicious messages and/or attachments, or if a group of files are transmitted to an unknown address, this may be detected without the user accessing the corresponding electronic mail account.

In order to support the acquisition of cloud resource data in this manner, an administrator, e.g., an administrator of a threat management facility for an enterprise network, may log in to the cloud service 2012 from a second compute instance 2014 with an administrative or master account for the enterprise network. Using administrative Application Programming Interfaces (APIs) for the cloud service 2012, the administrator may configure a streaming service 2020 to monitor user account activity and publish any corresponding events 2002 to the event stream 2004. It will be noted that the streaming service 2020 is illustrated as a component of the cloud service 2012. Some cloud services have built in reporting or streaming services that may usefully be configured to publish events 2002 to the event stream 2004 as described herein. In another aspect, the cloud service 2012 may provide a programming environment that permits the administrator or other security personnel to create and deploy a service, process, application, or the like within the computing environment of the cloud service 2012 for performing these functions. Although not illustrated in FIG. 20, it will be understood that the streaming service 2020 may also or instead be deployed partially or wholly external to the cloud service 2012 in a manner that queries the cloud service 2012 for user account activity and publishes corresponding cloud resource data to the event stream 2004. For example, an application executing on the cloud service 2012 may pull log and activity data from the cloud service 2012, and an external microservice or the like may convert the activity data into events 2002 for publication to the event stream 2004 using a schema for the event stream 2004 and/or data lake 2008.

By way of non-limiting example, in a Microsoft Office 365 environment, an administrator may create a master application and add the application to resources of the cloud service 2012. The credentials for this master application may be saved at the threat management facility to facilitate administrative access to the cloud environment through administrative APIs 2018 that support, e.g., event graphing, identity management, authentication, application platform features and settings, and so forth. Audit capabilities of Office 365 may then be enabled through the administrative APIs 2018, and an application for a streaming service 2020 may be deployed in the cloud environment using the master application credentials. When executing on the cloud service 2012, the streaming service 2020 may ingest activity logs (e.g., for all users associated with the Office 365 customer) from the Office 365 audit functions and process these activity logs for publication to the event stream 2004. For example, the cloud resource data provided from the cloud service 2012, e.g., audit data from Office 365, may be filtered (e.g., to remove data that is not relevant to threat detection and management), mapped to a schema used by the event stream 2004 and/or data lake 2008, and transformed so that event descriptions, threat detections, and the like provided from the cloud service 2012 environment accurately match corresponding items in the schema used by the data lake 2008. The streaming service 2020 may usefully provide a list of known users associated with an enterprise. In one aspect, the streaming service 2020 may add user information to events, e.g., to identify a user (by an email address, user principal name, or other identifier) associated with each event. In another aspect, e.g., where the cloud service 2012 and/or data lake 2008 are deployed as multi-tenant databases, a customer identifier may be added to events 2002 to permit identification of the customer and an associated enterprise network within data in the event stream 2004 and the data lake 2008.

In this manner, cloud resource data for a complex enterprise system including data such as cloud computing statistics, network utilization, email server activities, identity management requests, and the like may usefully be monitored in an event stream 2004 independent from endpoint reporting. The events 2002 published to the event stream 2004 from the cloud service 2012 may also be augmented or enriched using any of the techniques described herein, such as the techniques described with reference to FIG. 19 above.

Figure 21:
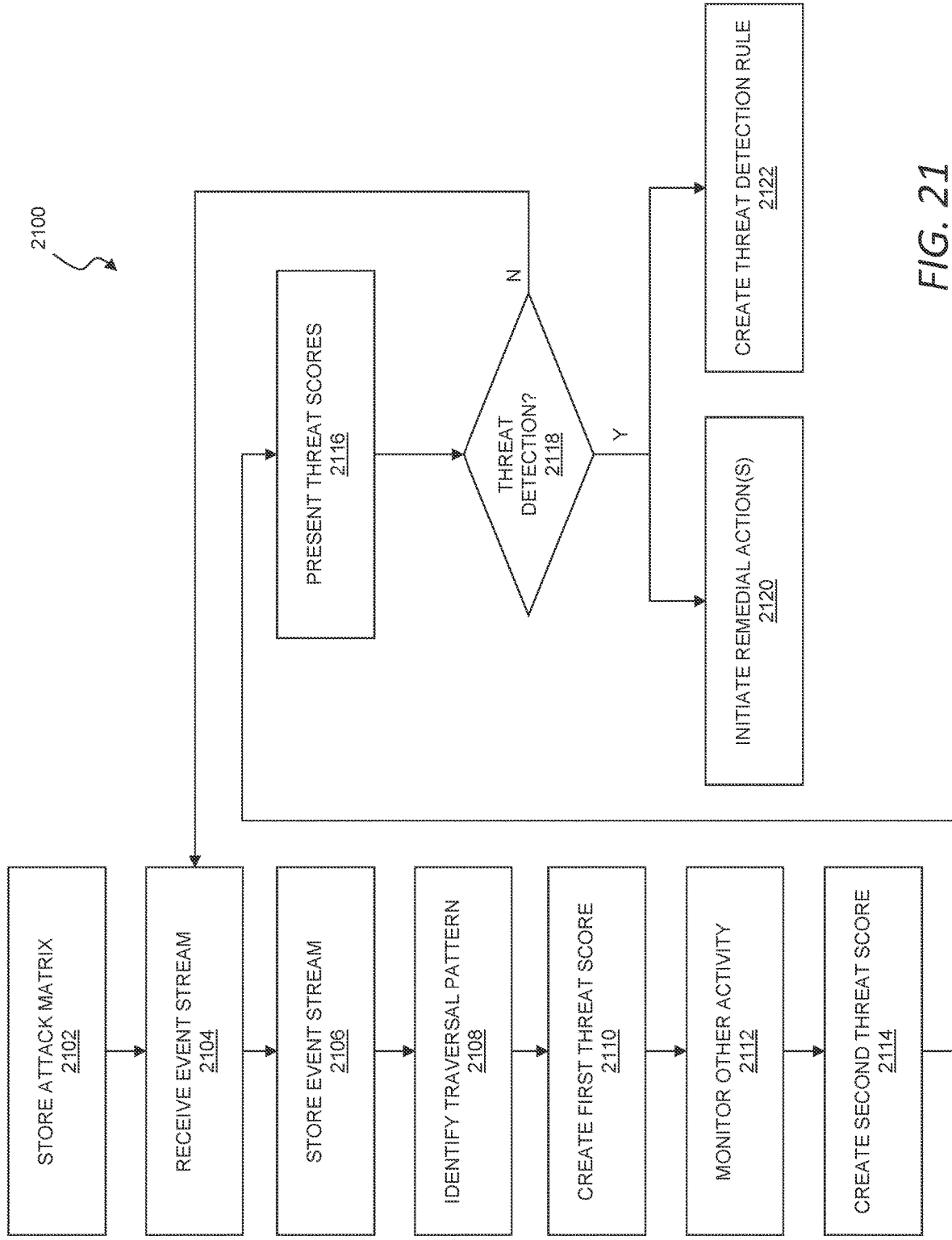
FIG. 21 illustrates a method for threat detection using an attack matrix and data lake queries.

FIG. 21 illustrates a method for threat detection using an attack matrix and data lake queries. This method 2100 may be deployed on one or more of the systems and devices described herein, and the steps of this method 2100 may be used alone or in any suitable combination with the steps of other methods described herein. In general, a threat management system may store an attack matrix characterizing tactics and techniques exploited by malware for various malicious actions. The threat management system may detect events on an endpoint or within an enterprise network, map these events to the attack matrix, and then provide threat detection based on patterns of traversal of the attack matrix. Where the threat management system provides a data lake of security events and a query interface for using the data lake to investigate security issues, useful inferences may also be drawn by comparing query activity in the query interface with the patterns of traversal of the attack matrix, such as by using a malicious pattern of traversal to identify a concurrent chain of queries indicative of a threat, or by presenting separate threat scores to an analyst based on query activity and patterns of traversal.

In the following description, the event stream, security events, sensors, compute instances, enterprise network, compute instances, data lake, query interface, administrative consoles, threat management facilities, and other components may be any of the corresponding components described herein.

As shown in step 2102, the method 2100 may begin with storing an attack matrix such as the attack matrix described with reference to FIG. 22. In general, the attack matrix may enumerate malware strategies in a first dimension and a number of malware techniques for each strategy in a second dimension. This may also include storing data to support malware detection using the attack matrix. For example, this may include storing a number of rules or the like for detecting malware based on patterns of traversal, or storing a machine learning model trained to recognize malware based on patterns of traversal.

As shown in step 2104, the method 2100 may include receiving an event stream including a plurality of security events from a plurality of sensors on a plurality of compute instances in an enterprise network.

As shown in step 2106, the method 2100 may include storing the event stream, for example in a data lake that provides a query interface to one or more administrative consoles of a threat management facility. The event stream may also or instead be stored in any suitable persistent or transient storage medium suitable for the purposes described herein.

As shown in step 2108, the method 2100 may include identifying a pattern of traversal of the attack matrix indicative of a malware threat on one of the compute instances based on two or more of the security events in the data lake. This may, for example, include two or more security events detected on a single compute instance, or two or more security events detected on a number of compute instances in the enterprise network, or some combination of these.

In general, a pattern of traversal of the attack matrix may correspond to a chronological deployment of particular techniques detected on the compute instance. Where this pattern reflects a sequence of techniques typically used in order to maliciously access or control a computing device, the pattern may indicate a corresponding malware threat on the device. For example, the pattern may be indicative of an item of malware on the compute instance performing a series of specific tasks in furtherance of a malicious objective. The pattern may also or instead be indicative of a breach of the enterprise network, such as a breach exposing control of a compute instance that might lead to, but has not yet resulted in, a compromise of data and/or compute instances in the enterprise network. As a significant advantage, tracking a chronological sequence in which known strategies and tactics are deployed, more specifically by mapping security events to the attack matrix, may permit the identification of developing malware attacks based on recognizable attack strategies even in the absence of specific malware signatures or code behavior.

A variety of techniques may usefully be employed to identify patterns of traversal indicative of malicious activity. For example, a machine algorithm may be trained to identify malicious patterns based on a training data set that associates one or more patterns of traversal with one or more known malware instances, or more generally, with a training data set labeled with known benign and malicious traversal patterns. In this manner, a machine learning detection model may be deployed that receives traversal patterns, e.g., as ordered sequences of techniques in the attack matrix, and generates a detection output such as a likelihood of the presence of malware or a probability of each of one or more specific types of attacks. In another aspect, identifying the pattern may include applying one or more rules that specify an order of traversal within the attack matrix associated with malicious activity. More generally, any technique or combination of techniques useful for identifying malicious activity based on an ordered sequence of specific techniques may be used in combination with the attack matrix to support detection or risk scoring as described herein.

It will be understood that, while a pattern of chronological traversal of the attack matrix may usefully be employed in this context, the method 2100 may also or instead include identifying a pattern of coverage of the attack matrix. That is, a pattern within the attack matrix based on two or more security events, e.g., security events in the data lake, may be indicative of a malware threat on one or more of the compute instances. This may include a scope of the pattern, e.g., where security events appear in the attack matrix, as well as a frequency of the pattern, e.g., how many occurrences of one or more security events appear in a cell of the attack matrix (or a number of cells in the attack matrix). Thus, it will be understood that, while a chronological pattern of events is emphasized herein as an indicia of possible malware, a spatial pattern and or numerical pattern of events within the attack matrix may also or instead be used without departing from the scope of this disclosure, and all such patterns are intended to be included in a pattern as that term is used herein, unless a more specific meaning is explicitly provided or otherwise clear from the context.

As shown in step 2110, the method 2100 may include creating a first threat score for one of the compute instances based on the pattern of traversal of the attack matrix. In one aspect, scoring may be performed directly, such as by converting an output of a machine learning model into a score using any suitable scaling, weighting, quantization, categorization, or the like. In another aspect, multiple outputs of a detection model such as the machine learning model may be weighted based on corresponding risks of different types of potential threats. Thus, for example, the threat score may include a weighted sum of probabilities of different types of threats, as identified by a machine learning model. In another aspect, e.g., where a rules-based technique is used, the threat score may be based on a type of malware predicted using one or more detection rules, or as a weighted sum of probabilities for different types of threats indicated by the rules based technique.

In general, the pattern within the attack matrix used for threat scoring, whether a spatial pattern, a numerical frequency pattern, or a chronological pattern, may include events from any one or more endpoints within the enterprise network. It will also be understood that a window for aggregating events within the pattern may be fixed, variable, or some combination of these. For example, in one aspect, events may simply be grouped by date and used for pattern detection based on occurrence on a single day. In another aspect, a pattern for each individual endpoint may include two or more days, e.g., where a pattern is related to detection of complex patterns or slowly and incrementally deployed malware. In another aspect, the window for pattern detection may be variable, e.g., where one or more events are known to be potentially related to an attack with a long deployment timeframe. In this latter case, a standard window of, e.g., one day may be used for detecting patterns, while the window for accumulating events into a pattern may be extended when a number of initial events indicate that additional time may be useful for certain detection types.

As shown in step 2112, the method 2100 may include monitoring other activity to assist in threat detection. For example, this may include monitoring a usage of the query interface for the data lake, e.g., by tracking a plurality of queries to the data lake from one or more administrative consoles. Query activity may be used, e.g., as described herein, to detect patterns of query indicative of a threat, or to create detection rules based on a correlation of the query activity to a threat that is detected based on patterns within the attack matrix. It will be understood that other activity may also or instead be used to assist in detection as described herein. For example, in one aspect, detection based on patterns within the attack matrix may be combined with individual detections from an endpoint, e.g., where individual detections are used to identify the locus of a general threat detected with the attack matrix, or where patterns within the attack matrix are used to verify or further investigate individual endpoint detections of uncertain conviction.

As shown in step 2114, the method 2100 may include creating a second threat score for one of the compute instances based on the usage of the query interface. In general, this may include using any of the techniques described herein to assess a likelihood of risk based on a pattern of queries to the data lake, along with any other available contextual information where such information assists in assessing malicious activity within the enterprise network. For example, this may include creating the second threat score based on a pattern of usage of a number of stored queries for the query interface, or creating the second threat score based on a change to one of a number of stored queries for the query interface. For example, where a user requests data in a particular order, or makes a specific change to a pre-existing, stored query, e.g., to expand a search or focus on a particular type or source of data, this may indicate an expanding threat investigation suggesting a higher potential risk or higher likelihood of compromise within the enterprise network.

As shown in step 2116, the method 2100 may include presenting the first threat score and the second threat score in a display of one of the administrative consoles when at least one of the first threat score and the second threat score meet a predetermined threshold. This may, for example, include separately displaying each of the threat scores, or displaying a composite threat score based on the first threat score, the second threat score, and/or one or more other scores such as any of the threat scores described herein. In one aspect, presenting the first threat score and the second threat score in the display may include presenting an alert in the display that provides a link to additional data concerning the first threat score and the second threat score, such as descriptions of supporting query behavior, attack matrix traversal, and the like, as well as other objective risk data relating to the compute instance and/or the enterprise network.

In one aspect, the predetermined threshold for displaying risk data may include a threat score threshold such as a specific numerical value that is compared to the threat score(s). In another aspect, the predetermined threshold may be a percentile threshold for a number of compute instances in the enterprise network. For example, if the threat score(s) fall among the riskiest percentile group, then the threat score(s) may be displayed. The percentile threshold may be a fixed percentile, e.g., the top ten percent, or a variable percentile, e.g., the top five percent when there are several very high risks, or the top ten, fifteen, or twenty percent, when there are primarily or exclusively low risks objectively assessed throughout the enterprise network.

As shown in step 2118, the threat score(s) may be used to perform threat detection within the enterprise network. That is, instead of, or in addition to, displaying a threat score, the method 2100 may include detecting whether a threat is present in the enterprise network based on the threat score(s). If a threat (or potential threat) is detected in step 2118, for example when the threat score(s) meet a second predetermined threshold for risk detection, the method 2100 may proceed to step 2120 where remedial action can be initiated, and/or to step 2122 where a threat detection rule is created. Otherwise, the method 2100 may proceed to step 2104 where the process may continue to receive events, store events, score events, and so forth.

As shown in step 2120, in response to detecting a threat, the method 2100 may include initiating one or more remedial actions. This may include any of the remedial actions described herein. By way of example and not limitation, this may include adjusting filtering of events at one or more of the compute instances, updating security software, quarantining compute instances, running malware detection software on one or more of the compute instances, isolating one or more of the compute instances, sandboxing potentially malicious code, rebooting one or more of the compute instances, restricting network traffic for one or more of the compute instances, and so forth.

As shown in step 2122, in response to detecting a threat, the method 2100 may include creating a threat detection rule associated with any corresponding activity. In general, the techniques for scoring based on the attack matrix and query usage may be used independently as risk assessment tools. However, these scoring techniques may also advantageously be used in combination to detect new, zero-day threats and the like. For example, a malware threat may be detected based on usage of queries of the data lake, as generally described herein. In response to such usage indicating a malware threat, the method 2100 may include examining a pattern of traversal of the attack matrix, and creating a new rule for threat detection based on the pattern of traversal associated with the query activity. This may include a pattern of traversal concurrent with the query activity, immediately preceding the query activity, or preceding the query activity over some predetermined time period, which may range anywhere from seconds to days, depending on the nature of the corresponding threat. It will also be understood that in this context, the pattern of traversal may be filtered or otherwise processed to improve detection quality. For example, where a number of query sequences are associated with a number of instances of malware, the pattern of traversal preceding each such query sequence may be compared in order to remove extraneous events/detections.

It will be understood that, while a particular order of steps are indicated in FIG. 21, the order of these steps may be modified. For example, the query-based threat score and the traversal-pattern threat score may be calculated in any order, or may be calculated in parallel using separate processes or the like, and the event stream may be continuously updated and stored in the data lake while other process steps are performed. More generally, the steps may be changed or reordered in any manner consistent with the techniques described herein.

According to the foregoing, there is disclosed herein a system including a data lake storing an event stream including security events from one or more sensors on compute instances in an enterprise network, an administrative console configured to execute queries against the data lake, a plurality of queries stored in a database for execution against the event stream at the administrative console, the plurality of queries configured to investigate security issues within the enterprise network based on the event stream, a query monitoring agent configured to monitor a usage of the plurality of queries at the administrative console, an attack matrix stored in the database, the attack matrix enumerating malware strategies in a first dimension and malware techniques for each of the malware strategies in a second dimension, and a threat management facility. The threat management facility may be configured, e.g., by computer executable code, to create a first threat score for a compute instance associated with the enterprise network based on a pattern of traversal of the attack matrix by a number of the security events in the event stream and to create a second threat score for the compute instance based on the usage of the query interface, the threat management facility further configured to present the first threat score and the second threat score for the compute instance in the administrative console.

In one aspect, the query monitoring agent may be configured to determine a usage history based on the usage of the plurality of queries, and to initiate an action by the threat management facility based on the usage history. In another aspect, the threat management facility may be configured to monitor post-query activity from the administrative console, and to detect malicious activity based on the usage of the query interface and the post-query activity. The threat management facility may also or instead be configured to launch an investigation container such as any of the investigation containers described herein when at least one of the first threat score and the second threat score meets a predetermined threshold.

FIG. 22A illustrates a first portion of an attack matrix, and FIG. 22B illustrates a second portion of an attack matrix, i.e., the attack matrix of FIG. 22A. It will be understood that FIGS. 22A and 22B show the same attack matrix 2200 where FIG. 22B includes an attack matrix 2200 that is a continuation of the attack matrix 2200 of FIG. 22A, where element 'A' shown in the figures is the connecting point for the two portions of the attack matrix 2200. In general, the attack matrix 2200 may enumerate malware strategies in a first dimension and a number of malware techniques for each strategy in a second dimension. The attack matrix 2200 may be stored in any suitable format in a location accessible to a threat management facility that uses the attack matrix 2200 to track patterns of malware deployment.

By way of non-limiting example, the attack matrix may use categories for malware strategies and techniques such as those defined in the MITRE ATT&CK coverage map. This coverage map lists tactics such as initial access, execution, persistence, privilege escalation, defense evasion, credential access, discovery, lateral movement, collection, command and control, exfiltration, and impact. For each of these strategies, the MITRE coverage map outlines techniques (and "sub-techniques," in the MITRE rubric) suitable for detection using various threat detection tools. For example, the initial access technique in this coverage map may include techniques such as drive-by compromise, exploit public facing application, external remote services, hardware additions, replication though removable media, spearphishing attachment, spearphishing link, spearphishing via service, supply chain compromise, trusted relationship, and so forth. More generally, any matrix, mapping, table, or other arrangement of these various techniques suitable for tracking a pattern of individual exploits suggestive of malicious activity may be used as an attack matrix as described herein. The use of industry standard categories of tactics such as those in the MITRE coverage map may advantageously facilitate integration with other pre-existing events, detection types, detection rules, and the like.

A pattern of traversal 2202 is illustrated within the attack matrix 2200 using a number of circled techniques coupled by arrows. This pattern of traversal 2202 may be detected using any of the threat detection techniques described herein, and each detected event may be mapped to a technique within the attack matrix 2200, yielding a pattern of traversal that proceeds chronologically or sequentially from technique to technique within the attack matrix 2200. As further described herein, this pattern of traversal 2202 may provide a useful basis for threat detection using the techniques described herein.

Figure 23:
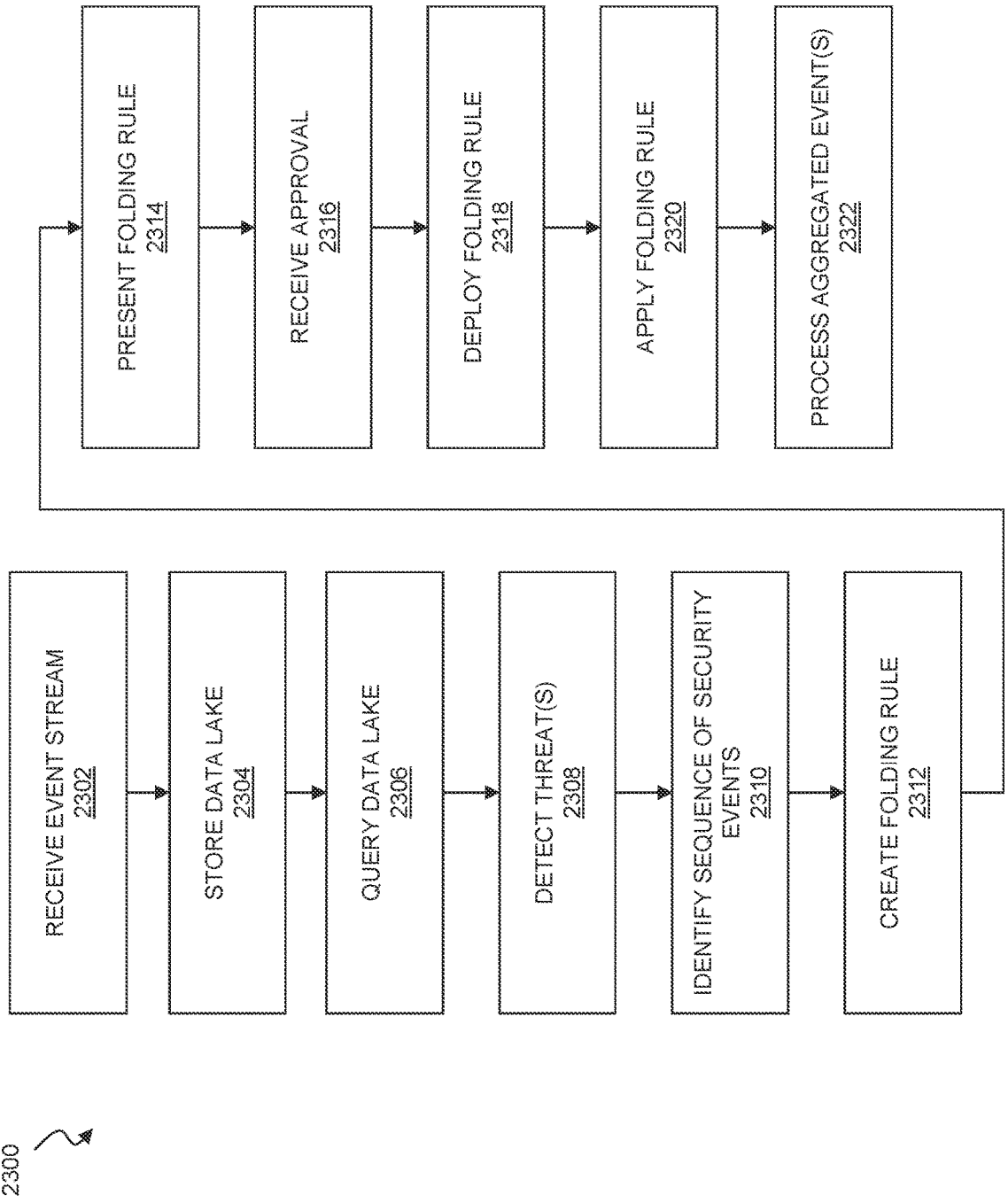
FIG. 23 is a flow chart of a method for streaming and filtering event objects into a data lake.

FIG. 23 is a flow chart of a method for streaming and filtering event objects into a data lake. This method 2300 may be deployed on one or more of the systems and devices described herein, and the steps of this method 2300 may be used alone or in any suitable combination with the steps of other methods described herein. In general, an asynchronous stream of security events may be added to a data lake for enterprise security by identifying groups of related events related to a security threat, and creating rules to fold these related events into a single security event along with metadata. The folding rules may then be applied to security events in the event stream to compress data in the data lake and improve detection efficiency.

As shown in step 2302, the method 2300 may include receiving an event stream, such as any of the event streams described herein. In general, this may include a plurality of data objects received in an asynchronous stream of security events from the enterprise network. This may also or instead include a combination of batch transfers including groups of security events that are batched for publication to the event stream, and streaming transfers of individual security events from one or more of the plurality of compute instances, e.g., as the events are detected. In one aspect, the event stream may include one or more events received from data recorders on compute instances in the enterprise network.

As shown in step 2304, the method 2300 may include storing a data lake based on the event stream. This may, for example, include storing a plurality of data objects representing a plurality of security events, such as any of the events described herein, received on the event stream, e.g., from one or more data recorders on a plurality of compute instances in an enterprise network. This may include any of the data recorders, compute instances, and enterprise networks described herein. In one aspect, this may include filtering each of the plurality of security events in the event stream with a deduplication lookup before adding to the data lake in order to prevent an accumulation of redundant data in the data lake. In another aspect, this may include storing the plurality of security events in the data lake as one or more data objects each augmented with a description organized according to a schema, such as a schema used by the data to structure data received in the event stream.

As shown in step 2306, the method 2300 may include querying the data lake, e.g., using any of the user interfaces and/or query interfaces described herein.

As shown in step 2308, the method 2300 may include detecting threats based on data in the data lake. For example, this may include detecting a number of threats in the enterprise network at a threat management facility using the query to the data lake, which may be initiated, e.g., from an administrative console of the threat management facility. This may also or instead include a detection using any of the techniques described herein such as monitoring query activity, tracking traversal patterns on an attack matrix, and so forth.

As shown in step 2310, the method 2300 may include identifying one or more sequences of security events related to a threat. In one aspect, this may include manually reviewing sequences of events preceding an identified threat. In another aspect, this may include automatically identifying a characteristic sequence of security events in the event stream preceding each of a number of threats detected, based on the data lake queries, using one or more pattern recognition tools to analyze the plurality of data objects in the data lake. The characteristic sequence of security events may include a sequence of similar events from a plurality of compute instances in the enterprise network or a sequence of similar events from a single compute instance in the enterprise network.

As shown in step 2312, the method 2300 may include creating a folding rule in response to detecting the threats. For example, this may include, in response to detecting the number of threats and identifying the characteristic sequence of security events, automatically creating a folding rule for combining the characteristic sequence of security events into an aggregated security event in the data lake. The folding rule may also or instead specify one or more rules for augmenting the aggregated security event with metadata describing the characteristic sequence of events. For example, the folding rule may capture a first incident of a repeated event, a number of times a similar or identical event is repeated, a last time of occurrence, a time interval over which the multiple events occur, and so forth. More generally, the metadata may characterize a number of events in the sequence of security events, a frequency of events in the sequence of security events, and a first and last security event in the sequence of security events.

By way of non-limiting example, where a compute instance transmits a large file to a remote storage facility as a number of individual packets, the folding rule may simply note the time the communication was initiated, the destination, and the number of packets (or size of the file). As another example, where a user logs in multiple times, this may be folded into a single login event that identifies the time of a first login and the number of logins. Similarly, events may be folded across compute instances. For example, a particular type of detection might be observed at numerous endpoints within an enterprise network, and this may be compressed into a single data lake item identifying the detection and the number of affected endpoints. The folding rule may also or instead provide a filter, e.g., that simply discards duplicative events that are either literal duplicates of another event, or that do not provide additional information useful for threat detection. In one aspect, folding rules may be created to save storage space, e.g., where individual events are discarded after an aggregated event is created by the folding rule. In another aspect, the folding rules may be created to improve detection, in which case the aggregated event can provide useful data for efficient downstream threat detection while the data lake can also retain each of the individual events underlying the aggregated event.

More generally, there are events within an enterprise network that differ, if at all, only with respect to an accompanying time stamp, or an accompanying machine or user identifier. In these cases, events may usefully be folded or otherwise aggregated into a single object of interest. This may include operating system detections such as login failures, suspicious file detections such as double file extensions (e.g., in a syntax [filename].xxx.yyy, so that the user interface will display the filename with a misleading filename), and so forth. In one aspect, detections may be categorized by, e.g., risk, geographic region, customer, classification rule (e.g., for event type), attributes (filename, user, path, etc.), event type, and so forth in order to identify high-frequency events that might usefully be folded. Where events with identifiable characteristics show very high frequency within some historical interval, this may provide a basis for automatically or manually creating detection-oriented folding rules.

As shown in step 2314, the method 2300 may include presenting the folding rule in a user interface or other display for human review.

As shown in step 2316, the method 2300 may include receiving an approval of the folding rule. This may be a manual approval provided from an administrator at a console of the threat management facility, or by some other system user or technician, and may usefully be required before the folding rule is deployed for use with the event stream.

As shown in step 2318, the method 2300 may include deploying the folding rule for use in filtering and/or processing a stream of events before storage in the data lake. It will be understood that, while the emphasis in this description is on folding rules for events stored in the data lake, folding rules may also or instead usefully be identified for, and deployed to, compute instances for use in local monitoring. In general, the characteristic sequence of events may include a sequence of similar (or identical) events from two or more of the plurality of compute instances in the enterprise network, or a sequence of similar (or identical) events from a single one of the plurality of compute instances in the enterprise network.

As shown in step 2320, the method 2300 may include applying the folding rule. This may, for example, include receiving a second plurality of security events and applying the folding rule to create an instance of an aggregated security event from a second plurality of data objects in the second plurality of security events on the event stream. The second plurality of security events may be any of the events described herein. For example, the second plurality events may be an asynchronous stream of security events from the enterprise network, the asynchronous stream including a combination of batch transfers including groups of security events and streaming transfers of individual security events from one or more compute instances in the enterprise network.

As shown in step 2322, the method 2300 may include processing the aggregated event(s) created by the folding rule. This may include any use of, or revision to, an aggregated event. For example, this may include storing the instance of the aggregated security event created by the folding rule in the data lake. This may also or instead include performing a malware detection for the enterprise network with the threat management facility using one or more instances of the aggregated security event stored in the data lake. As noted above, this may advantageously improve the efficiency and reduce the computational complexity of certain detections where a pattern of interest within a data stream that can be accurately compressed into a representative aggregated event. In another aspect, this may include initiating a remediation of a threat to the enterprise network with the threat management facility based on one or more instances of the aggregated security event stored in the data lake.

Folding rules such as those described herein may more generally operate to compress data for communication to a data lake, or to more effectively distribute storage across endpoints within an enterprise network. That is, while in some cases a folding rule may be created to efficiently manage repetitious, low-value events in a lossy manner where data about individual events is lost, in other cases, the data may be amenable to various forms of compression for storage or communication within a lossless representation of the relevant sequence of detected events. For example, in one aspect, a sequence of related events may be compressed, e.g., by converting a sequence of detections to a list of time stamps for identically or substantially identical events, in a manner that permits compact communication to the data lake as a single meta-event, followed by decompression at the data lake into individual events used for detection. This may be useful, for example, where an analysis of the individual events might potentially be useful for threat detection, but the nature of the sequence is amenable to more efficient representation during communication to the data lake. In another aspect, the folding rule may alleviate storage requirements for the data lake, e.g., by storing certain information at a source compute instance (e.g., a specific list of time stamps, machine identifiers, event identifiers, process names, users, or the like), e.g., in a data recorder or other storage facility on the compute instance, while sending a folded representation with, e.g., a time stamp for a first and last event, along with a count of the number of events in the folded meta-event. This approach permits a query to the compute instance to retrieve the full representation of the underlying events, without requiring the corresponding data to be transmitted to the data lake and stored at the data lake in the first instance.

According to the foregoing, this is also described herein a system including a data lake, a stream service, and a transformer service such as any of the data lakes, stream services, and transformer services described herein. The data lake may include a data storage medium storing a first plurality of data objects representing security events within an enterprise network and a plurality of descriptions for the first plurality of data objects, each of the plurality of descriptions organized according to one or more schemas. The stream service may be configured to receive an asynchronous event stream of additional data objects representing security events from the enterprise network. The transformer service may be configured to process the asynchronous event stream by filtering the additional data objects to remove duplicate one or more data objects already stored in the data lake, thereby providing filtered data objects, to augment each of the filtered data objects with a corresponding description organized according to one of the one or more schemas, thereby providing augmented data objects, and to store the augmented data objects in the data lake. The transformer service may also be configured to apply a folding rule for aggregating a sequence of similar events into an aggregated security event for storage in the data lake, the folding rule augmenting the aggregated security event with metadata that characterizes one or more of a number of events in the sequence of security events.

In one aspect, the folding rule may be automatically generated by correlating one or more prior instances of the sequence of similar events with a behavior of interest in the enterprise network. In another aspect, the metadata may characterize one or more of a number of events in the sequence of security events, a frequency of events in the sequence of security events, and a first and last security event in the sequence of security events.

Figure 24:
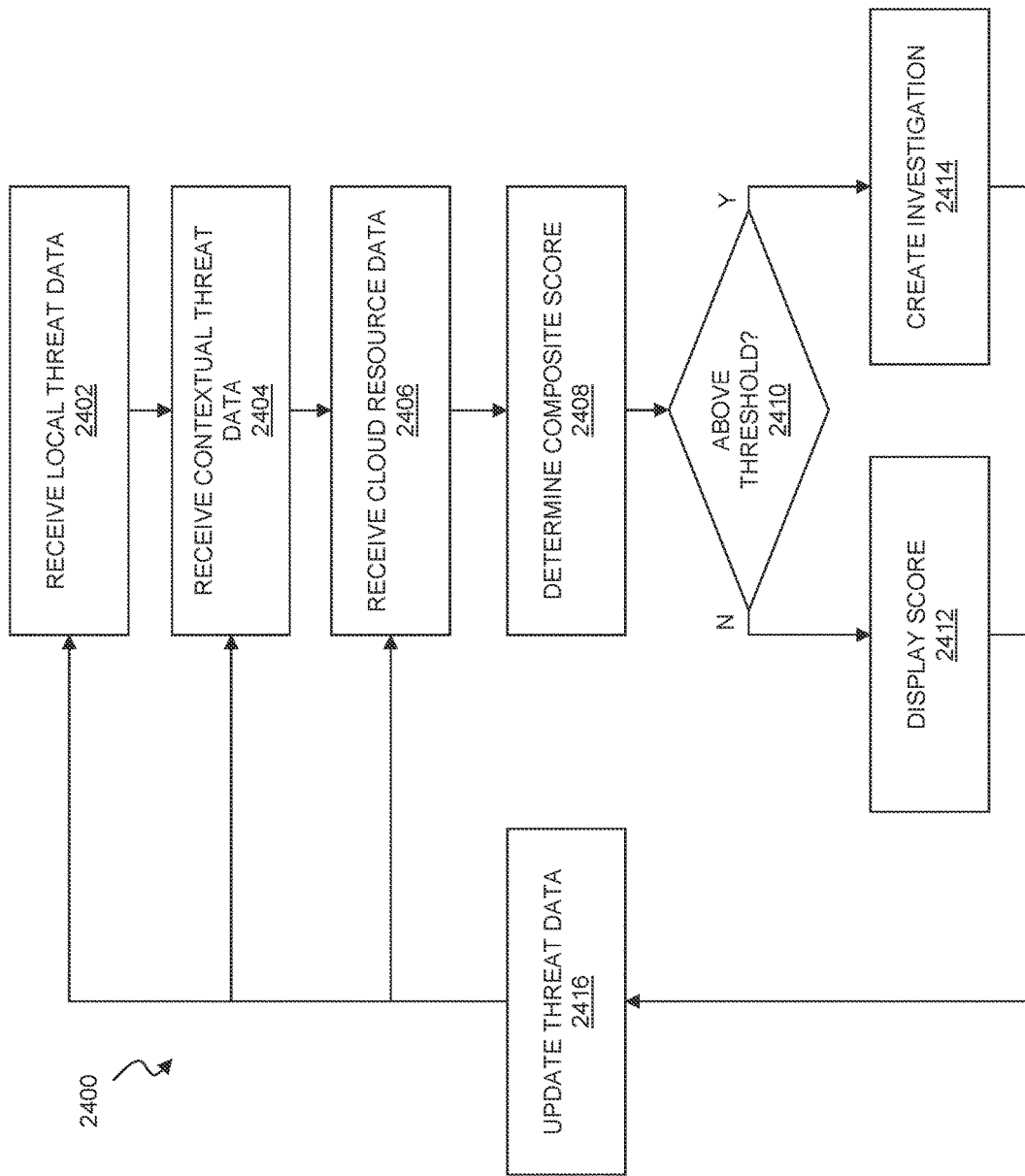
FIG. 24 is a flow chart of a method for augmenting threat investigation.

FIG. 24 is a flow chart of a method for calculating a composite threat score. This method 2400 may be deployed on the systems and devices described herein, and the steps of this method 2400 may be used alone or in any suitable combination with the steps of other methods described herein. As described herein, a platform for threat investigation in an enterprise network receives threat data from managed endpoints, and is augmented with data from cloud computing platforms and other third-party resources. The resulting merged data set can be incrementally updated and used to automatically launch investigations at appropriate times. In general, a composite threat score can be derived based on data from multiple sources of threat information that are received at a host or other central resource for threat investigation. When the composite threat score is above a predetermined threshold, an investigation may automatically be created to support review and analysis of contextual threat information. Threat data may be updated as information from different sources becomes available, and presented on an as-available basis in a user interface for investigation and action by a technician.

As shown in step 2402, the method 2400 may include receiving a local threat indication from an endpoint. This may include data from a local security agent on an endpoint such as any of the endpoints described herein. The data may be received, for example at the host described above, or any other resource or the like supporting a threat investigation platform as contemplated herein. The local threat indication may, for example, include an event on the endpoint indicative of malicious activity. The local threat indication may also or instead include a threat detection obtained by a local security agent by applying a detection rule to events detected on the endpoint. For example, threat detection rules, threat signatures, machine learning models, and other resources may be deployed on the endpoint and used by the local security agent for local threat detection. Any such tools, models, rules, and the like may be used locally by the endpoint to generate a local threat indication as described herein. The local threat indication may also or instead include a classification indicating a category of malicious activity associated with events detected on the endpoint. This may be, for example, a classification provided by a third party resource such as the MITRE ATT&CK classification system, or any other suitable taxonomy, classification resource, or the like.

As shown in step 2404, the method 2400 may include receiving a contextual threat score calculated by a threat management facility based on event data received from contextual information received at the threat management facility. The threat management facility may use any context, event information, or the like, as generally described herein, and may evaluate a threat based on data from the endpoint, from other endpoints, from event context, or any combination of these. For example, the contextual information may include one or more of classification information for a suspected threat, a network location associated with a suspected threat, geolocation data for a suspected threat (which may be obtained using various geolocation resources that associated, e.g., the IP address space on the Internet with various geographic locations), one or more of a path a filename, a process name, and a machine identifier for a suspected threat, and a threat score based on one or more of machine learning rules and heuristic rules. It will be understood that contextual information may also or instead include events or event vectors received from the endpoint, and/or from other endpoints within an enterprise network or the like.

In one aspect, contextual information includes any transient threat data such as third-party data provided from sources of contextual information independent from the enterprise security infrastructure. This may, e.g., include third-party threat identification or threat scoring tools, geolocation services, reputation databases, threat signature databases, and so forth. As a significant advantage, feeding contextual information of this type to the data lake provides a non-transient record that can be subsequently analyzed to evaluate a threat posture at the time that the information was acquired, and to detect changes to the context over time. For example, contextual information such as third-party geolocation data or third-party threat scoring relies on external resources that may provide different information when queried at different points in time. By way of non-limiting example, a geolocation of an IP address, or the IP address or URL of a command and control center for an advanced persistent threat, may be unknown at the time that an event is recorded, but may be discovered or changed at a later time. These changes over time would not generally be available in a form that can be monitored by the enterprise. In order to ensure that the contextual information is properly placed in a chronology of events when scoring threats or performing forensic analysis, the contextual information may be stored in a manner that permits investigation of the known context at a particular point in time. It will be understood that in order to facilitate any corresponding time-based or time-sensitive analysis, contextual information as described herein may usefully be time-stamped when stored in the data lake based on the time of acquisition of the data from a third party resource or other transient data source. This approach may also facilitate the creation, refinement, or other use of machine learning models in which data samples such as code segments are tagged with contextual information that was available at a particular time of interest.

As shown in step 2406, the method 2400 may include receiving cloud resource data based on an action associated with the endpoint at a cloud service. In general, the cloud service may be any of the cloud services described herein. By way of non-limiting examples, the cloud service may include one or more of an electronic mail application, a web application, a cloud storage service, a zero trust network access resource, a virtualization platform, a cloud computing service, and an authentication service. The cloud resource data from such cloud services may include, e.g., one or more of authentication to the cloud service, administrative events at the cloud service, and application activity at the cloud service initiated from the endpoint. The action associated with the endpoint that triggers the generation of cloud resource data may, for example, include an activity by a user of the endpoint such as access or use of the cloud service by the user that was initiated from the endpoint. The action may also or instead include an activity by an administrator for an enterprise network associated with the threat management facility, where such an activity might be relevant to evaluation of a potential threat.

The cloud service may also be any other remote service or device that is made cloud-accessible through suitable hardware and software. For example, the cloud service may include a firewall, e.g., by adding a network monitor executing on a third party firewall to transmit firewall log data through a secure communication channel. More generally, any network device or other hardware or software that might usefully be monitored for security purposes may be configured as a cloud service by providing a network interface for securely accessing corresponding data and functions.

As shown in step 2408, the method 2400 may include determining a composite threat score for the endpoint based on at least the local threat indication, the contextual threat score, and the cloud resource data. It will be appreciated that data from the various possible sources may be combined in a number of different ways. For example, each source may independently score risk (or present data that can be scored by the host), and the composite threat score may reflect the highest individual score from each of these independently scored risks. In another aspect, scores from the sources may be combined on a weighted or non-weighted basis, or otherwise combined to obtain a composite score representing contributions from each independent source of data.

It will be understood that the composite threat score may be based on other data that is processed as described herein. For example, this may include telemetry data from any of the sensors described herein, which may be processed using one or more folding rules to reduce noise and augment useful detection signals in the telemetry data. It will also be understood that the folding rules may include, e.g., folding rules deployed on a compute instance to locally reduce noise in telemetry data from sensors on the compute instance, or this may include folding rules deployed at the data lake to compress or otherwise represent telemetry data from the entire enterprise (or individual compute instances within the enterprise) in a manner that removes repetitious data of low value to threat analysis.

As shown in step 2410, it may be determined whether the composite threat score is above a predetermined threshold for automatically initiating investigation. If the composite threat score is not above the predetermined threshold, the method 2400 may proceed to step 2412 where the score may be displayed. If the composite threat score is above the predetermined threshold, then the method 2400 may proceed to step 2414 where an investigation is created.

As shown in step 2412, the method 2400 may include displaying the composite threat score in a user interface, such as any of the threat investigation user interfaces discussed herein. This may include optionally displaying the composite threat score (along with accompanying summary information for the suspected threat), subject to any filters in place in the user interface. Thus, the user interface may be configured to only display threats above a filtering threshold. This may also include ranking or ordering suspected threats (above the filtering threshold) using any suitable criteria such as the value of the composite threat score, user, threat type, time of occurrence, and so forth.

As shown in step 2414, the method 2400 may include automatically launching an investigation for a suspected threat when the composite threat score is above the predetermined threshold. This may, for example, include creating an investigation container (including a data structure and/or user interface) for investigating activity associated with the composite threat score as described above, or otherwise creating a user interface and/or data structure to support investigation of the context and details for a particular suspected threat. The investigation container may, for example, display (and/or store) one or more of the local threat indication, the contextual threat score, and the cloud resource data. The investigation container may also or instead provide access to supporting data for one or more of the local threat indication, the contextual threat score, and the cloud resource data in order to facilitate deeper investigation and other follow up by a technician.

As shown in step 2416, the method 2400 may include updating threat data based on various sources such as the endpoint, the threat management facility, or the cloud service(s). This may, for example, include incrementally updating the composite threat score and/or any accompanying scoring, detection, or contextual information or the like as such information becomes available from various resources. In one aspect, this may include incrementally updating the composite threat score based on data from one or more of the local security agent, the threat management facility, and the cloud service. This may also or instead include incrementally updating the composite threat score based on health information for the endpoint from the threat management facility, or any other resource for generating threat scores, evaluating the health or security posture of an endpoint, and so forth. This may also or instead include incrementally updating the composite threat score with data from one or more third party security service providers. For example, this may include updating threat definitions, signatures, detection rules, events, event vectors, health scores, reputation data, geolocation data, and so forth. More generally, this may include incrementally updating data for a potential threat using any of the remote, local, or other resources described herein.

Where an investigation container has been created, this may also or instead include incrementally updating information in the investigation container as data from one or more sources becomes available. In another aspect, this may include augmenting information in the investigation container based on a history of responses by other users to a potential threat associated with the investigation container. For example, as described herein, successful and unsuccessful responses, or other investigation trajectories associated with good or bad outcomes, may be recorded and used to assist subsequent threat investigation and remediation activity. Where there are responses, queries, or the like that are known (based on historical activity) to be associated with better outcomes, one or more such steps may be automatically initiated by the investigation platform, or recommended to a technician, or some combination of these.

According to the foregoing, there is further disclosed herein a system including a plurality of compute instances associated with an enterprise network, and a threat management facility for the enterprise network, the threat management facility configured to determine a composite threat score based on: a local threat indication received from one of the compute instances; cloud resource data based on an action taken at a cloud service and associated with the one of the compute instances; and a contextual score based on geolocation data received from a remote geolocation service for a suspected threat associated with the local threat indication. The system may include an administrative console configured to display the composite threat score in a user interface. The cloud resource data may, for example, include application activity initiated at the cloud resource from the compute instance.

FIG. 25 is a flow chart of a method for security integration with cloud services. This method 2500 may be deployed on the systems and devices described herein, and the steps of this method 2500 may be used alone or in any suitable combination with the steps of other methods described herein. In general, a threat management facility for an enterprise network may integrate native threat management capabilities with threat data from a cloud service provider used by the enterprise. By properly authenticating to the cloud service and mapping data feeds from the cloud service to a native threat management environment, the threat management facility can advantageously extend threat detection and management capabilities beyond endpoint-centric techniques.

As shown in step 2502, the method 2500 may begin with receiving an event stream such as any of the event streams described herein. For example, this may include receiving, at a threat management facility, a first event stream of local threat data from a number of local security agents executing on a number of compute instances associated with an enterprise network, or more generally, receiving a first event stream of events based on local threat data from a number of compute instances in an enterprise network. This may include any of the events or threat data described herein that might be provided directly from local security agents. For example, the local threat data may include a classification indicating a category of malicious activity associated with the events detected on one of the number of compute instances, such as a MITRE classification or other classification that provides a reference for consistent classification of different types of malware and attacks.

As shown in step 2504, the method 2500 may include storing the event stream in a data lake, such as any of the data lakes described herein. This may, for example, include storing threat detections or other data in the first event stream according to a threat schema for the threat management facility. This may include any schema that imposes a consistent structure on the event stream to facilitate search, retrieval, and use of threat data in the data lake for threat management functions. By way of example, for threat events such as threat detections or indications of compromise, a threat schema may include fields for a date of the threat (or more generally, the indication of compromise), a time of a threat, a worker (e.g., software module, process, microservice, or the like) that detected the threat, a type of attack (using any suitable classification scheme), a threat score (e.g., on a scale of 0-10), an identifier for a detection method used to detect the threat, a third party attack category (e.g., a MITRE classification or the like), a human readable description of the threat, a unique identifier for the threat, a unique record identifier for the detection, and so forth.

As shown in step 2506, the method may include authenticating to a cloud service provider. For example, this may include authenticating a resource at the threat management facility to a cloud service in order to provide administrative access to management functions and programming interfaces for accessing data in user accounts hosted at the cloud service. In general, the cloud service provider may be any service provider that provides cloud computing facilities to users associated with the enterprise network. For example, the cloud service provider may include a cloud computing service hosting virtual compute instances for the enterprise network, an identity provider providing identity management and/or authentication services for the users of the enterprise network, a third party network security service for the users of the enterprise network, an application hosting provider for users of the enterprise network, or some combination of these. The cloud service provider may also or instead host one or more of an electronic mail application, a cloud storage service, a cloud computing service, a virtualization platform, a web application, a zero trust network access resource, a network monitor executing on a third-party firewall, and an authentication service.

As shown in step 2508, the method 2500 may include configuring the cloud service for streaming. This may, for example, include enabling any suitable logging, reporting, notification, or audit features native to the cloud service that are provide for individual accounts, or for the service generally, using an administrative account for the cloud service. This may also or instead include installing or activating a streaming service at the cloud service, and/or configuring an external service to receive a data stream from the cloud service and publish the data, suitably formatted according to any applicable schemas, to the event stream or any suitable intermediate handler.

As shown in step 2510, the method 2500 may include receiving security data from the cloud service provider. This may include any security data natively provided by the cloud service provider, such as authentication data for a cloud service provider, administrative events at the cloud service provider, and application activity at the cloud service provider initiated from the one of the compute instances. It will also be understood that there may be any number of intermediaries between the cloud service and a data lake that stores threat data. Thus, receiving security data may include receiving data from the cloud service with an external service that processes as appropriate and publishes to the event stream, and/or this may include receiving data at the data lake from the event stream. In either case, the data may be formatted, filtered, augmented, or otherwise processed for delivery to the data lake.

As shown in step 2512, the method 2500 may include mapping the security data from the cloud service provider to a threat schema for delivery to or storage in the data lake. For example, this may include mapping the security data from the cloud service provider into a second event stream conforming to the threat schema for the threat management facility.

It will be understood that the schema or data structure(s) used by the cloud service may differ significantly from the threat schema used in the data lake, and may include fields and data specific to the cloud service environment. For example, in a Windows Office 365 environment, data may include Active Directory data (such as access events, logon (and failed logon) events, or token service events, role change or group change events), Exchange data (e.g., administrative audit data, single message events, group message events, and mailbox audit events, malware/phishing detection events, antivirus events, mail forwarding events, and message auto-labeling events), SharePoint data (e.g., file operation events, file sharing events, user comment events, list content and item events, auto-labeling policy events, and search events), Skype (e.g., call events, blocked user events), and Teams (admin events, device events, analytics events, user events, guest access or team creation events). More generally, a cloud service may provide audit of sensitive data access, file sharing, policy compliance, file access and usage, search/query activity, password changes, permission changes (for users, groups, files, folders, messages, etc.) login attempts, messaging services (forward, send, read, delete, move, login, etc.), threat intelligence, and so forth, any of which may be usefully stored as threat data in the data lake. As such, the data from the cloud service may be processed in any of a variety of ways in order to conform the data from the cloud service to the requirements of the data lake. Data from the cloud service provider may also or instead include user identification information such as a user name, electronic mail address, user identifier, or the like. This information may be provided as a data structure containing all users associated with the enterprise, and/or as a label, tag or the like for each event associated with a particular user.

For example, mapping the security data may include scaling one or more quantitative threat scores in the security data to a threat score range for the threat schema so that quantitative risk evaluations from the cloud service are generally more comparable to other quantitative risk evaluations in the data lake from other sources. Mapping the security data may also or instead include converting one or more threat types in the security data to a threat category for the threat schema. As with the quantitative scaling, using a similar or identical categorization taxonomy for data from the cloud service and other sources permits accurate, side-by-side comparison and analysis. Thus, the categories used by the cloud service may be mapped to analogous categories (or in some cases, simply category names) used within the data lake. In another aspect, mapping the security data may include transforming risk metadata in the security data into one or more context descriptors for the threat schema. For example, where a native cloud service environment reports a failed login with user credentials using a specific alphanumeric code, this may be mapped to a corresponding descriptor (e.g., "login failure") used within the data lake. Some cloud service providers provide a data blob of all available threat data formatted according to a cloud service schema. In this case, mapping the security data may also or instead include converting a data blob in the security data from the cloud service provider into a plurality of risk items identified in the threat schema, e.g., by parsing, recategorizing, scaling, transforming, or otherwise processing data in the data blob.

As shown in step 2514, the method 2500 may include augmenting the second event stream. In general, the second event stream may be augmented as described herein with additional security data from one or more third party security data providers, and/or with geolocation data and other supplemental data. The second event stream may also or instead include contextual data for a suspected threat from the source of an event or one or more external resources. By way of non-limiting example, the contextual data may include one or more of classification information for the suspected threat, a network location associated with the suspected threat, a geographic location for a suspected threat, a path for the suspected threat, a filename for the suspected threat, a process name for the suspected threat, a machine identifier for the suspected threat, user identifier associated with the suspected threat, and so forth. In one aspect, augmenting the second event stream may include receiving this contextual data, and/or receiving other contextual information for a suspected threat such as data from a remote data source. For example, the remote data source may provide classification information for the suspected threat, a network location associated with the suspected threat, geolocation data for the suspected threat, or any other useful information, which may be based on any of the contextual data or other data already present in the event stream.

As shown in step 2516, the method 2500 may include storing the second event stream in the data lake. The threat data from the cloud service may then be used along with other threat data in the data lake for various threat detection and management functions.

As shown in step 2518, the method 2500 may include calculating a threat score based on the second event stream. For example, this may include calculating a threat score for one of the compute instances based on data from the first event stream and the second event stream stored in the data lake. As a significant advantage, this permits improved threat assessment using local threat data obtained directly from a local security agent executing on a compute instance, along with cloud service data from a cloud service used by the compute instance. In one aspect, this may include calculating multiple threat scores such as a first threat score based on the local threat data, a second threat score based on the cloud threat data, and a third threat score based on data from a remote third-party threat service. This may also or instead include a calculation of a composite threat score, such as any of the composite threat scores described herein, based on local threat data from the compute instance, cloud threat data from a cloud service used by the compute instance, and/or supplemental threat data from one or more third party threat services.

As shown in step 2520, the method 2500 may include any additional processing usefully associated with the second event stream from the cloud service provider. For example, this may include displaying one or more of a plurality of threat scores, such as any of the individual or composite threat scores described herein, in a user interface such as an administrative console of a threat management facility for an enterprise network. The threat scores may usefully be presented in an order ranked according to threat severity, and may also or instead be color coded or otherwise presented in a manner that highlights more severe risks. In another aspect, the additional processing may include remediating an associated threat (or initiating a remediation of the threat), e.g., using any of the remediation techniques described herein, such as by initiating a remediation of the one of the compute instances in the enterprise network when one of the threat scores meets a predetermined criterion or quantitative threshold.

It will be appreciated that detections based on concurrent monitoring of a compute instance and an associated cloud service may permit significantly more flexibility in threat detection and remediation, particularly where user behavior on a compute instance might usefully be compared to activity for the user in an account at the cloud service. For example, where a phishing email is detected in an electronic mail service for a user, a remediation or notification may be initiated on a compute instance associated with the user before the user has an opportunity view the communication. As another example, activity at a compute instance associated with the user may be compared to login or other authentication activity at an identity provider in order to assess a likelihood of credential theft or misuse. More generally, any threat detection based on a combination of threat data from a cloud service and threat data from a local security agent may usefully be performed using the techniques described herein.

According to the foregoing, there is also disclosed herein a system including a plurality of compute instances associated with an enterprise network, each executing a local security agent that provides event data to a first event stream, and a threat management facility for the enterprise network. The threat management facility may be configured, e.g., by computer executable code, to authenticate to a cloud service provider for the enterprise network, receive security data from the cloud service providers in a second event stream, calculate a composite threat score indicative of a security risk of one of the compute instances based on data from the first event stream and the second event stream, and display the composite threat score in a user interface. The cloud service provider may, for example, include one or more of an application hosting platform, a communication platform, an identity management platform, and a remote security services platform.

Figure 26:
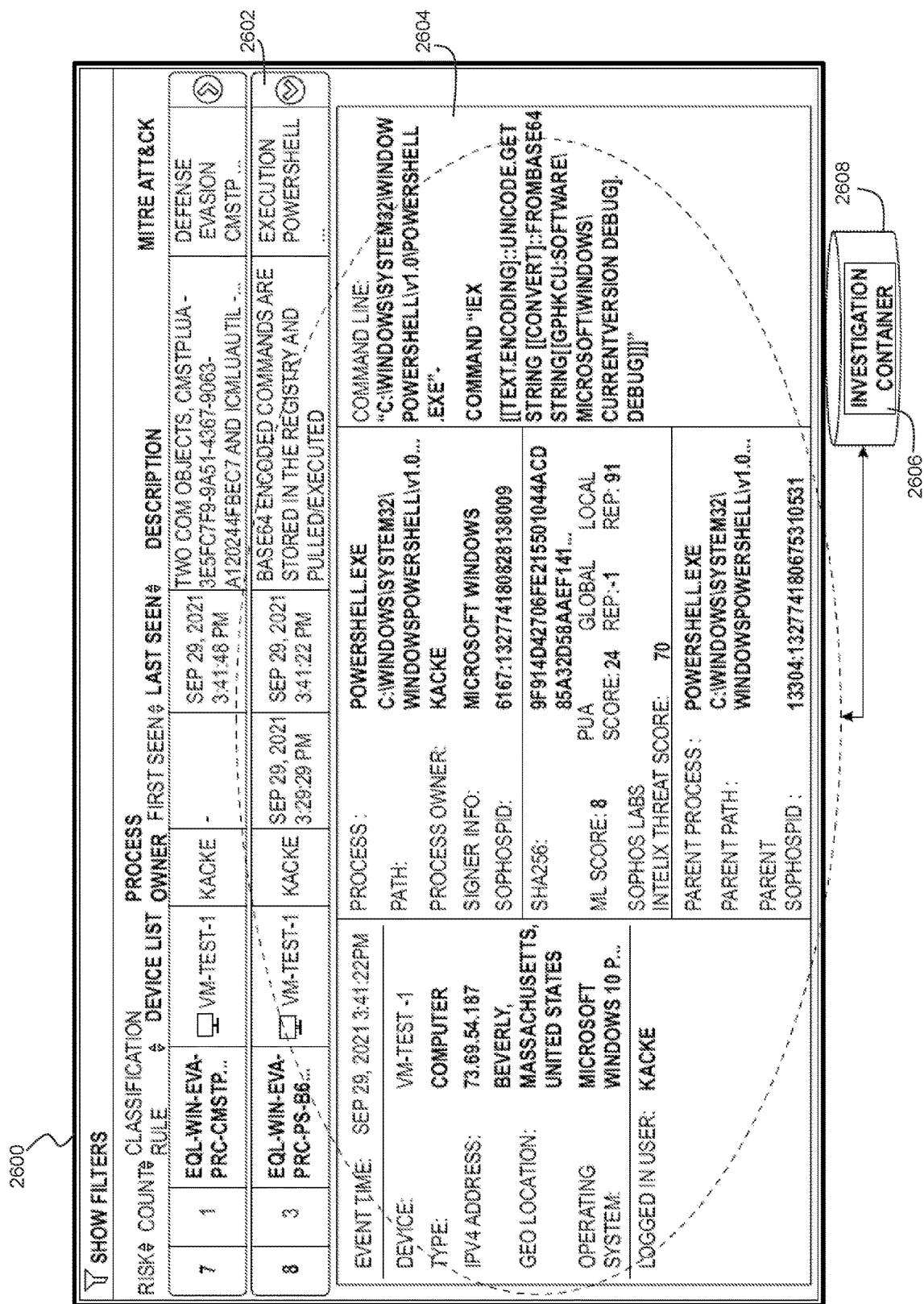
FIG. 26 shows a user interface for investigating threats.

FIG. 26 shows a user interface for investigating threats. The user interface 2600 may be rendered using the devices herein, e.g., as an administrative console for a threat management facility, or on any other device or system accessible by a user for threat investigation. In general, the user interface 2600 may display one or more potential threats, along with related information. A threat summary 2602 may, for example, display a composite threat score or a detection, which provides a basis for ranking and filtering various threat activities within a managed context such as an enterprise network. The threat summary 2602 may also show a classification rule, a classification such as a MITRE ATT&CK category, a human-readable description of the classification, a count of the number of occurrences of the activity (e.g., over some time span such as the last 24 hours), a list of devices that have made the detection, a process owner associated with the detection, and, for items with more than one occurrence, summary data such as a first occurrence, a time of first occurrence, a most recent occurrence, and/or a time of most recent occurrence.

An investigation window 2604 within the user interface 2600 for one such threat may include currently available information for the threat to supplement the threat summary 2602. For example, the investigation window 2604 may display information associated with the threat such as a process, path, process owner, certificate information, hash (e.g., SHA256 hash) and one or more threat scores such as any of the threat scores described herein. This may, for example, include a machine learning score (e.g., based on event vectors associated with the threat), a third party score (e.g., based on an event identification from a third party security resource), a global reputation (e.g., from the threat management facility), a local reputation (e.g., from the source endpoint), and so forth. Information about the affected endpoint may also or instead be provided, such as a device name, device type, IP address, geolocation information, operating system, user, and so forth.

In one aspect, an investigation container 2606 for a particular threat may be automatically launched as a persistent, programmatic object for handling a case for a particular the threat, and stored in a data repository 2608 such as a database for a threat management facility or other host for threat investigation. The investigation container 2606 may advantageously be launched, e.g., when the composite threat score for a threat meets a predetermined threshold indicative of a high likelihood of malicious activity. The investigation container 2606 may include, or may communicate with, a user interface that provides various controls for user investigation using any resources available to the host. This may include query access to the data lake, remediation tools, external resources, and so forth.

In one aspect, the investigation window 2604 (or an investigation container 2606 supporting the investigation window 2604) may be incrementally updated within information from various available sources. For example, while an initial detection from an endpoint or a threat management facility may immediately be used to create a detection, assign a composite threat score, and display the newly detected threat in the user interface 2600 if the score meets a user-defined threshold, a significant range of relevant information may not be immediately available. For example, many of the resources, such as third party resources used to classify or score a threat or cloud services for the enterprise network, may have significant latencies, limited availability, and/or bandwidth limitations. At the same time, not all information related to a detection may be available at the moment of detection. That is, information from other affected devices within an enterprise network, information from other processes on an affected endpoint, new threat identifications or signatures, and the like, may only become available after the initial event/detection. In the systems and methods described herein, the data for an investigation may be incrementally updated as new data becomes available, and where appropriate, the composite threat score may be updated based on the new information. As a significant advantage, this approach permits early reporting and ranking of potential threats, while facilitating augmentation from a variety of data sources having differing latency and availability.

Figure 27:
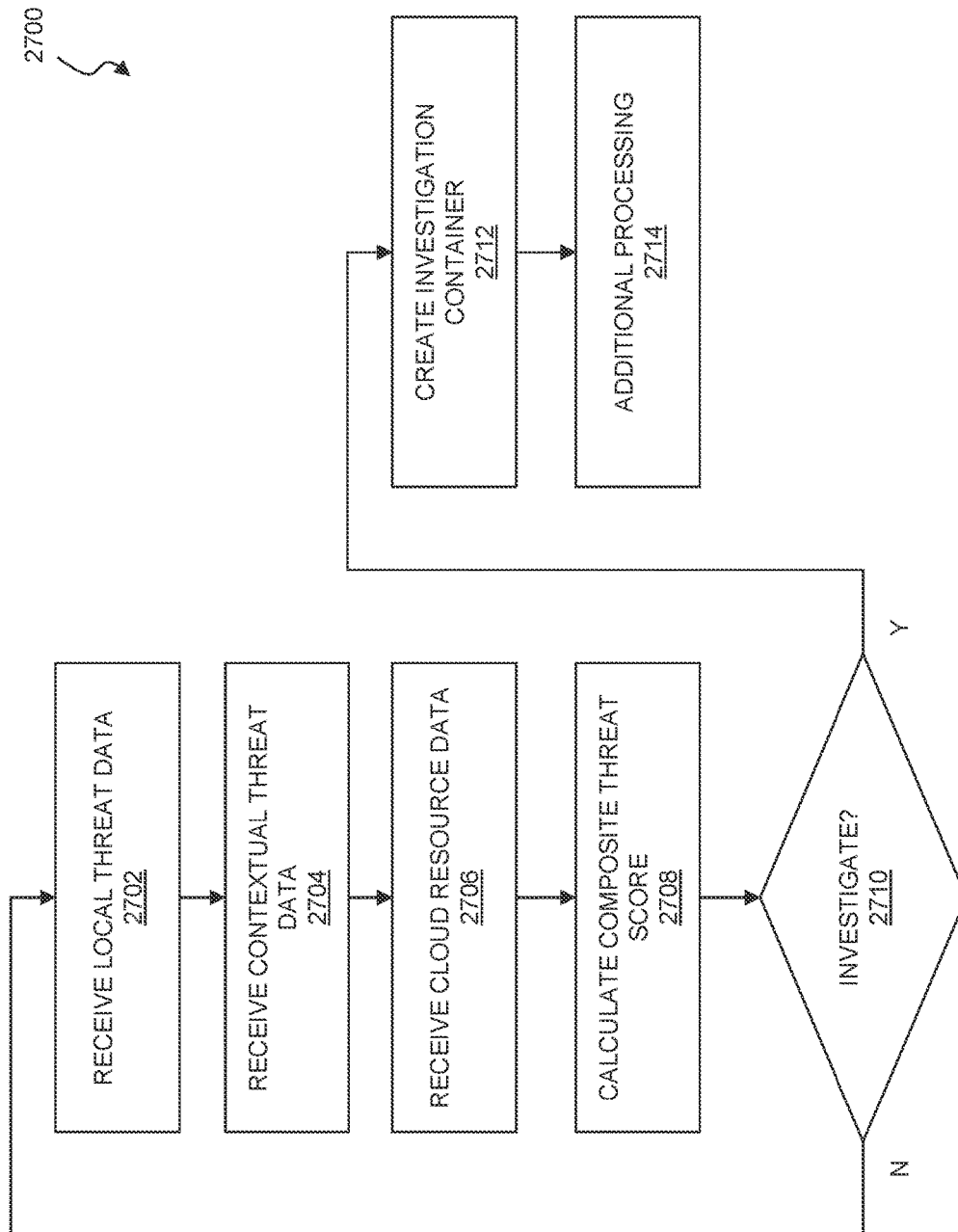
FIG. 27 is a flow chart of a method for using an automatically generated investigation container.

FIG. 27 is a flow chart of a method for using an automatically generated investigation container. This method 2700 may be deployed on the systems and devices described herein, and the steps of this method 2700 may be used alone or in any suitable combination with the steps of other methods described herein. In general, a threat management facility may generate a composite threat score based on risk data from various sources, and automatically launch an investigation container, such as any of the investigation containers described herein, for interactive threat investigation when the composite threat score meets a predetermined threshold.

As shown in step 2702, the method 2700 may include receiving local threat data. This may, for example, include any of the local threat data described herein. In one aspect, the local threat data includes a local threat indication from a local security agent executing on a compute instance, or other locally obtained threat data from the compute instance, such as a local threat indication identifying a category of malicious activity associated with one or more events detected on the compute instance. The local threat data may also or instead include a local threat identification for an event indicative of malicious activity on the compute instance, or a classification indicating a category of malicious activity associated with events detected on the compute instance. In another aspect, the local threat data may include a threat detection obtained by the local security agent by applying a detection rule based on at least one of a malware signature and a behavior detected on the compute instance.

In general, receiving the threat data may include receiving the local threat data at a threat management facility directly from the compute instance through a data network, although it will be understood that the data may initially be published to an event stream and/or stored in a data lake as described herein, and the local threat data may then be retrieved from such data sources by the threat management facility either proactively (by requesting the data) or reactively (after receiving a notification of new local threat data). This may also include calculating a local threat score at the compute instance for transmittal to the threat management facility.

As shown in step 2704, the method 2700 may include receiving contextual threat data, such as any of the contextual threat data described herein. For example, this may include geolocation data or other supplemental data retrieved from a third-party service for a suspected threat detected on the compute instance. In one aspect, this may include calculating a contextual threat score based at least in part on geolocation data retrieved from a third-party service for a suspected threat on a compute instance, and then transmitting this contextual threat score to the threat management facility (or event stream). In another aspect, the threat management facility may calculate the contextual threat score, e.g., when calculating composite threat scores in step 2708. Receiving the threat data may include receiving the contextual threat data at a threat management facility directly from the third-party service through a data network, although it will be understood that the data may initially be published to an event stream and/or stored in a data lake as described herein, and the contextual threat data may then be retrieved from such data sources by the threat management facility either proactively (by requesting the data) or reactively (after receiving a notification of new contextual threat data).

As shown in step 2706, the method 2700 may include receiving cloud resource data. As described herein, this may generally include any cloud resource data based on an action associated with the compute instance, or a user of the compute instance, at a cloud service. In one aspect, the cloud service may calculate or otherwise provide a cloud threat score that is transmitted to the event stream, data lake, or threat management facility. In another aspect, the threat management facility may calculate the cloud threat score, e.g., when calculating composite threat scores in step 2708. In general, the cloud service may be any of the cloud services described herein, including without limitation a web application, a cloud storage service, an electronic mail application, an authentication service, a zero trust network access resource, a network monitor executing on a third-party firewall, a cloud computing service, and a virtualization platform. Receiving the cloud resource data may include receiving the cloud resource data at a threat management facility directly from a cloud service through a data network, although it will be understood that the data may initially be published to an event stream and/or stored in a data lake as described herein, and the cloud resource data may then be retrieved from such data sources by the threat management facility either proactively (by requesting the data) or reactively (after receiving a notification of new cloud resource data).

As shown in step 2708, the method 2700 may include calculating or otherwise determining a composite threat score based on the local threat data, the contextual threat data, and the cloud resource data. Each component of the composite threat score may be independently evaluated and scored, or the components may be scored together, or some combination of these. Thus, the composite threat score may include a single score based on a combination of two or more of the local threat indication, the contextual threat data, and the cloud resource data. In another aspect, the composite threat score may include a number of scores each individually based on one of the local threat indication, the contextual threat score, and the cloud resource data. The composite threat score may also include a combination of these two types of scores.

As shown in step 2710, the method 2700 may include evaluating whether to investigate a potential threat based on the composite threat score. When the composite threat score meets one or more predetermined criteria for investigation, the method 2700 may proceed to step 2712 where an investigation container may be created. When the composite threat score does not meet the one or more predetermined criteria for investigation, the method 2700 may return to step 2702 and additional local, contextual, a cloud data may be gathered.

As shown in step 2712, the method 2700 may include automatically creating an investigation container for investigating activity associated with the composite threat score in response to the composite threat score meeting a predetermined threshold. In general, the investigation container may be a data object including data associated with a potential threat, along with any links, pointers, or the like to external resources associated with the potential threat, or to threat investigation more generally.

The investigation container may be associated with (and/or may programmatically include) a user interface, such as the user interface described with reference to FIG. 26, which may display one or more threat scores based on the local threat data, the contextual threat data, and the cloud resource data. This may include various types of data including but not limited to a local threat score based on the local threat data, a contextual threat score based on the contextual threat data, and a cloud threat score based on the cloud resource data. The user interface may provide interactive access to supporting data for one or more threat scores including one or more of the local threat indication, the contextual threat data, and the cloud resource data.

As shown in step 2714, the method 2700 may include additional processing consistent with the use of the investigation container to investigate and dispose of threat detections. For example, this may include transmitting a notification with a link to the user interface associated with the investigation container to a device associated with a security technician so that the security technician can access the user interface and investigation container to investigate the potential threat. A notification concerning a new investigation container may be communicated in a number of other ways. For example, this may include displaying a pop-up window or other display element within a display of a device currently being used by the technician, or by sending a notification of availability of the investigation container through some other medium. For example, the threat management facility may transmit a text message, electronic mail, or phone communication to a technician notify the technician of the availability or a new investigation container, particularly where a threat score associated with the investigation container indicates a severe security risk and/or a potential compromise of highly valuable data.

Additional processing may also or instead include displaying information from the investigation container to a user. For example, this may include displaying the composite threat score(s) in a user interface associated with the investigation container, or otherwise presenting related threat information in the user interface, such as one or more of the local threat data (or local threat indication), the contextual threat data, and/or the cloud resource data. In one aspect, this may include displaying the composite threat score in a notification to a security technician within an electronic mail, text message, or other communication.

In another aspect, the additional processing may include incrementally updating information in the investigation container. Due to the distributed nature of the sources of threat data, there may be different latencies, reporting frequencies, and so forth. Some data may be received in batches, such as lookups to remote resources or data that is aggregated and batched by an endpoint such as a gateway or firewall, or any of the other compute instances described herein. In this case, the investigation container may be incrementally updated as each new item of information becomes available, e.g., as data becomes available independently from each of the compute instance, the third-party service (e.g., geolocation data), and the cloud service. For example, the additional processing may include incrementally updating the composite threat score based on an evaluation of the compute instance by the threat management facility, e.g., where a threat detection or other potential risk is identified by the threat management facility. Where a composite threat score or other metric indicates a reduced risk severity based on incrementally updated data, the additional processing may also include disposing of or otherwise closing or terminating the investigation container. For example, where a request to a third-party service provides a response indicating that the potential threat is signed by a trusted third-party, then the investigation container may be disposed of.

In this manner, a human investigator or computer scoring tool or the like can maintain a current view of a threat associated with the investigation container as the risk posture develops over time. At the same time, the investigation container can reflect new information received after the investigation container was created. In addition to incrementally updating supporting data, the additional processing may include incrementally updating scores that are presented in, or associated with, the investigation container. For example, this may include incrementally updating the composite score(s) as data becomes available from one or more remote sources such as the cloud service or third-party data source.

Additional processing may include providing interactive access, in a user interface associated with the investigation container, to supporting data for the composite threat score. In one aspect, incrementally updating information in the investigation container may include updating this supporting data that is accessible through the investigation container. This permits tools within the user interface to link to current data, e.g., data in the data lake or other store that has been incrementally updated with new data received after the creation of the investigation container but before a user request for data. Information that is displayed within the investigation container, or an interface accessed from the investigation container, may also or instead be dynamically updated within the display in order to ensure that a user is responding to the most recently available security information.

In another aspect, the additional processing may include augmenting information in the investigation container based on a history of responses by other users to a potential threat associated with the investigation container. Thus, as generally described herein, user query activity received in the context of previous investigation containers including patterns of queries, updates to queries, and/or responses taken to queries in an administrative console, may be used to augment information in the investigation container, e.g., by providing query-based threat detections or suggesting useful remedial measures based on the current context.

According to the foregoing, there is described herein a system including a plurality of compute instances associated with an enterprise network, a threat management facility for the enterprise network, and an administrative console. The threat management facility may be configured, e.g., by computer executable code, to determine a composite threat score based on a local threat indication received from one of the compute instances, cloud resource data based on an action taken at a cloud service and associated with the one of the compute instances, and a contextual score based on geolocation data received from a remote geolocation service for a suspected threat associated with the local threat indication. The administrative console may be configured to automatically display a user interface associated with an investigation container when the composite threat score meets a predetermined threshold.

Figure 28:
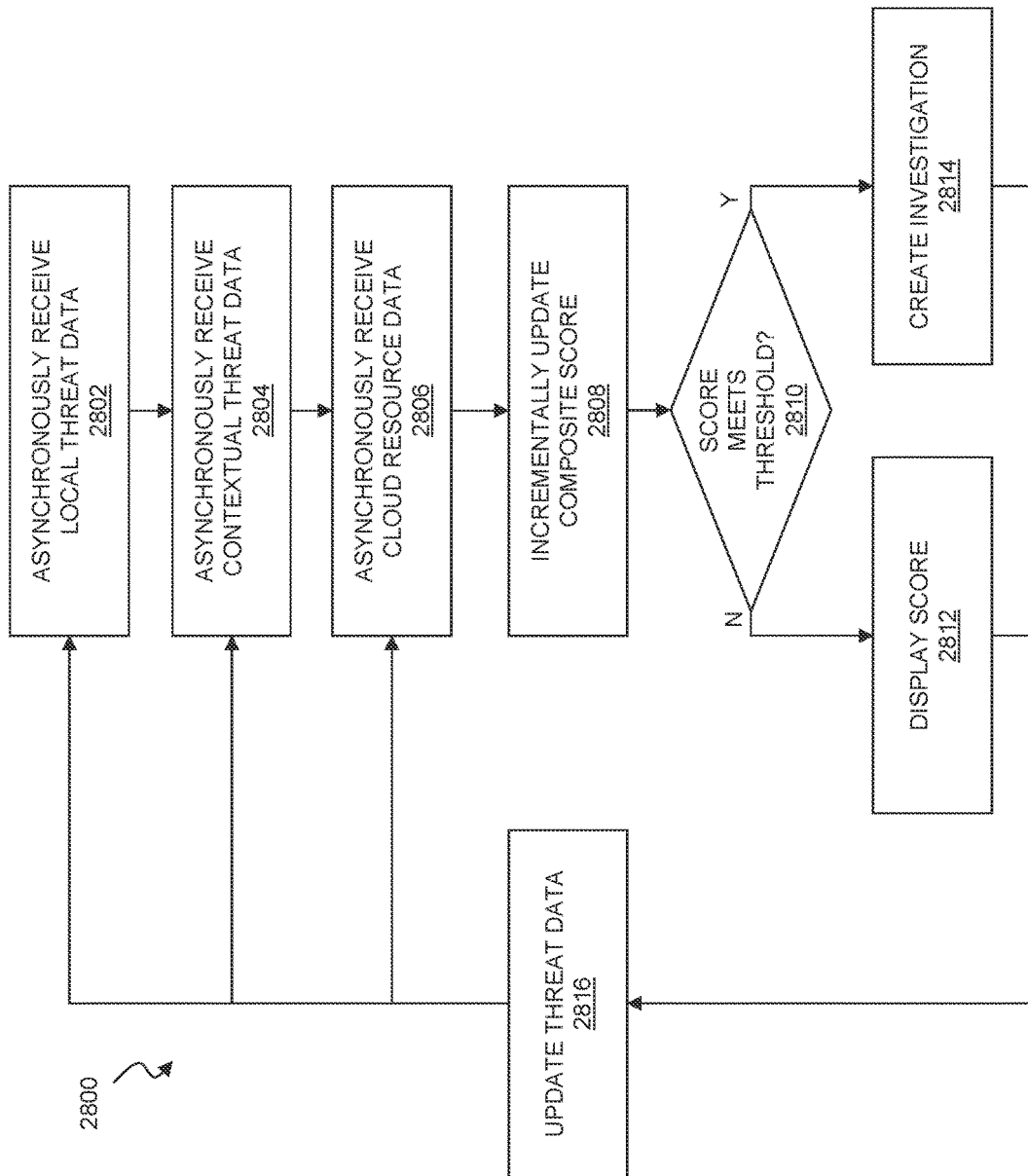
FIG. 28 is a flow chart of a method for incremental enrichment of threat data.

FIG. 28 is a flow chart of a method for incremental enrichment of threat data. This method 2800 may be deployed on the systems and devices described herein, and the steps of this method 2800 may be used alone or in any suitable combination with the steps of other methods described herein. In general, a threat management facility may receive data from a variety of sources such as compute instances within an enterprise network, cloud service providers supporting the enterprise network, and third-party data providers such as geolocation services. In order to facilitate prompt notification of potential risks, the threat management facility may incrementally update data for use in threat assessments as the data becomes available from these different sources, and create suitable alerts or notifications whenever the currently accumulated data provides an indication of threat meeting a predetermined threshold.

As shown in step 2802, the method 2800 may include asynchronously receiving local threat data from a compute instance in an enterprise network. This may include a local threat indication from a local security agent executing on the compute instance, and may identify a category of malicious activity associated with one or more events detected on the compute instance, or otherwise provide local threat information from the compute instance. This may also or instead include any of the other local threat data described herein. It will be understood that asynchronous local threat data, as described herein, is local threat data that is not synchronized timewise with data form other data sources. The data may be received before other data, after other data, during the receipt of other data, and so forth, and may be received in batches or as individual events, any and all of which may be published to an event stream independently of other data sources on a non-predetermined schedule. In this context, a resource that receives or analyzes the data, such as a threat management facility, will typically be unable to determine in advance an order or schedule of data from each data source, except in those cases where a particular data transmission is scheduled in advance and is transmitted over a reliable communication channel.

As shown in step 2804, the method 2800 may include asynchronously receiving contextual threat data, such as any of the contextual threat data described herein, from a third party service. This may, for example, include geolocation data retrieved from a third-party service for a suspected threat detected on the compute instance, or any other contextual data. It will be understood that asynchronous contextual threat data, as described herein, is contextual threat data that is not synchronized timewise with data form other data sources. The data may be received before other data, after other data, during the receipt of other data, and so forth, and may be received in batches or as individual events, any and all of which may be published to an event stream independently of other data sources on a non-predetermined schedule. In this context, a resource that receives or analyzes the data, such as a threat management facility, will typically be unable to determine in advance an order or schedule of data from each data source, except in those cases where a particular data transmission is scheduled in advance and is transmitted over a reliable communication channel.

As shown in step 2806, the method 2800 may include asynchronously receiving cloud resource data, such as any of the cloud resource data described herein, from a cloud service. For example, this may include cloud resource data based on one or more actions associated with the compute instance at a cloud service supporting one or more cloud-based applications for users of the enterprise network, or any other cloud resource data. This may also include data from two or more cloud service providers, each providing cloud resource data asynchronously from one another. It will be understood that asynchronous cloud resource data, as described herein, is cloud resource data that is not synchronized timewise with data form other data sources. The data may be received before other data, after other data, during the receipt of other data, and so forth, and may be received in batches or as individual events, any and all of which may be published to an event stream independently of other data sources on a non-predetermined schedule. In this context, a resource that receives or analyzes the data, such as a threat management facility, will typically be unable to determine in advance an order or schedule of data from each data source, except in those cases where a particular data transmission is scheduled in advance and is transmitted over a reliable communication channel.

As shown in step 2808, the method 2800 may include, in response to asynchronous data from one of the plurality of sources, incrementally calculating a composite threat score indicative of a threat risk for the compute instance based on the threat data. The composite threat score may include any of the composite threat scores described herein. In this context, incrementally calculating a composite threat score refers to a calculation (or re-calculation or update) of the composite threat score in response to one or more items of asynchronous data from any one of the plurality of sources. That is, if local threat data such as a threat detection or threat score is received from a compute instance, the composite threat score will be calculated without waiting for other potentially relevant information such as associated look ups for supplemental data (such as geolocation data) from third party sources, or related information from a cloud resource. Instead, the composite threat score can be calculated immediately with available data, and then incrementally updated as new items of data from the plurality of sources become available.

As shown in step 2810, if an incrementally calculated composite threat score meets a predetermined threshold, additional action may be taken, such as creating an investigation container as shown in step 2814, or otherwise responding to the corresponding potential threat. Alternatively, if the incrementally calculated composite threat score does not meet a predetermined threshold, the method 2800 may proceed to 2816 where additional threat data may be received from any one or more of the data sources.

As shown in step 2814, the method 2800 may include automatically creating an investigation container, such as any of the investigation containers described herein, when the composite threat score meets a predetermined threshold. The investigation container may be associated with a user interface for interactively investigating sources of the composite threat score.

Creating the investigation container may include any number of additional and/or related steps for assisting a user in investigating and disposing of an associated threat. For example, the method 2800 may also include displaying the composite threat score to a user in the user interface associated with the investigation container, or otherwise facilitating investigation and remediation of any related threats. The method 2800 may also include creating an alert or notification to a user when the composite threat score meets the predetermined threshold, such as a message containing a link to the investigation container (or a user interface displaying data from the investigation container).

As shown in step 2816, the method may include updating threat data from one or more of the plurality of sources. This may include receiving additional asynchronous data from one of the plurality of sources, and responsively updating the composite threat score displayed in the user interface. In another aspect, updating threat data may include updating data internally, e.g., with a threat management facility configured to augment information in the investigation container based on a history of responses by other users to a potential threat associated with the investigation container, or configured to otherwise augment information for the investigation container based on other data available in a data lake or other resource for the enterprise network.

According to the foregoing, there is also disclosed herein a system including a plurality of compute instances associated with an enterprise network, and a threat management facility for the enterprise network. The threat management facility may be configured, e.g., by computer executable code, to receive threat data asynchronously from a plurality of sources, the threat data including at least a local threat indication from a local security agent on a compute instance, the local threat indication identifying a category of malicious activity associated with one or more events detected on the compute instance, geolocation data retrieved from a third-party service for a suspected threat detected on the compute instance, and cloud resource data based on an action associated with the compute instance at a cloud service supporting one or more cloud-based applications for users of the enterprise network. The threat management facility may be further configured to respond to asynchronous data from one of the plurality of sources by performing the steps of incrementally calculating a composite threat score indicative of a threat risk for the compute instance, creating an investigation container when the composite threat score meets a predetermined threshold, displaying the composite threat score in a user interface associated with the investigation container, and updating the composite threat score in the user interface in response to additional asynchronous data from one of the plurality of sources.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer readable medium that, when executing on one or more computing devices, causes the one or more computing devices to perform the steps of:
   receiving threat data asynchronously from a plurality of sources, the threat data including at least:
      a local threat indication from a local security agent executing on a compute instance in an enterprise network, the local threat indication identifying a category of malicious activity associated with one or more events detected on the compute instance;
      geolocation data retrieved from a third-party service for a suspected threat detected on the compute instance; and
      cloud resource data based on an action associated with the compute instance at a cloud service supporting one or more cloud-based applications for users of the enterprise network;
   in response to asynchronous data from one of the plurality of sources, incrementally calculating a composite threat score indicative of a threat risk for the compute instance based on the threat data;
   automatically creating an investigation container when the composite threat score meets a predetermined threshold, the investigation container associated with a user interface for interactively investigating sources of the composite threat score;
   displaying the composite threat score to a user in the user interface associated with the investigation container; and
   updating the composite threat score in the user interface in response to additional asynchronous data from one of the plurality of sources.

2. The computer program product of claim 1, further comprising computer executable code that, when executing on the one or more computing devices, performs the step of creating an alert to the user when the composite threat score meets the predetermined threshold.

3. The computer program product of claim 2, wherein the alert includes a message containing a link to the investigation container.

4. A method comprising:
   receiving threat data asynchronously from a plurality of sources, the threat data including at least:
      a local threat indication from a local security agent executing on a compute instance in an enterprise network, the local threat indication identifying a category of malicious activity associated with one or more events detected on the compute instance;
      contextual data from a third-party service for a suspected threat detected on the compute instance; and
      cloud resource data based on an action associated with the compute instance at a cloud service supporting users of the enterprise network;
   in response to asynchronous data from one of the plurality of sources, incrementally calculating a composite threat score indicative of a threat risk for the compute instance based on the threat data;
   automatically creating an investigation container when the composite threat score meets a predetermined threshold, the investigation container associated with a user interface for interactively investigating sources of the composite threat score;
   displaying the composite threat score to a user in a user interface associated with an investigation container; and
   updating the composite threat score in the user interface in response to additional asynchronous data from one of the plurality of sources.

5. The method of claim 4, wherein the contextual data includes geolocation data.

6. The method of claim 4, wherein the composite threat score includes a number of scores each individually based on one of the local threat indication, the contextual data, and the cloud resource data.

7. The method of claim 6, further comprising automatically launching the investigation container in response to the at least one of the number of scores meeting the predetermined threshold.

8. The method of claim 4, wherein the user interface associated with the investigation container provides interactive access to supporting data for the composite threat score.

9. The method of claim 4, further comprising transmitting a notification with a link to the user interface associated with the investigation container to a device associated with a security technician for the enterprise network.

10. The method of claim 4, wherein the composite threat score includes a single score based on at least the local threat indication, the contextual data, and the cloud resource data.

11. The method of claim 4, wherein the cloud service includes one or more of a web application, a cloud storage service, an electronic mail application, an authentication service, a zero trust network access resource, a network monitor executing on a third-party firewall, a cloud computing service, and a virtualization platform.

12. The method of claim 4, wherein the plurality of sources include a third party security service.

13. The method of claim 4, wherein the plurality of sources include a source of malware signature updates.

14. The method of claim 4, wherein the plurality of sources include two or more cloud service providers.

15. The method of claim 4, wherein the plurality of sources include a threat management facility for the enterprise network, the threat management facility configured to augment information in the investigation container based on a history of responses by other users to a potential threat associated with the investigation container.

16. The method of claim 4, wherein the local threat indication identifies a category of malicious activity associated with one or more events detected on the compute instance.

17. The method of claim 4, wherein the local threat indication includes a malware detection from the local security agent executing on the compute instance.

18. A system comprising:
   a plurality of compute instances associated with an enterprise network; and
   a threat management facility for the enterprise network, the threat management facility implemented using at least one hardware processor and configured to receive threat data asynchronously from a plurality of sources, the threat data including at least:
      a local threat indication from a local security agent on a compute instance, the local threat indication identifying a category of malicious activity associated with one or more events detected on the compute instance;
      geolocation data retrieved from a third-party service for a suspected threat detected on the compute instance; and
      cloud resource data based on an action associated with the compute instance at a cloud service supporting one or more cloud-based applications for users of the enterprise network;
   wherein the threat management facility is configured to respond to asynchronous data from one of the plurality of sources by:
      incrementally calculating a composite threat score indicative of a threat risk for the compute instance;
      creating an investigation container when the composite threat score meets a predetermined threshold;
      displaying the composite threat score in a user interface associated with the investigation container; and
   updating the composite threat score in the user interface in response to additional asynchronous data from one of the from one of the plurality of sources.

* * * * *